United States Patent [19]
Mukai et al.

[11] Patent Number: 5,966,244
[45] Date of Patent: Oct. 12, 1999

[54] VIEWFINDER OPTICAL SYSTEM

[75] Inventors: Hiromu Mukai; Shigeto Ohmori, both of Kawachinagano, Japan

[73] Assignee: Minolta Co., Ltd., Osaka, Japan

[21] Appl. No.: 08/943,723

[22] Filed: Oct. 3, 1997

[30] Foreign Application Priority Data

| Oct. 3, 1996 | [JP] | Japan | H8-262698 |
| Oct. 4, 1996 | [JP] | Japan | H8-264214 |
| Dec. 5, 1996 | [JP] | Japan | H8-325025 |

[51] Int. Cl.⁶ .............. G02B 3/08; G02B 21/02; G02B 5/18; G03B 3/00
[52] U.S. Cl. .............. 359/647; 359/661; 359/743; 359/569; 359/565; 359/571; 396/382
[58] Field of Search ............ 359/647, 661, 359/743, 569, 565, 571; 396/382

[56] References Cited

U.S. PATENT DOCUMENTS

| 5,044,706 | 9/1991 | Chen | 359/357 |
| 5,148,314 | 9/1992 | Chen | 359/642 |
| 5,206,675 | 4/1993 | Miyauchi et al. | 396/384 |
| 5,446,588 | 8/1995 | Missig et al. | 359/565 |
| 5,548,439 | 8/1996 | Smith | 359/566 |

*Primary Examiner*—David Nelms
*Assistant Examiner*—Evelyn A. Lester
*Attorney, Agent, or Firm*—Sidley & Austin

[57] ABSTRACT

An eyepiece lens has a single lens element having a positive optical power, and the single lens element has a refractive power of an aspherical surface and a diffractive power. The eyepiece lens satisfies the following condition:

$$-0.0006 < \{1/(fl \cdot \nu)\} + \phi DOE/\nu DOE < 0.0002$$

where fl represents the focal length resulting from both refractive effect and diffractive effect of the eyepiece lens, $\nu$ represents the Abbe number of the eyepiece lens, $\phi$DOE represents the power resulting from the diffractive effect of the eyepiece lens, and $\nu$DOE represents the Abbe-number-equivalent value resulting from the diffractive effect of the eyepiece lens.

18 Claims, 36 Drawing Sheets

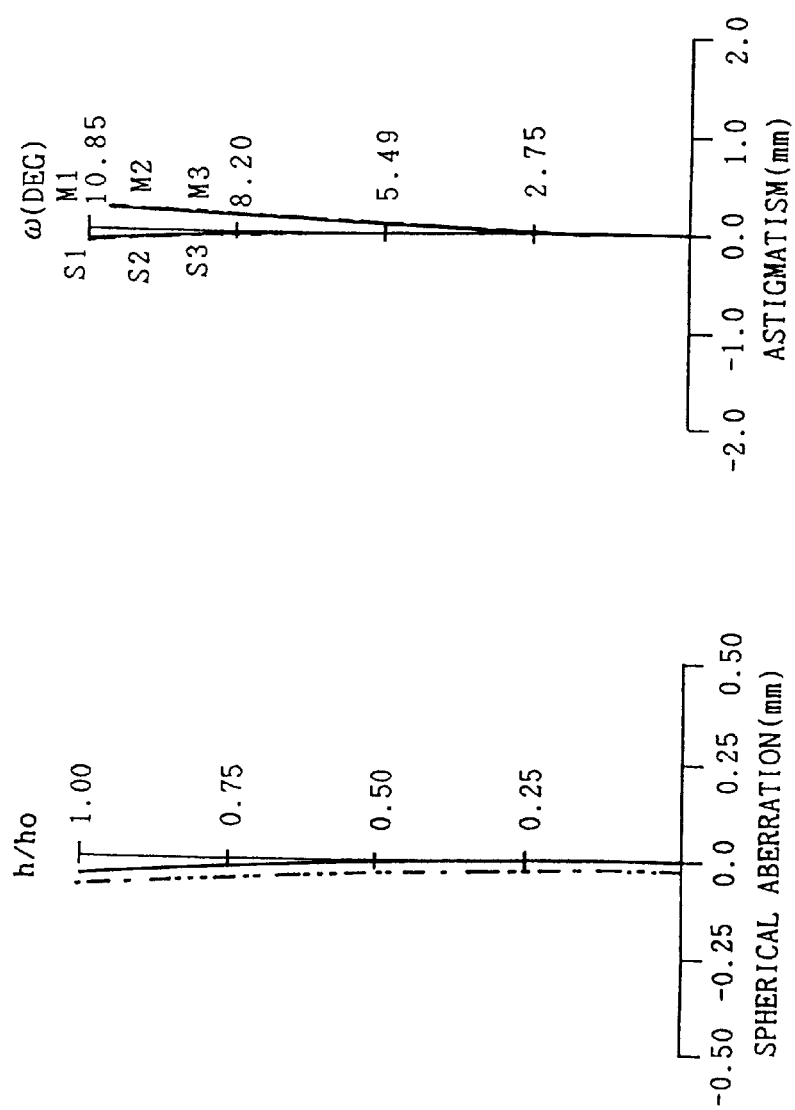
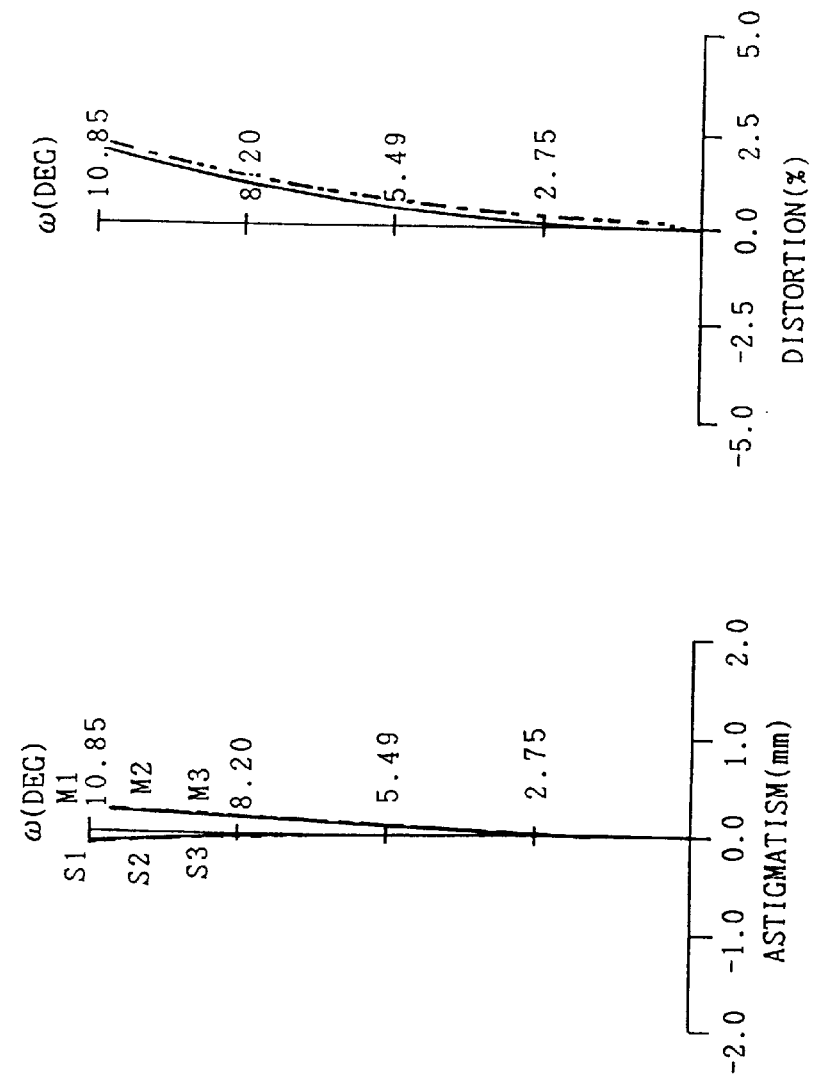
Fig. 8A  Fig. 8B  Fig. 8C

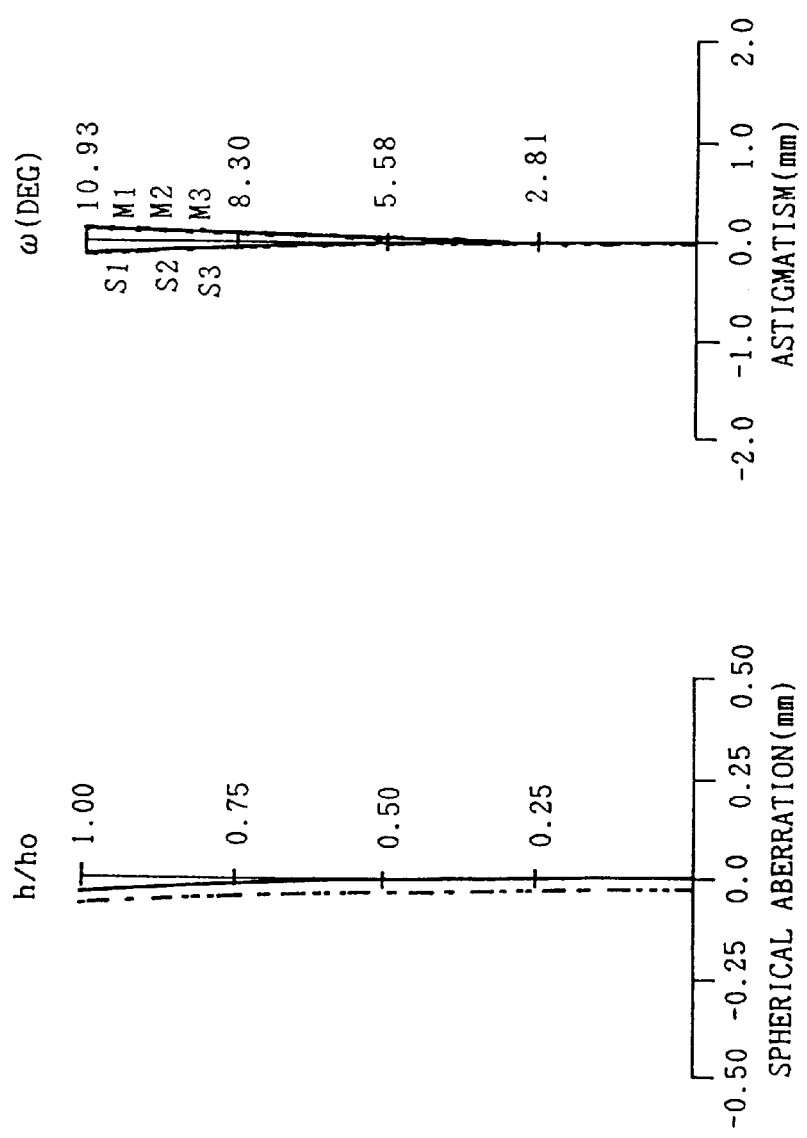

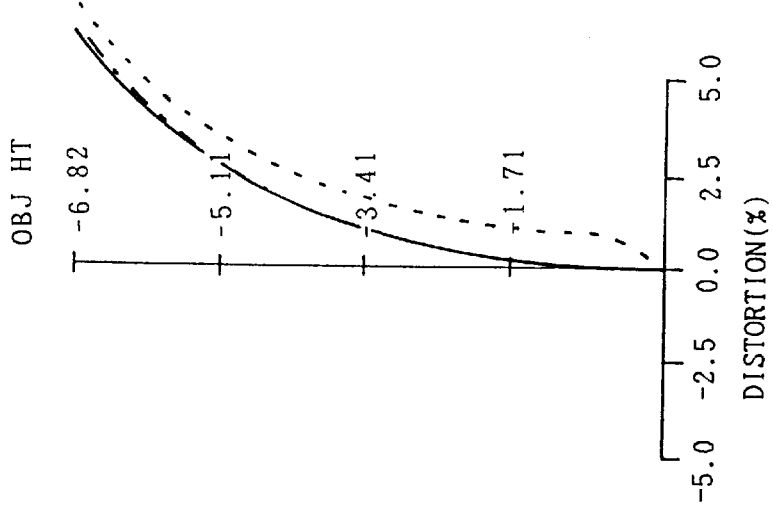
Fig.13C
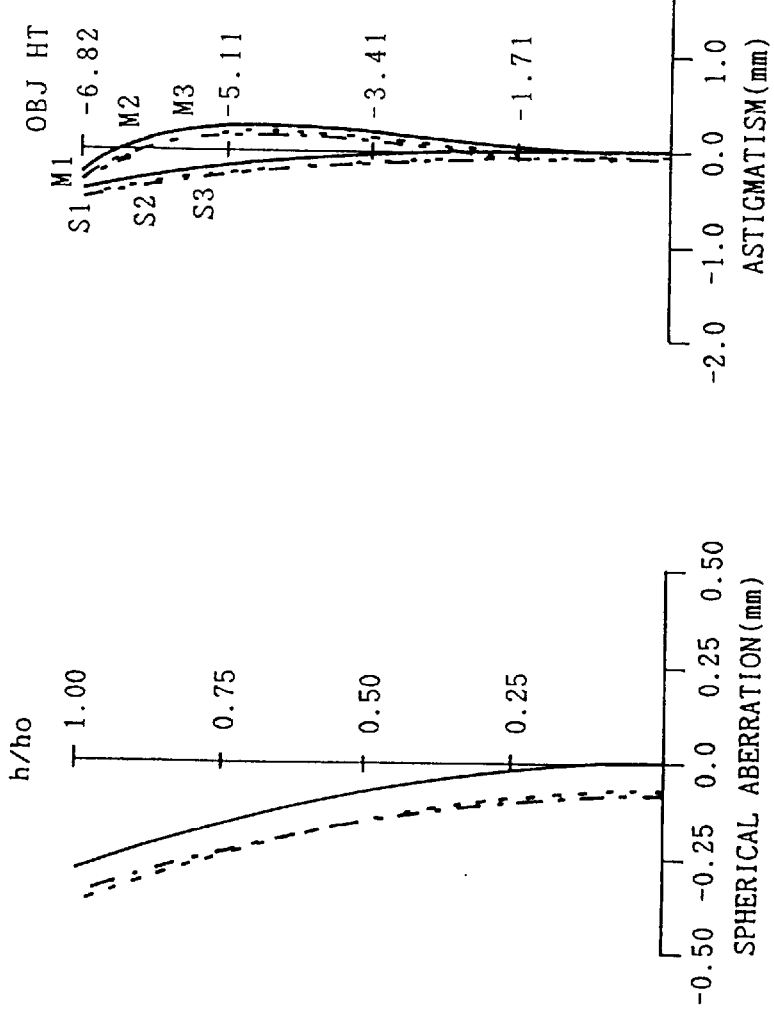
Fig.13B
Fig.13A

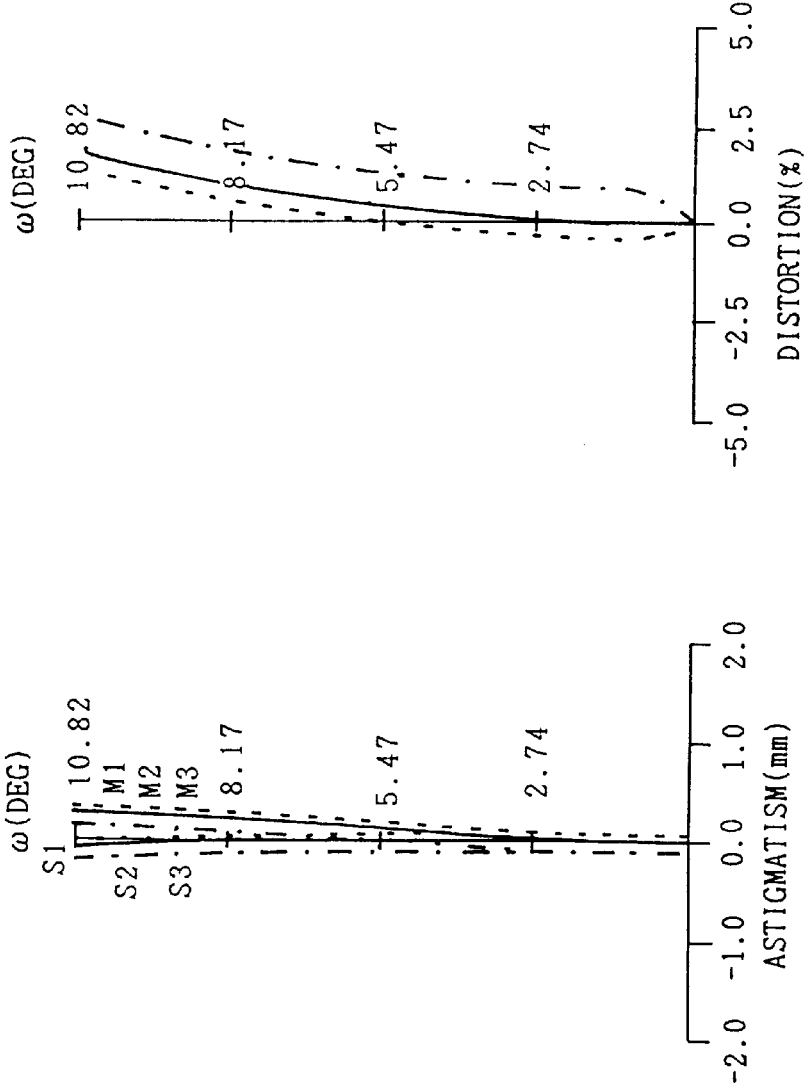
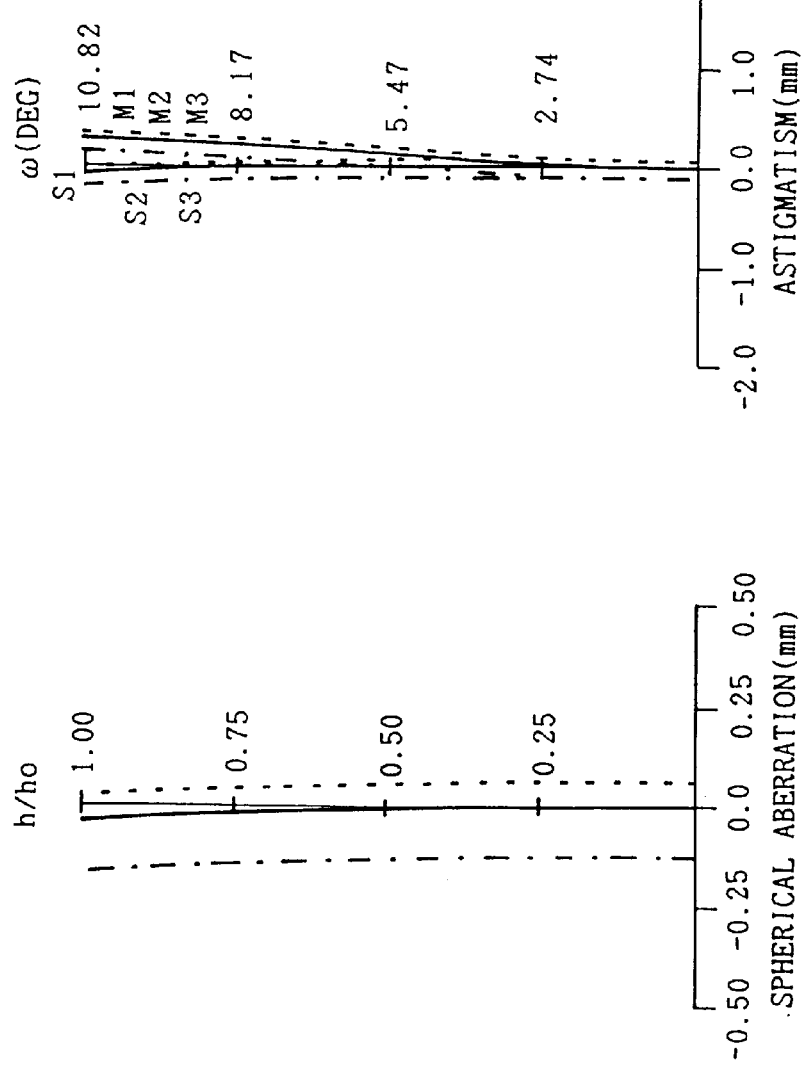
Fig. 15A Fig. 15B Fig. 15C

[W]

ASTIGMATISM

DISTORTION

LATERAL CHROMATIC ABERRATION

ASTIGMATISM

DISTORTION

LATERAL CHROMATIC ABERRATION

[W] Fig. 31A
ASTIGMATISM
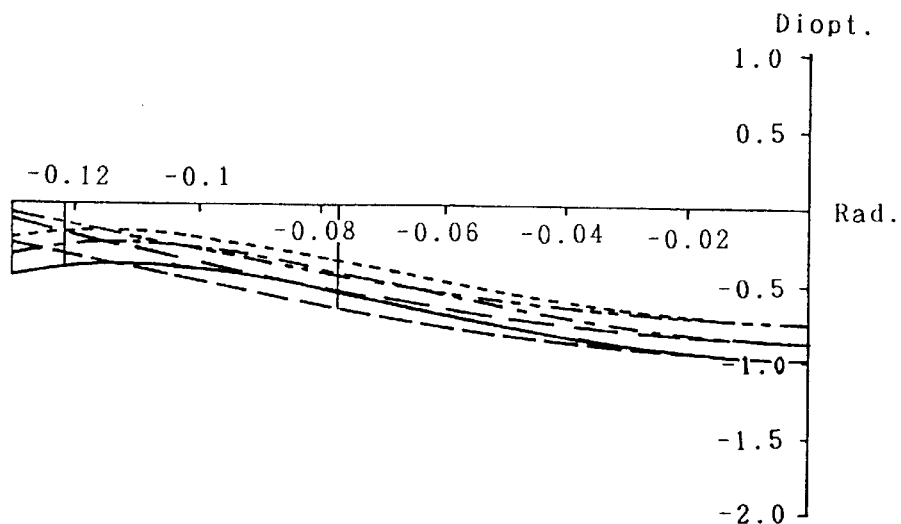
Fig. 31B
DISTORTION
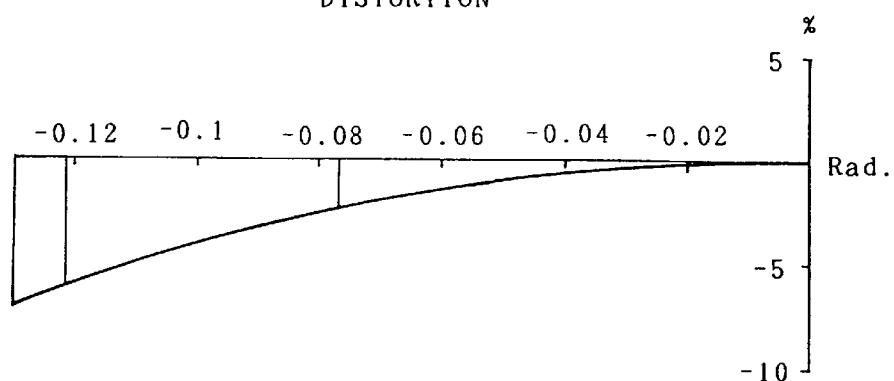
Fig. 31C
LATERAL CHROMATIC ABERRATION
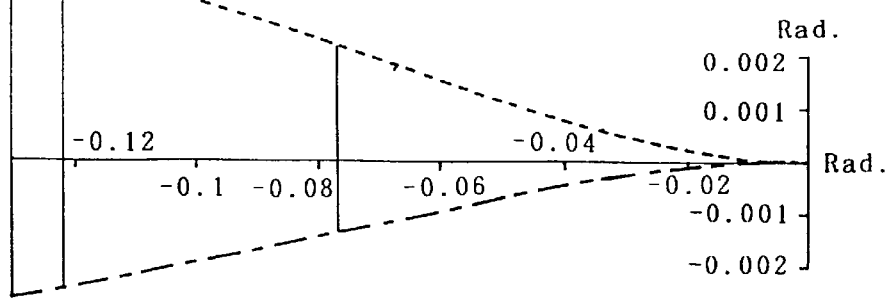

[ T ]   ASTIGMATISM

DISTORTION

LATERAL CHROMATIC ABERRATION

ASTIGMATISM

DISTORTION

LATERAL CHROMATIC ABERRATION

ASTIGMATISM

DISTORTION

LATERAL CHROMATIC ABERRATION

[W]

ASTIGMATISM

DISTORTION

LATERAL CHROMATIC ABERRATION

ASTIGMATISM

DISTORTION

LATERAL CHROMATIC ABERRATION

[W]

ASTIGMATISM

DISTORTION

LATERAL CHROMATIC ABERRATION

[T] ASTIGMATISM

DISTORTION

LATERAL CHROMATIC ABERRATION

5,966,244

VIEWFINDER OPTICAL SYSTEM

BACKGROUND OF THE INVENTION

1. Field of the Invention

The present invention relates to an eyepiece lens and a viewfinder optical system.

2. Description of the Prior Art

It is known to use a diffractive optical surface in an optical system. For example, U.S. Pat. No. 5,148,314 proposes an optical system consisting of a single lens having a diffractive optical surface, and so does a treatise by G. J. Swanson and W. B. Veldkamp, titled "Infrared Applications of Diffractive Optical Elements" SPIE proceedings, vol. 885, paper 22 (1988). On the other hand, U.S. Pat. Nos. 5,044,706 and No. 5,446,588 propose viewfinder optical systems that consist of an objective optical system and an eyepiece optical system and that correct chromatic aberration by the use of a diffractive optical surface. U.S. Pat. No. 5,044,706 proposes a viewfinder optical system in which the objective optical system has a diffractive optical surface, and U.S. Pat. No. 5,446,588 proposes a viewfinder optical system in which the eyepiece optical system has a diffractive optical surface.

In an example described in the above-mentioned treatise by Swanson et al., a single lens having a diffractive optical surface is used to correct chromatic aberration. In this example, the lens acts as an aperture diaphragm, and accordingly the position of the aperture diaphragm coincides with the position of the lens. In a practical viewfinder optical system, however, if the eyepiece lens is composed of a single lens, the pupil (which corresponds to the aperture diaphragm) is located away from the lens, and therefore chromatic aberration (in particular, lateral chromatic aberration) appears with a different pattern than in the example of Swanson et al.

On the other hand, in the viewfinder optical systems proposed in the above-mentioned U.S. Pat. No. 5,044,706 and U.S. Pat. No. 5,446,588, the eyepiece lens is composed of a plurality of lenses to achieve proper correction of aberration. By contrast, when the eyepiece lens of a viewfinder optical system is composed of a single lens, aberration needs to be corrected with only two lens surfaces, and therefore it is necessary, not only to use a diffractive optical surface to achieve proper correction of chromatic aberration, but also to elaborately design the power of the diffractive optical surface and the shapes of the lens surfaces to achieve proper correction of spherical aberration, coma aberration, astigmatism, curvature of field, and distortion.

From the viewpoint of the efficiency of diffraction of a diffractive optical surface, as well as the flare caused by rays resulting from diffraction of orders other than designed, it is desirable to use as few diffractive optical surfaces as possible. In the optical system proposed in the above-mentioned U.S. Pat. No. 5,148,314, the power of a diffractive optical surface and its distance from the aperture diaphragm are optimized (i.e. exactly defined) so that chromatic aberration (i.e. longitudinal chromatic aberration and lateral chromatic aberration) will be minimized with as few diffractive optical surfaces as possible. However, in an eyepiece lens, the pupil acts as an aperture diaphragm, and therefore the position of the aperture diaphragm (i.e. the position of the pupil) is not fixed. Accordingly, this optical system, when used as an eyepiece lens, does not achieve proper correction of chromatic aberration, as long as it is composed of a single lens.

In either of the optical systems proposed by the above-mentioned U.S. Pat. No. 5,044,706 and U. S. Pat. No. 5,446,588, the lens having the diffractive optical surface is given a strong power relative to the power of the entire viewfinder optical system, that is, the diffractive optical surface is used simply to correct chromatic aberration. The inventors of the present invention, however, noticed that the power of a lens having a diffractive optical surface can as well be used to solve the following problems associated with a viewfinder optical system as described above.

In general, when a viewfinder optical system is incorporated into a camera, the viewfinder optical system is, on its front and rear sides, additionally fitted with outer covering members such as protection glasses that are used as eyepiece-side and objective-side windows of the viewfinder of the camera. If parts of the viewfinder optical system can be directly fitted to the outer covering of the camera, there will be no need to use separate outer covering members such as the above-noted protection glasses, and, as a result, it is possible to reduce the cost of the camera. However, fitting optical members such as a viewfinder optical system directly to structural members such as outer covering members is not practical for the following reasons.

Optical members are far more sensitive to fitting errors than structural members, that is, optical members require far higher fitting accuracy than structural members. Accordingly, fitting an optical member directly to an outer covering member or any other elastic member of the camera results in poorer optical performance than designed.

Moreover, as the power of an optical member becomes stronger, it becomes more sensitive to fitting errors, that is, it requires higher fitting accuracy. In the optical systems of the patents cited previously, the lens having the diffractive optical surface is given a strong power, and accordingly it requires considerably high fitting accuracy. This means that, even though the diffractive optical surface serves to correct chromatic aberration properly, its use is meaningless as long as the lens is fitted to a more roughly fitted member of the due to a considerable degradation of optical performance.

If it were possible to fit a lens having a diffractive optical surface to a more roughly fitted member without degrading optical performance, then it would be possible to achieve not only proper correction of chromatic aberration, but also reduction of the number of the components, and thus the cost, of the camera. The possible advantages of this constitution are such that the inventors of the present invention were motivated to study it more closely until led to the conclusion that it is in fact possible to fit a lens having a diffractive optical surface to a more roughly fitted member if the power of that lens is made weaker than in conventional viewfinder optical systems but not weaker than is necessary to achieve sufficient correction of chromatic aberration.

A Kepler-type real-image viewfinder optical system in which the image of an object is formed by an objective lens and is then magnified by an eyepiece lens for observation is provided with an erecting optical system such as an inverting prism to reflect the vertical and horizontal directions of the object correctly in the observed image. The use of the erecting optical system, however, inevitably makes the viewfinder optical system as a whole larger.

It is known that a lens system can be made compact by providing a curved surface on a prism. For example, U.S. Pat. No. 5,206,675 proposes an example in which a Porro prism is provided with a curved surface to omit a separate eyepiece lens.

However, providing a prism with a curved surface causes large chromatic aberration.

SUMMARY OF THE INVENTION

An object of the present invention is to provide an eyepiece lens and a viewfinder optical system in which chromatic aberration and other types of aberration are properly corrected by the use of as few lens elements as possible.

Another object of the present invention is to provide a Kepler-type viewfinder optical system in which correction of chromatic aberration as well as reduction of the number of components of a camera is achieved by the use of a diffracting optical surface.

A further object of the present invention is to provide a compact Kepler-type real-image viewfinder optical system in which chromatic aberration is properly corrected.

To achieve the above objects, according to one aspect of the present invention, in an eyepiece lens consisting of a single lens element having a positive optical power, the signal the single lens element has a refractive power of an aspherical surface and has a diffractive power such that the following condition is fulfilled:

$$-0.0006<\{1/(fl\cdot v)\}+\phi DOE/vDOE<0.0002.$$

In the expression above, fl represents the focal length resulting from both refractive effect and diffractive effect of the eyepiece lens, v represents the Abbe number of the eyepiece lens, $\phi$DOE represents the power resulting from the diffractive effect of the eyepiece lens, and vDOE represents the Abbe-number-equivalent value resulting from the diffractive effect of the eyepiece lens.

According to another aspect of the present invention, in an eyepiece lens consisting of a single lens element having a positive optical power, the single lens element has a refractive power of an aspherical surface and has a diffractive power so that chromatic aberration resulting from the refractive power of an aspherical surface is canceled by chromatic aberration resulting from the diffractive power.

According to still another aspect of the present invention, in a real-type viewfinder optical system comprising an eyepiece lens system having a lens element which has a surface having a diffractive power, the following condition is fulfilled:

$$0.01<|\phi DOE/\phi e|<0.16.$$

In the expression above, $\phi$DOE represents the composite power of the surface having a refractive power and a surface having a diffractive power within the lens element, and $\phi$e represents the composite power of surfaces having refractive powers and surfaces having diffractive powers within the entire eyepiece lens system.

According to a further aspect of the present invention, in a real-type viewfinder optical system comprising an objective lens system having a lens element which has a surface having a diffractive power, the following condition is fulfilled:

$$0.01<|\phi DOE/\phi o|<0.16.$$

In the expression above, $\phi$DOE represents the composite power of the surface having a refractive power and a surface having a diffractive power within the lens element, and $\phi$e represents the composite power of surfaces having refractive powers and surfaces having diffractive powers within the entire objective lens system.

BRIEF DESCRIPTION OF THE DRAWINGS

This and other objects and features of this invention will become clear from the following description, taken in conjunction with the preferred embodiments with reference to the accompanied drawings in which:

FIGS. 8A to 8C are longitudinal aberration diagrams of the eyepiece lens of the first embodiment;

FIGS. 12A to 12C are longitudinal aberration diagrams of the eyepiece lens of the fifth embodiment;

FIGS. 13A to 13C are longitudinal aberration diagrams of the eyepiece lens of the sixth embodiment;

FIGS. 15A to 15C are longitudinal aberration diagrams of the eyepiece lens of a first example for comparison;

FIG. 25 is a perspective view showing the front-side appearance of a camera employing the eyepiece optical system of the ninth embodiment;

FIGS. 31A to 31C are diagrams showing the aberration observed in the eleventh embodiment, at the wide-angle end;

DESCRIPTION OF THE PREFERRED EMBODIMENTS

Figure 1:
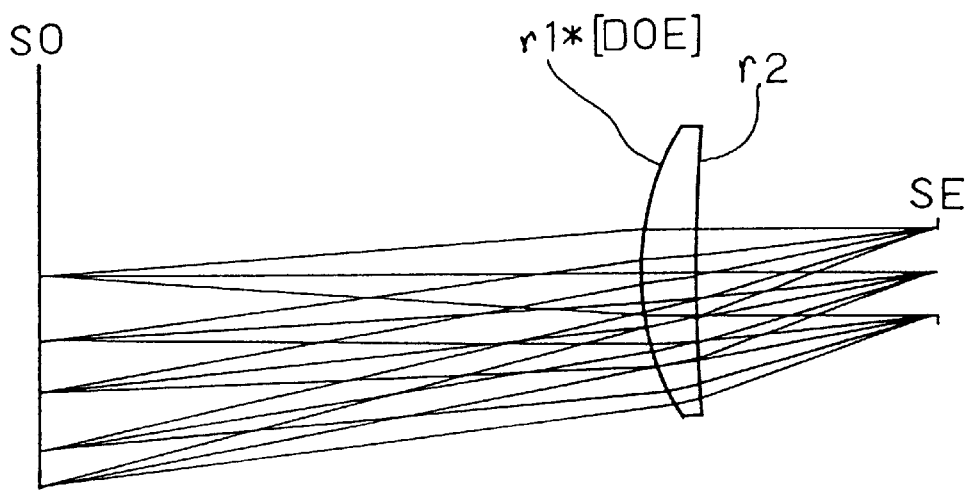
FIG. 1 is an optical path diagram of the eyepiece lens of a first embodiment of the invention.
Figure 2:
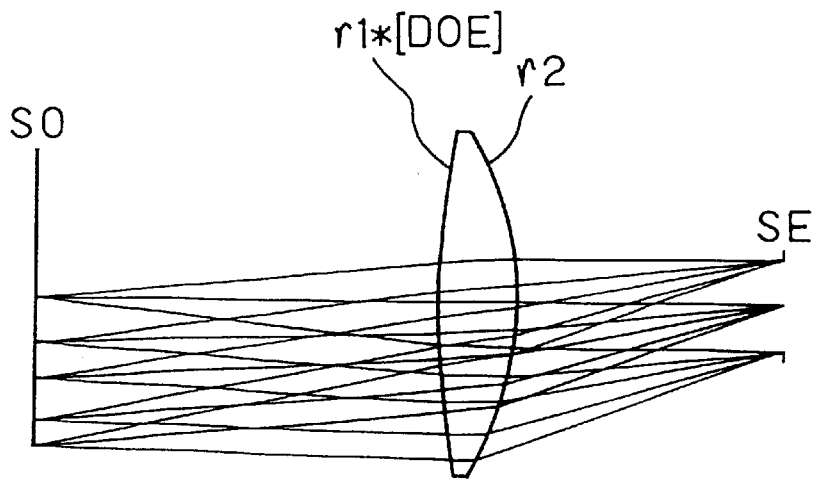
FIG. 2 is an optical path diagram of the eyepiece lens of a second embodiment of the invention.
Figure 3:
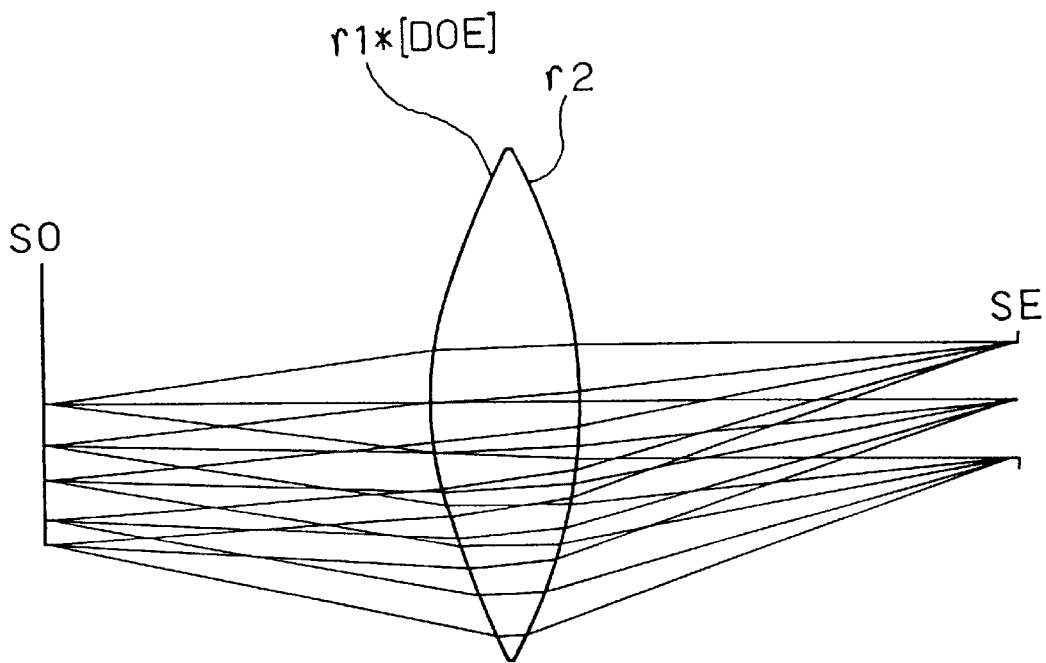
FIG. 3 is an optical path diagram of the eyepiece lens of a third embodiment of the invention.
Figure 4:
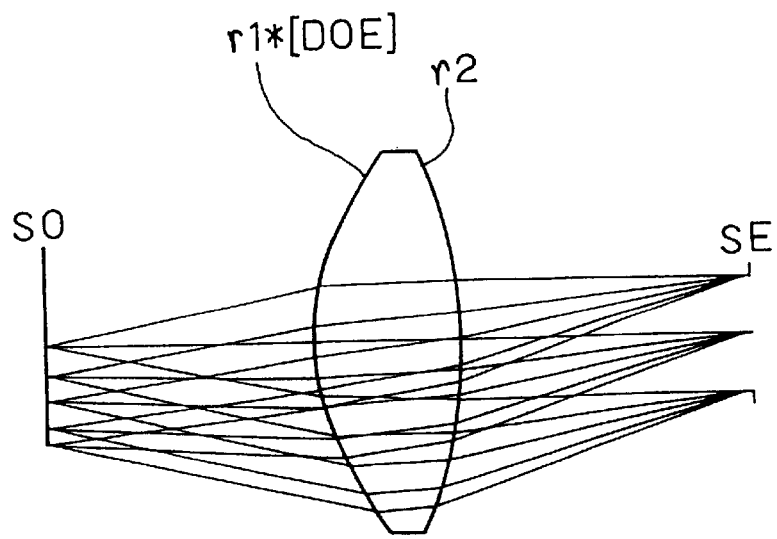
FIG. 4 is an optical path diagram of the eyepiece lens of a fourth embodiment of the invention.
Figure 5:
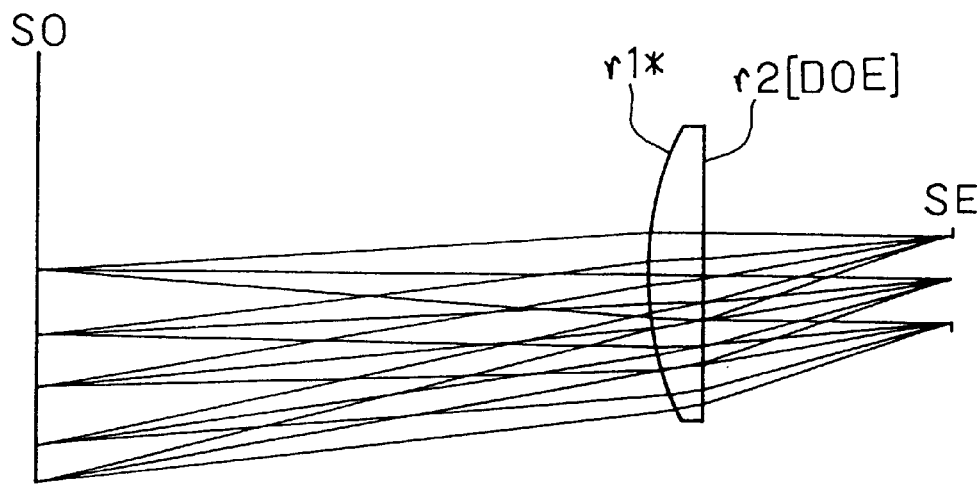
FIG. 5 is an optical path diagram of the eyepiece lens of a fifth embodiment of the invention.
Figure 6:
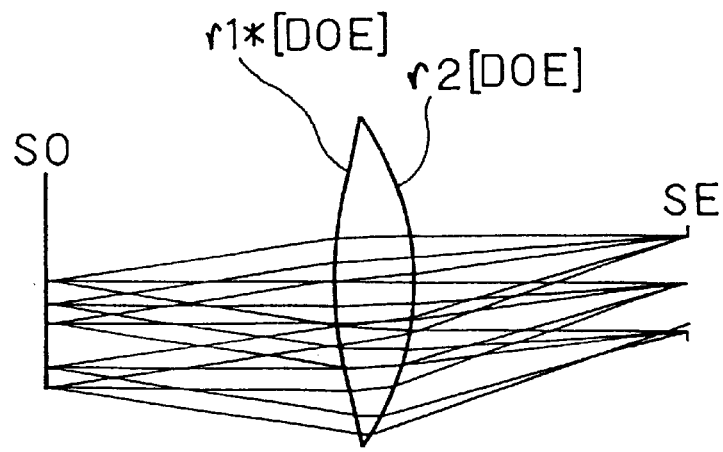
FIG. 6 is an optical path diagram of the eyepiece lens of a sixth embodiment of the invention.
Figure 7:
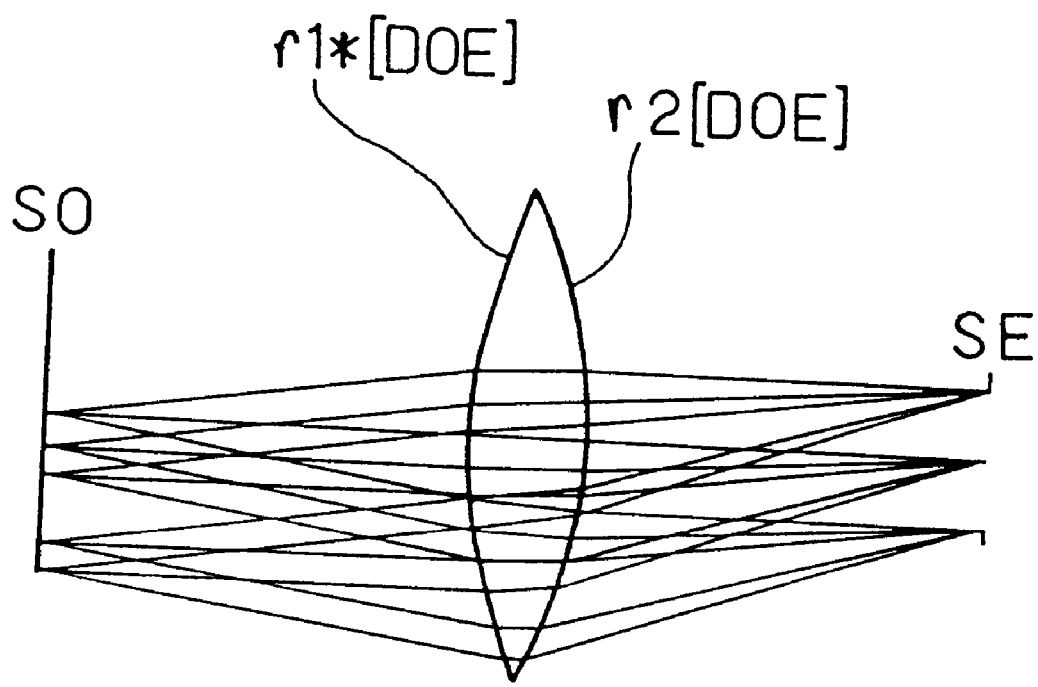
FIG. 7 is an optical path diagram of the eyepiece lens of a seventh embodiment of the invention.
Figures 9A, 9B, 9C:
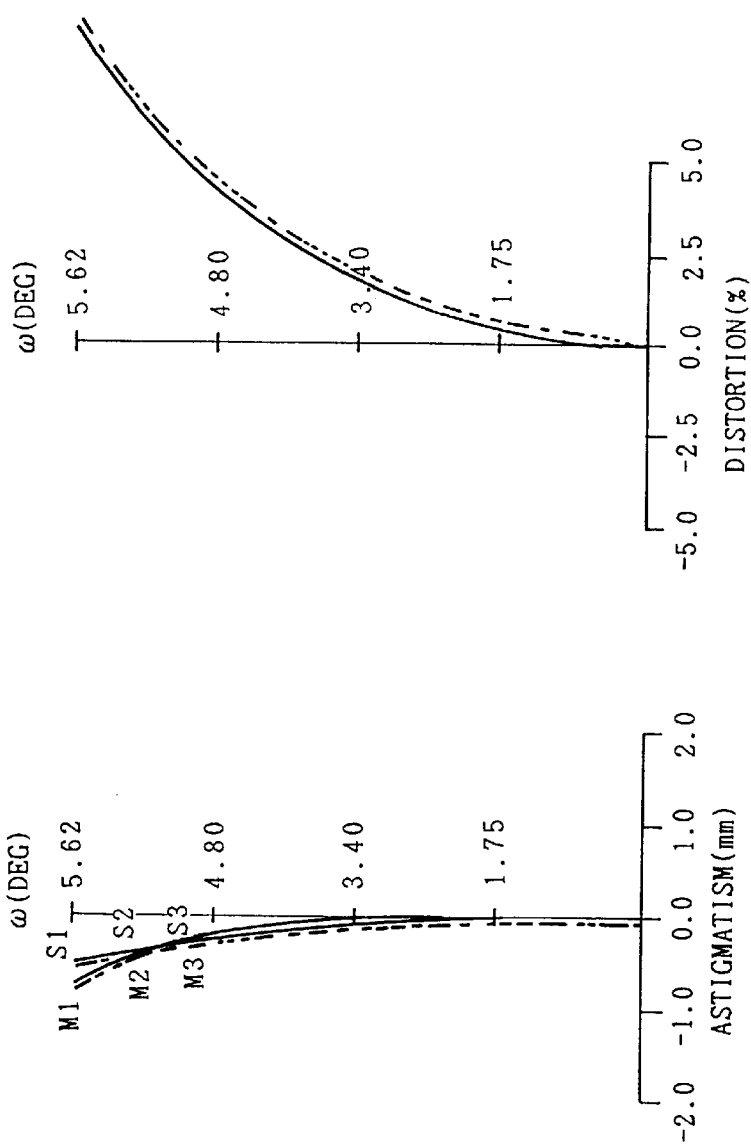
FIGS. 9A to 9C are longitudinal aberration diagrams of the eyepiece lens of the second embodiment.
Figure 10C:
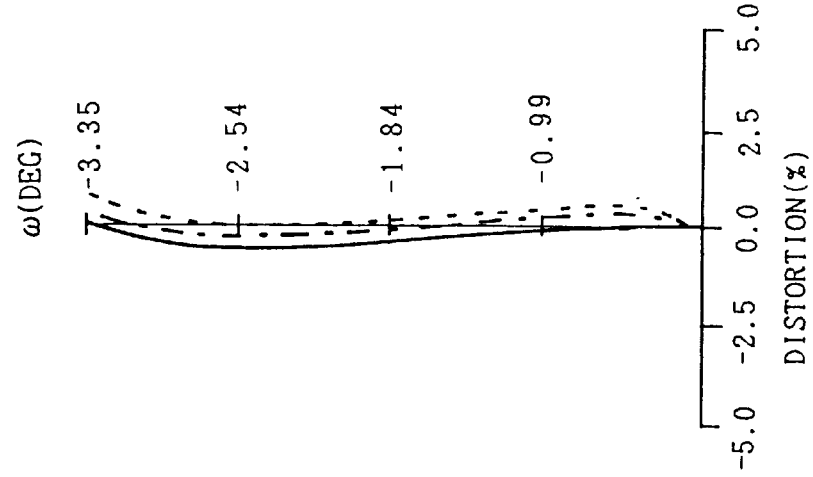
FIGS. 10A to 10C are longitudinal aberration diagrams of the eyepiece lens of the third embodiment.
Figure 10B:
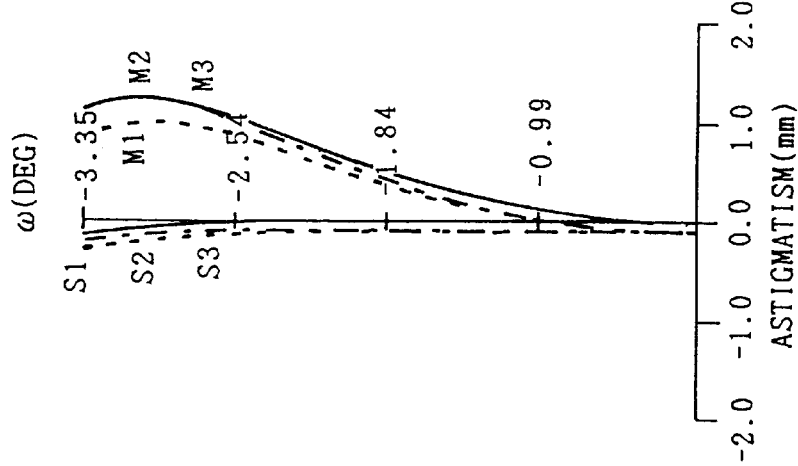
Figure 10A:
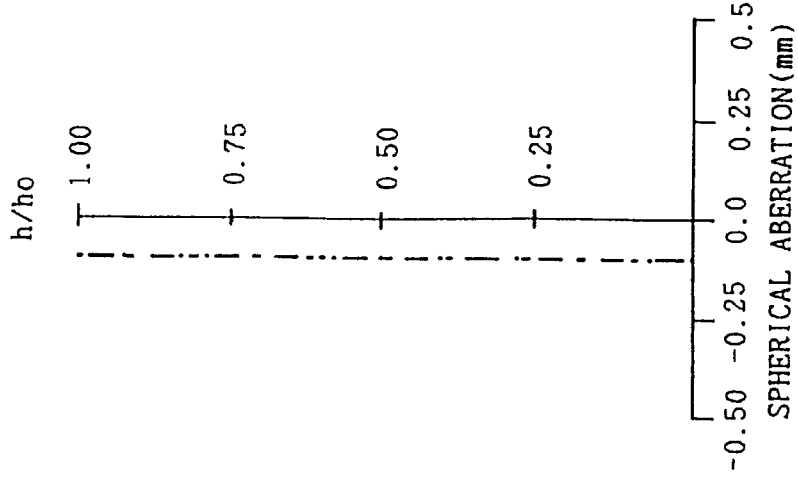
Figure 11C:
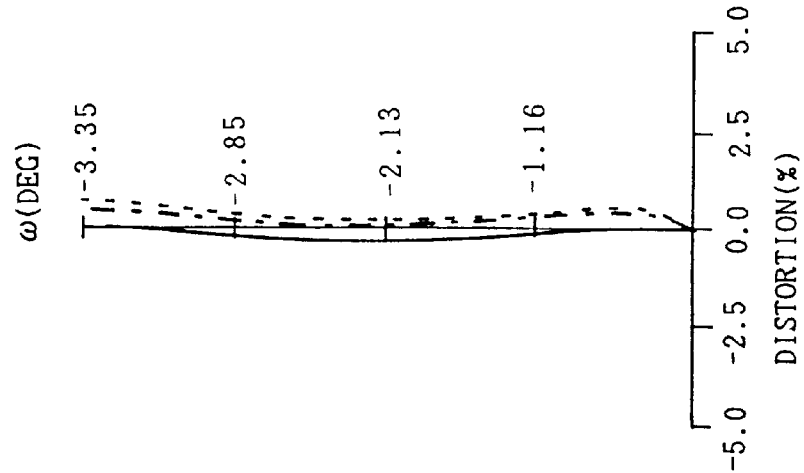
FIGS. 11A to 11C are longitudinal aberration diagrams of the eyepiece lens of the fourth embodiment.
Figure 11B:
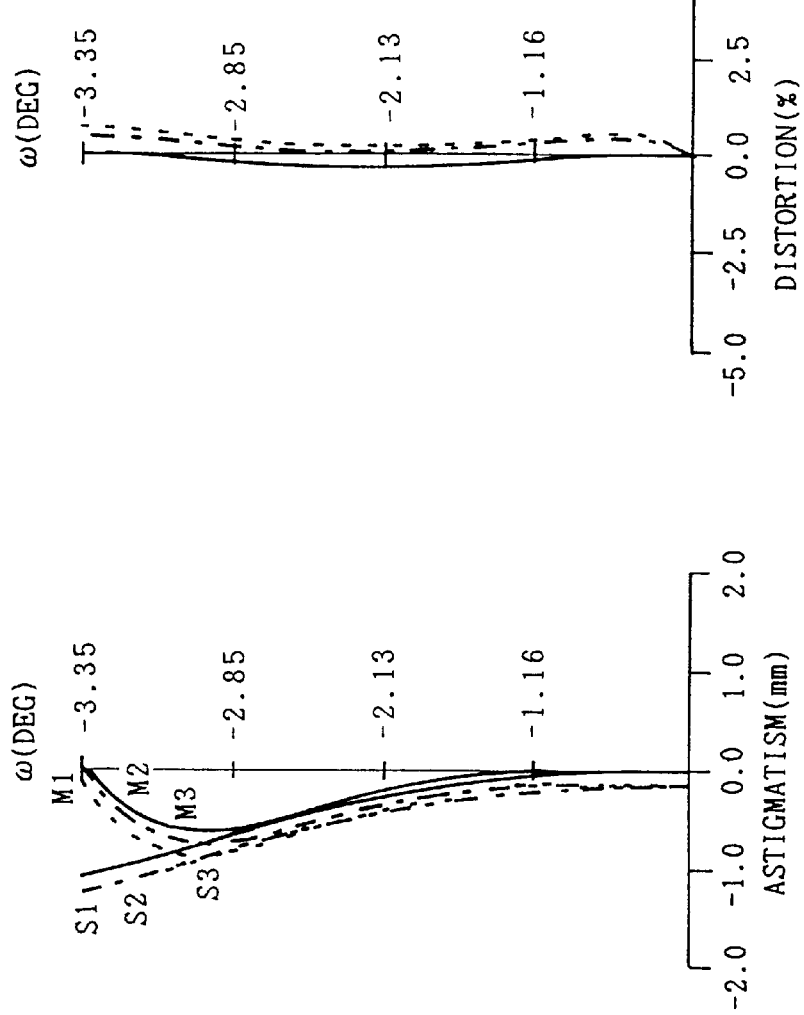
Figure 11A:
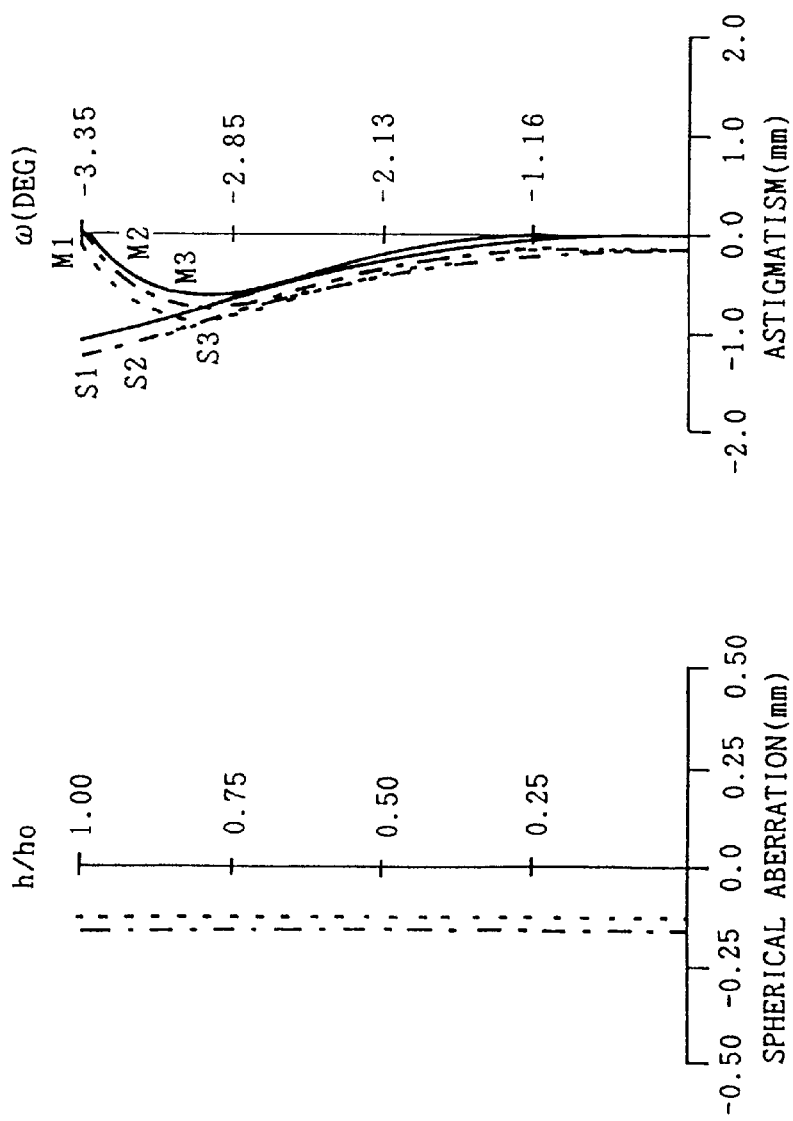
Figure 14:
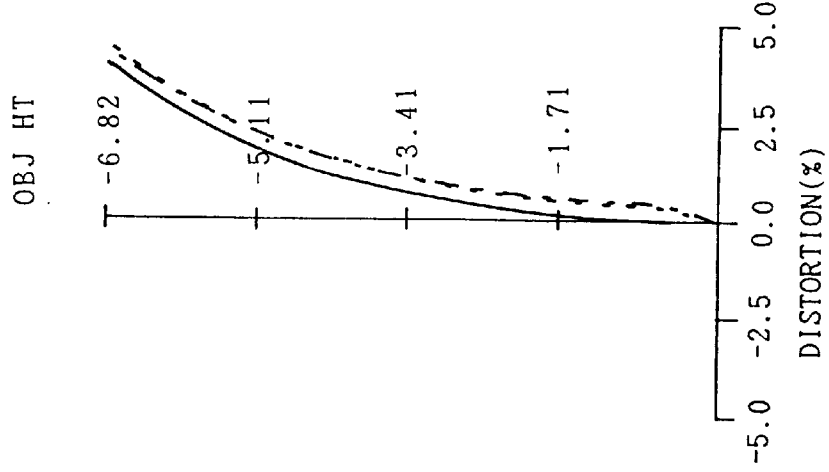
FIGS. 14A to 14C are longitudinal aberration diagrams of the eyepiece lens of the seventh embodiment.
Figure 14:
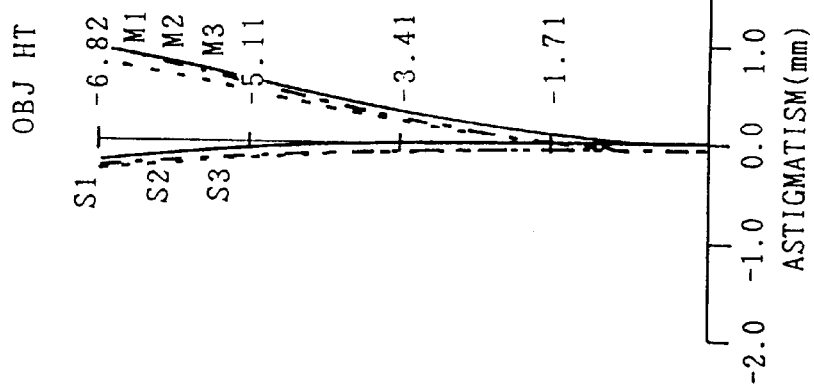
Figure 14:
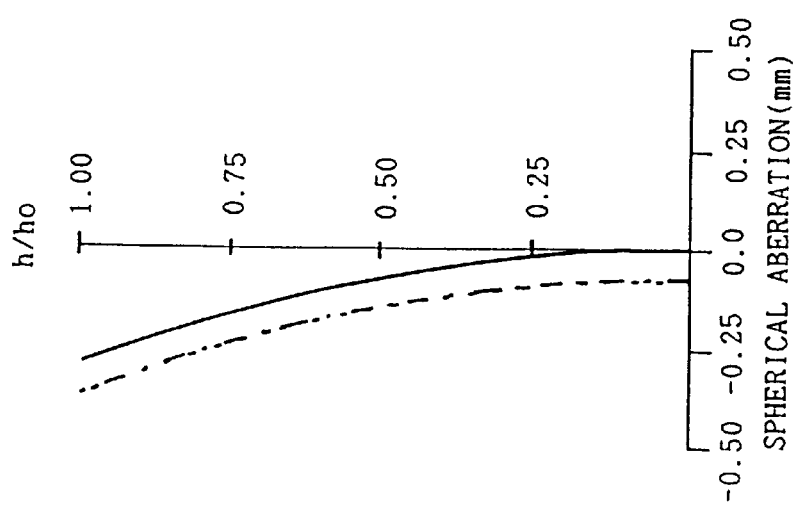
Figure 16C:
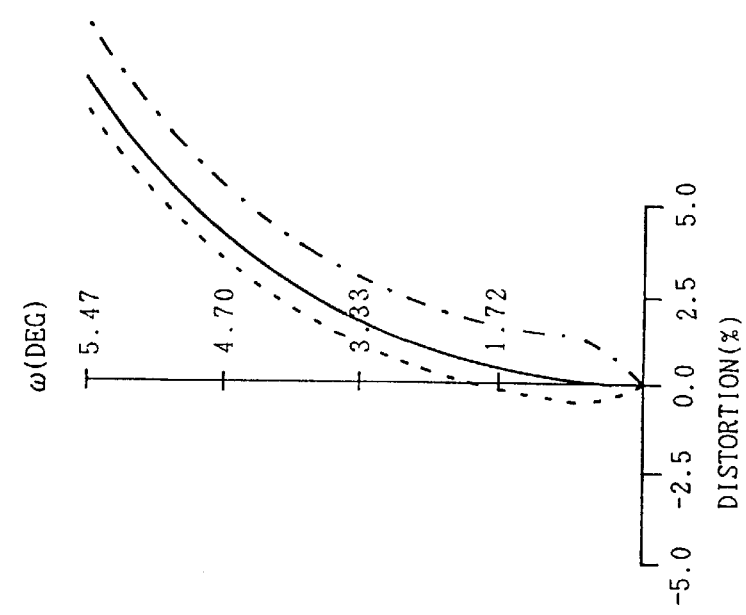
FIGS. 16A to 16C are longitudinal aberration diagrams of the eyepiece lens of a second example for comparison.
Figure 16B:
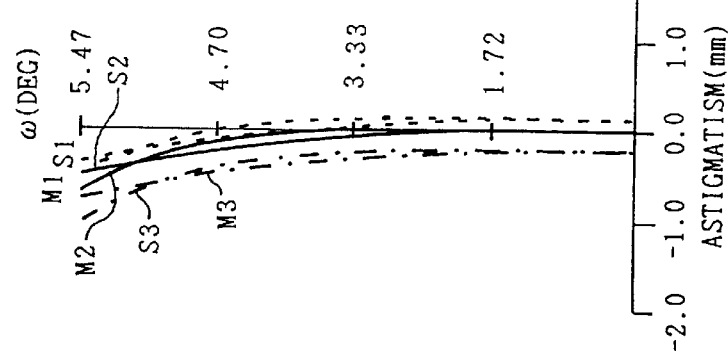
Figure 16A:
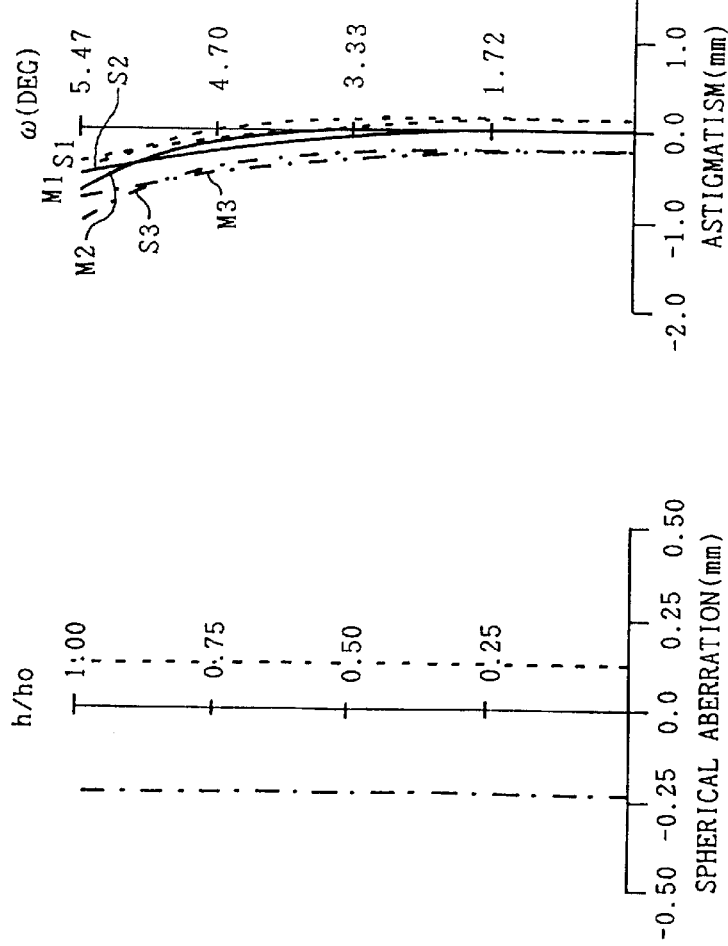
Figure 17C:
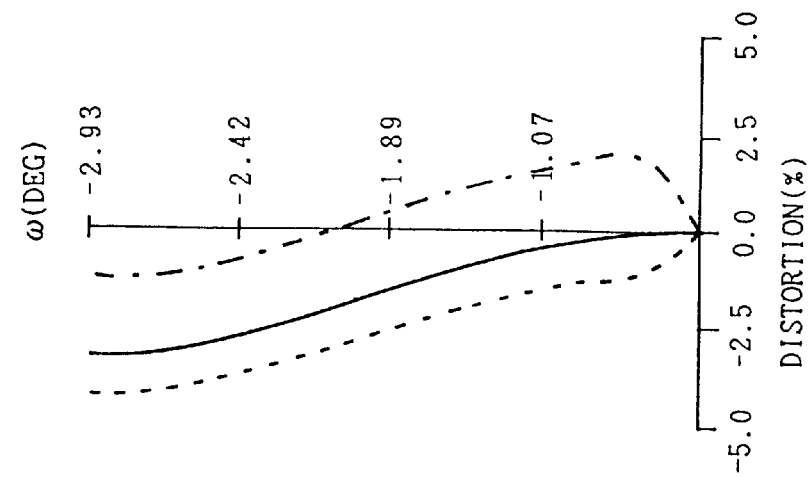
FIGS. 17A to 17C are longitudinal aberration diagrams of the eyepiece lens of a third example for comparison.
Figure 17B:
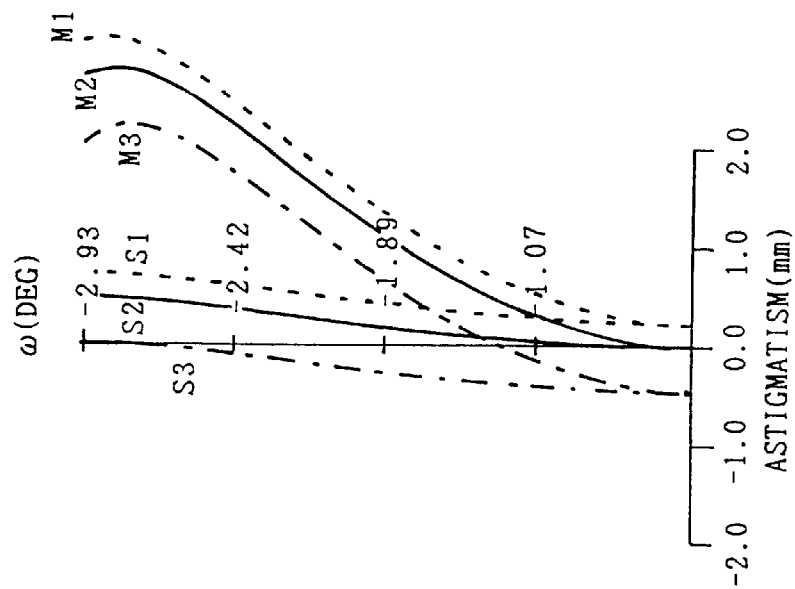
Figure 17A:
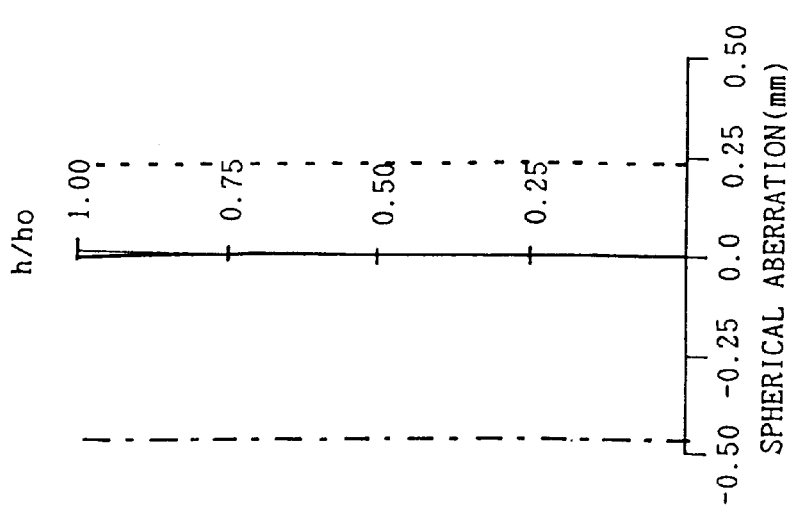
Figure 18A:
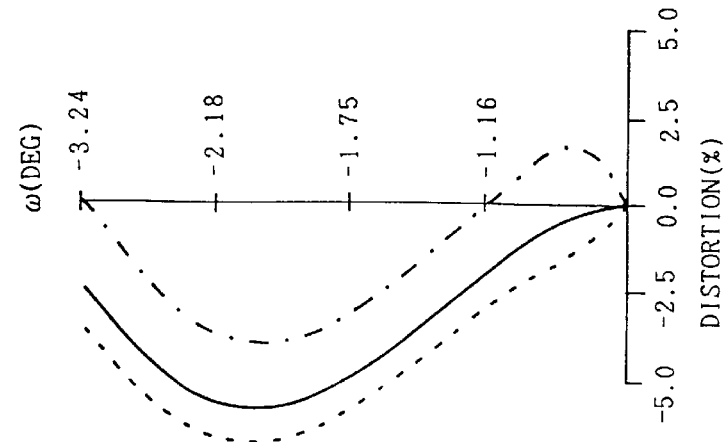
FIGS. 18A to 18C are longitudinal aberration diagrams of the eyepiece lens of a fourth example for comparison.
Figure 18B:
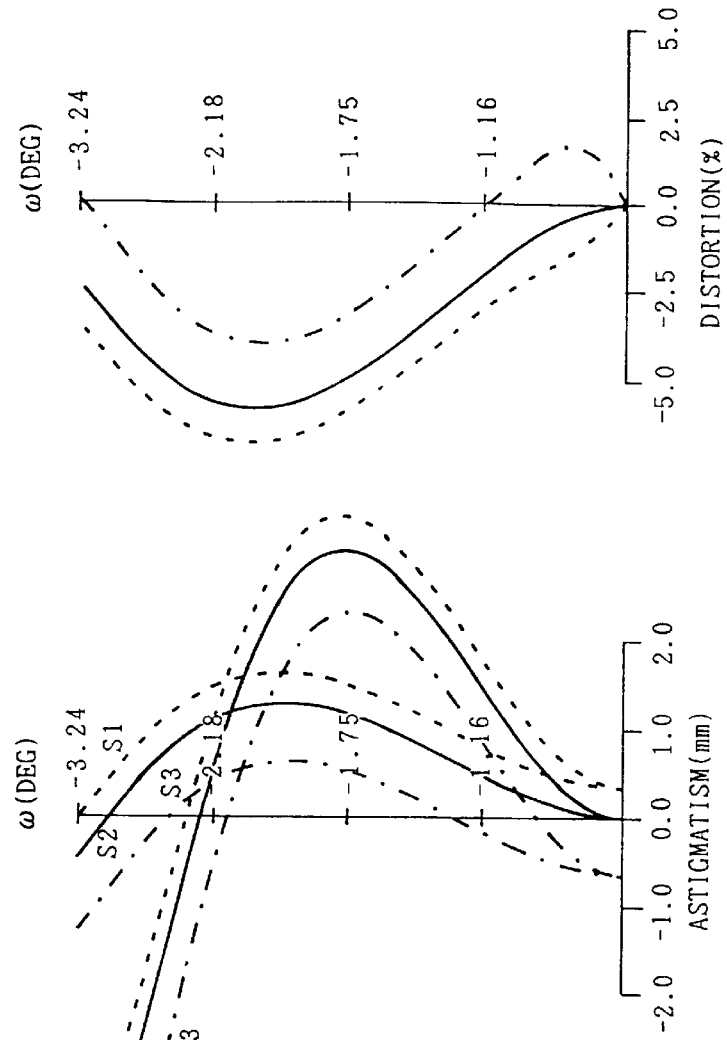
Figure 18C:
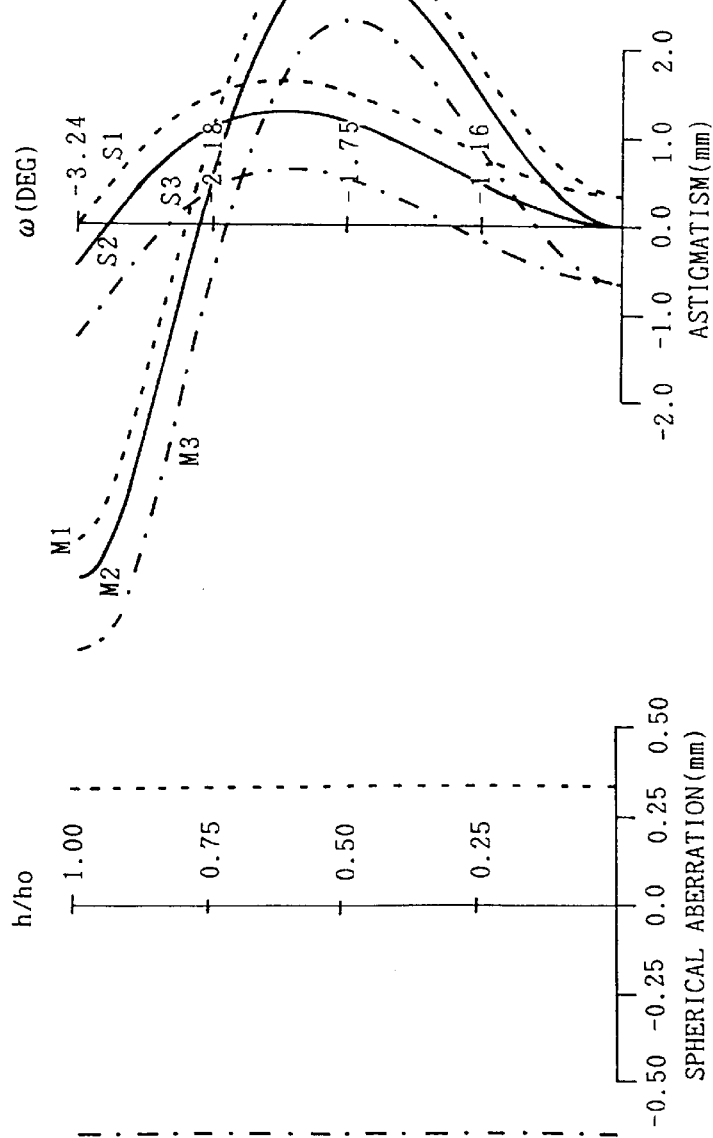

Hereinafter, embodiments of the present invention will be described with reference to the drawings.

<Embodiments 1 to 7>

FIGS. 1 to 7 are optical path diagrams of the eyepiece lenses of first to seventh embodiments of the invention. In FIGS. 1 to 7, ri (i=1, 2) represents the i-th surface from the object plane SO. A surface ri marked with an asterisk (*) is an aspherical surface, and a surface marked with a symbol [DOE] is a diffractive optical surface formed on a refractive optical surface.

The eyepiece lens of the first embodiment is composed of a single positive meniscus lens element that is convex toward the object plane SO. The eyepiece lenses of the second, third, fourth, sixth, and seventh embodiments are each composed of a single positive biconvex lens element. The eyepiece lens of the fifth embodiment is composed of a single positive plano-convex lens element that is convex toward the object plane SO.

In the first to fourth embodiments, the object plane SO side surface of the eyepiece lens is a diffractive optical surface formed on an aspherical surface.

In the fifth embodiment, the object plane SO side surface of the eyepiece lens is an aspherical surface, and the pupil SE side surface (i.e. the flat surface) is a diffractive optical surface.

In the sixth and seventh embodiments, both of the two surfaces of the eyepiece lens are diffractive optical surfaces, of which the one on the object plane SO side is a diffractive optical surface formed on an aspherical surface. In addition, in the sixth embodiment, the diffractive optical surface on the object plane SO side has a positive diffractive power, and the diffractive optical surface on the pupil SE side has a negative diffractive power; in the seventh embodiment, the diffractive optical surfaces on both sides have a positive diffractive power. Note that it is possible to obtain a viewfinder optical system by combining any of the eyepiece lenses of the first to seventh embodiments with an objective lens in such a way that the image plane of the latter is formed on the object plane SO of the former.

There are two types of chromatic aberration: longitudinal chromatic aberration and lateral chromatic aberration. Assume that the ray that passes through the pupil at its center is referred to as the ideal principal ray, and the ray that passes through the pupil perpendicularly thereto is referred to as the ideal marginal ray. Then, the degree of the longitudinal chromatic aberration is represented by the longitudinal chromatic aberration coefficient LC defined by formula (A) below, and the degree of the lateral chromatic aberration is represented by the lateral chromatic aberration coefficient TC defined by formula (B) below:

$$LC=\Sigma\{h^2(\phi/\nu)\} \qquad (A)$$

$$TC=\Sigma\{h \cdot h'(\phi/\nu)\} \qquad (B)$$

where h represents the height at which the ideal marginal ray passes through each lens element, h' represents the height at which the ideal principal ray passes through each lens element, $\phi$ represents the power of each lens element, and $\nu$ represents the Abbe number (i.e. dispersion) of each lens element.

In an optical system that includes only refractive optical surfaces, both $h^2$ and $(\phi/\nu)$ in formula (A) are positive (i.e. $h^2>0$ and $(\phi/\nu)>0$), and accordingly any chromatic aberration occurring in the eyepiece lens is added together. This means that chromatic aberration cannot be corrected with positive lens elements alone.

In an optical system that includes both refractive optical surfaces and diffractive optical surfaces, the longitudinal chromatic aberration and lateral chromatic aberration occurring on the diffractive optical surfaces of lens elements are added to the respective types of chromatic aberration as expressed by formulas (A) and (B) above. Accordingly, in an optical system that includes both refractive optical surfaces and diffractive optical surfaces, the longitudinal chromatic aberration is represented by the longitudinal chromatic aberration coefficient LC defined by formula (C) below, and the lateral chromatic aberration is represented by the lateral chromatic aberration coefficient TC defined by formula (D) below:

$$LC=\Sigma\{h^2(\phi r/\nu r+\phi k/\nu k)\} \qquad (C)$$

$$TC=\Sigma\{h \cdot h'(\phi r/\nu r+\phi k/\nu k)\} \qquad (D)$$

where $\phi r$ represents the power of the refractive optical surface of each lens element, $\nu r$ represents the Abbe number of the refractive optical surface of each lens element, $\phi k$ represents the power of the diffractive optical surface of each lens element, and $\nu k$ represents the Abbe-number-equivalent value of the diffractive optical surface of each lens element.

The Abbe-number-equivalent value νk introduced above represents the dispersion of a diffractive optical surface, and is defined by formula (E) below:

$$\nu k = \lambda d / (\lambda F - \lambda c) \tag{E}$$

where $\lambda d$ represents the wavelength of the d-line (=588 nm), $\lambda F$ represents the wavelength of the F-line (=486 nm), and $\lambda c$ represents the wavelength of the c-line (=656 nm).

From formula (E), it is understood that a diffractive optical surface has a negative Abbe-number-equivalent value as small as νk=−3.45. Since an ordinary lens including only refractive optical surfaces typically has an Abbe number (representing the dispersion) in a range from 20 to 80, it is possible, by combining refractive optical surfaces with diffractive optical surfaces, to cancel the positive term $\phi r / \nu r$ with the negative term $\phi k / \nu k$. This means that chromatic aberration that occurs on refractive optical surfaces can be corrected by diffractive optical surfaces.

In the first to seventh embodiments, in which the eyepiece lens is composed of a single lens element, the diffractive power of a diffractive optical surface can be used to reduce the refractive power of the two surfaces of the lens element. That is, by providing an eyepiece lens composed of a single lens element with a diffractive optical surface, the curvature of its refractive optical surfaces can be made gentler. This contributes to reduction of aberration other than chromatic aberration, in particular to a significant reduction of spherical aberration, astigmatism, curvature of field, distortion, coma aberration, and other types of aberration in eyepiece lenses having short focal lengths (e.g. 30 mm or shorter).

Moreover, in the first to seventh embodiments, the eyepiece lens is provided with an aspherical surface whose power decreases from the center to the edge. This further improves the aberration characteristics of the eyepiece lens. The aspherical surface does not need to have exactly the same shape as in those embodiments, but the use of an aspherical surface whose power decreases from the center to the edge is preferable, because it corrects both chromatic aberration and other types of aberration.

To correct both chromatic aberration and other types of aberration as noted above by the use of a diffractive optical surface, it is essential to distribute optical power over the diffractive optical surface in a way that achieves proper balance between chromatic aberration (lateral chromatic aberration in particular) and other types of aberration (such as spherical aberration). In this respect, the eyepiece lenses of the first to seventh embodiments are designed to satisfy condition (1) below:

$$-0.0006 < \{1/(fl \cdot \nu)\} + \phi DOE / \nu DOE < 0.0002 \tag{1}$$

where fl represents the focal length resulting from both refractive effect and diffractive effect of the eyepiece lens, ν represents the Abbe number of the eyepiece lens, φDOE represents the power resulting from the diffractive effect of the eyepiece lens, and νDOE represents the Abbe-number-equivalent value resulting from the diffractive effect of the eyepiece lens.

Condition (1) defines the proper distribution of the power over the diffractive optical surface in an eyepiece lens composed of a single lens element. This condition assumes that the above-mentioned balance is represented by the permissible variation of chromatic aberration with the wavelength, and that, in an ordinary eyepiece lens, the variation of chromatic aberration with the wavelength is tolerated within a range of around 10 minutes.

If condition (1) is satisfied, it is possible to properly correct chromatic aberration as well as spherical aberration, astigmatism, curvature of field, and distortion. If the upper limit of condition (1) is exceeded, the diffractive optical surface undercorrects aberration, with the result that the chromatic aberration occurring on the diffractive optical surface is not corrected sufficiently. If the lower limit of condition (1) is exceeded, the diffractive optical surface overcorrects aberration, with the result that chromatic aberration due to overcorrection appears.

As described above, in the first to seventh embodiments, the eyepiece lens is provided with an aspherical surface and a diffractive optical surface that satisfies condition (1). As a result, despite being composed of a single lens element, the eyepiece lenses of these embodiments can correct properly not only chromatic aberration but also spherical aberration, astigmatism, curvature of field, and distortion. By using such an eyepiece lens, it is possible to realize a viewfinder optical system that is composed of a minimal number of lens elements and nevertheless has superior aberration characteristics.

Furthermore, if, as in the first embodiment, the eyepiece lens is formed in a meniscus shape, it is possible to shorten the focal length of the eyepiece lens. If, as in the second to fourth embodiments, the eyepiece lens is formed in a biconvex shape, it is possible to secure a sufficiently long eye relief (i.e. the distance from the pupil SE to the eyepiece lens). If, as in the fifth embodiment, the eyepiece lens is formed in a plano-convex shape and is provided with a diffractive optical surface on its flat surface, it is possible to form the diffractive optical surface with ease.

As noted previously, in the sixth embodiment, the eyepiece lens is provided with diffractive optical surfaces on both sides, and those two surfaces have diffractive powers of opposite signs. As a result, the image planes resulting from diffraction of orders other than designed are placed sufficiently away from the image plane as designed, and thus the images resulting from diffraction of orders other than designed become less noticeable.

On the other hand, as noted previously, in the seventh embodiment, the eyepiece lens is provided with diffractive optical surfaces on both sides, and those two surfaces have diffractive powers of the same sign. As a result, the image planes resulting from diffraction of orders other than designed are placed very close to the image plane as designed, and thus the images resulting from diffraction of orders other than designed become less noticeable.

The eyepiece lenses of the first to seventh embodiments (FIGS. 1 to 7) will be described in more detail below with reference to their construction data and aberration diagrams. The construction data of the first to seventh embodiments are listed in Tables 1 to 7, together with their respective focal length fl and the value corresponding to condition (1). Note that, for the sixth and seventh embodiments, φDOE represents the composite power resulting from the diffractive effect of the two lens surfaces.

In the construction data, ri (i=0, 1, 2, 3) represents the radius of curvature of the i-th surface from the object plane SO, di (i=0, 1, 2) represents the i-th axial distance from the object plane SO, and Ni (i=1) and νi (i=1) respectively represent the refractive index (Ne) for the e-line and the Abbe number (νd) for the d-line of the eyepiece lens.

Moreover, in the construction data, a surface whose radius of curvature ri is marked with an asterisk (*) is an aspherical surface, and its shape is defined by formula (AS) below.

$$Y = \frac{C \cdot X^2}{1 + (1 - \epsilon \cdot X^2 \cdot C^2)^{1/2}} + \sum_i Ai \cdot X^i \quad \text{(AS)}$$

where

Y represents the displacement along the optical axis from the reference surface, X represents the height in a direction perpendicular to the optical axis, C represents the paraxial curvature, ε represents the quadric surface parameter, and Ai represents the aspherical coefficient of the i-th order.

Furthermore, in the construction data, a surface whose radius of curvature ri is marked with a symbol [DOE] is a surface where a diffractive optical surface is formed on a refractive optical surface, and the pitch of the diffractive optical surface depends on the phase shape thereof that is defined by formula (DS) below.

$$\psi(H) = 2\pi \cdot \left( \sum_i CiH^{2i} \right) \Big/ \lambda 0 \quad \text{(DS)}$$

where

ψ(H) represents the phase function of the diffractive optical surface,

Ci represents the phase function coefficient of the diffractive optical surface of the 2i-th order, H represents the height in a direction perpendicular to the optical axis, and λ0 represents the design reference wavelength (=546.07× $10^{-6}$ mm).

FIGS. 8A–8C to 14A–14C are aberration diagrams showing the aberration observed in the first to seventh embodiments, respectively. FIGS. 15A–15C to 18A–18C are aberration diagrams showing the aberration observed in first to fourth examples for comparison, respectively. The first to fourth examples for comparison correspond to the first to fourth embodiments, and are constituted so that their focal length resulting from refractive effect alone is equal to the composite focal length resulting from both refractive and diffractive effect in the corresponding embodiments. For example, the first example for comparison has the same focal length as the first embodiment, but without the use of a diffractive optical surface.

In the aberration diagrams, a broken line indicates aberration for the C-line (wavelength λC=656.3 nm), a solid line indicates aberration for the e-line (wavelength λe=546.1 nm), and a dash-dot line indicates aberration for the g-line (wavelength λg=435.8 nm). In the aberration diagrams, aberration is presented in millimeters (mm) on the assumption that an ideal lens having a focal length $f_{id}$=20 mm is placed at the position of the pupil SE so that the whole system can be handled as an imaging lens system.

In the diagrams showing spherical aberration, along the horizontal axis is taken the displacement (mm) along the optical axis from the paraxial image plane, and along the vertical axis is taken h/h0, that is, the height h on the plane of the pupil (SE) as standardized relative to the maximum height h0. In the diagrams showing astigmatism, along the horizontal axis are taken the displacement (S1 to S3, in mm) of sagittal image points and the displacement (M1 to M3, in mm) of meridional image points from the paraxial image plane, and along the vertical axis is taken, for the first to fifth embodiments and for the first to fourth examples for comparison, the angle of incidence ω (in degrees) on the plane of the pupil (SE), and, for the sixth and seventh embodiments, the object height OBJ HT (mm). In the diagrams showing distortion, along the horizontal axis is taken the proportion (%) of distortion, and along the vertical axis is taken, for the first to fifth embodiments and for the first to fourth examples for comparison, the angle of incidence ω (in degrees) on the plane of the pupil (SE), and, for the sixth and seventh embodiments, the object height OBJ HT (mm).

In an eyepiece lens composed of a single lens element and provided with a diffractive optical surface, the height h of the ideal marginal ray remains almost constant even when the eye relief (i.e. the distance from the pupil SE to the eyepiece lens) is varied. On the other hand, the height h' of the ideal principal ray increases as the eye relief increases. Accordingly, whereas longitudinal chromatic aberration remains almost constant even when the eye relief is varied, lateral chromatic aberration increases as the eye relief increases. As a result, in an image observed through the viewfinder, color misplacement due to lateral chromatic aberration is more noticeable than color misplacement due to longitudinal chromatic aberration. Since, in the design of an eyepiece lens, the eye relief is set to the maximum value that allows an image to be observed without eclipse due to the lens frame or other, the lateral chromatic aberration that appears at the eye relief is considered to be an important measure for evaluating the chromatic aberration characteristics of an eyepiece lens.

Figure 19:
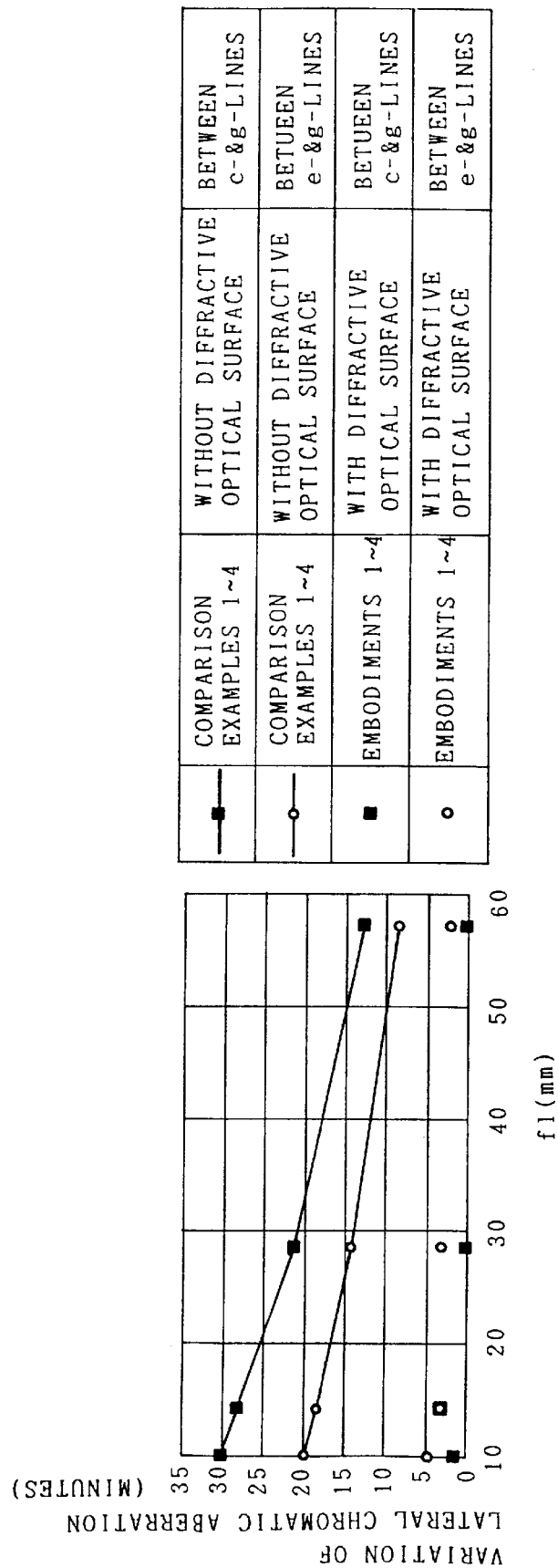
FIG. 19 is a graph showing the relation between the focal length fl and the variation of lateral chromatic aberration with the wavelength.

FIG. 19 shows the relation between the focal length fl and the variation of lateral chromatic aberration with the wavelength as observed at the image height corresponding to half the length of the longer side of the field stop. Specifically, FIG. 19 shows the variation of lateral chromatic aberration between for the c-line and for the g-line and between for the e-line and for the g-line with respect to the focal length fl of the eyepiece lenses as observed in the eyepiece lenses of the first to fourth embodiments and of the first to fourth examples for comparison and as known from the corresponding aberration diagrams (FIGS. 8A–8C to 11A–11C and 15A–15C to 18A–18C). In FIG. 19, the focal length fl (mm) is taken along the horizontal axis, and the variation (in minutes) of lateral chromatic aberration is taken along the vertical axis. The image height corresponding to half the length of the longer side of the field stop is approximately equal to 30 % of the focal length fl of each eyepiece lens.

As seen from FIG. 19, in the first to fourth examples for comparison, the variation of lateral chromatic aberration exceeds 10 minutes, and, in particular, it is as large as 20 to 30 minutes in the eyepiece lenses having focal lengths fl less than 30 mm (i.e. the second to fourth examples for comparison). On the other hand, in the first to fourth embodiments, the variation of lateral chromatic aberration is corrected to be within five minutes. Thus, from FIG. 19, it is understood that eyepiece lenses without a diffractive optical surface suffer from larger variation of lateral chromatic aberration.

Moreover, as seen from the aberration diagrams shown in FIGS. 8A–8C to 11A–11C, spherical aberration, astigmatism, and distortion are corrected satisfactorily in the first to fourth embodiments. In particular, in the second to fourth embodiments (FIGS. 9A–9C to 11A–11C), spherical aberration, astigmatism, and distortion are corrected significantly better than in the second to fourth examples for comparison (FIGS. 16A–16C to 18A–18C). Thus, from the aberration diagrams, it is understood that the use of a diffractive optical surface is more effective in eyepiece lenses having shorter focal lengths fl.

Figure 20:
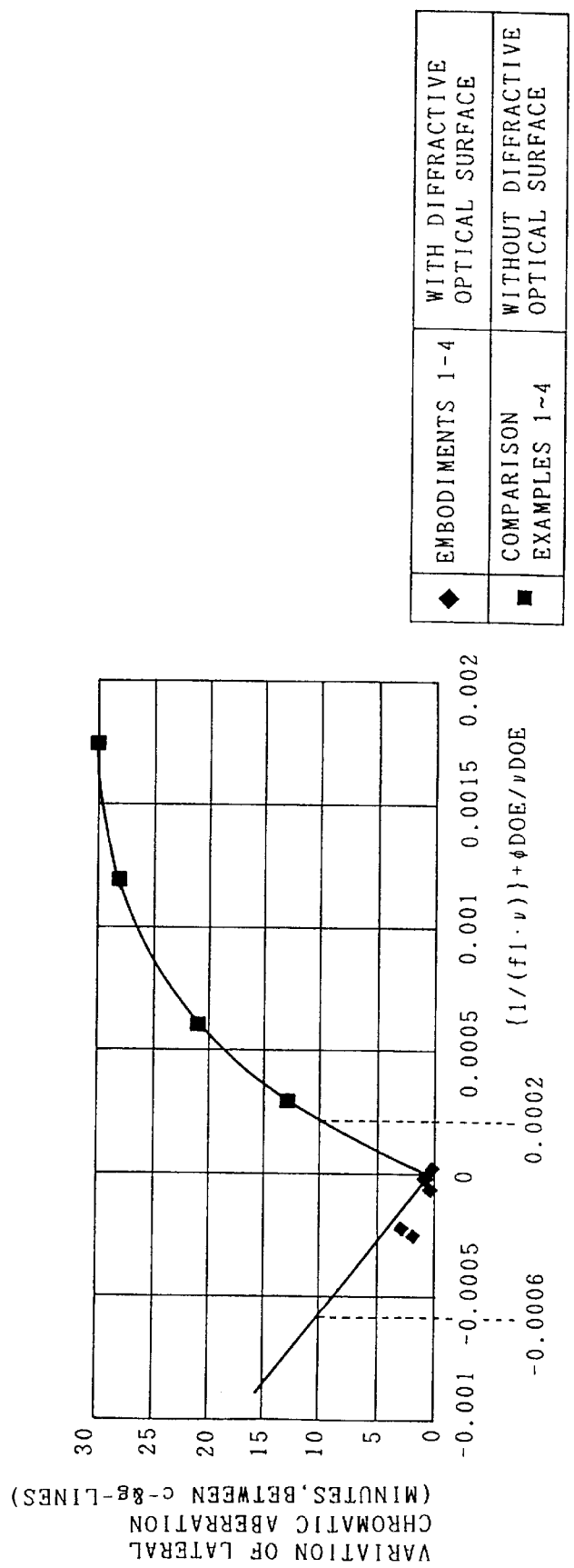
FIG. 20 is a graph showing the relation between the value of $\{1/(fl\cdot v)\}+\phi DOE/vDOE$ and the variation of lateral chromatic aberration with the wavelength.

FIG. 20 shows the relation between the value of $\{1/(fl·v)\}+\phi DOE/vDOE$ and the variation of lateral chromatic aberration with the wavelength as observed at the image height corresponding to half the length of the longer side of the field stop. Specifically, FIG. 20 shows the variation of lateral chromatic aberration between for the c-line and for the g-line with respect to the value of $\{1/(fl·v)\}+\phi DOE/vDOE$ as observed in the eyepiece lenses of the first to fourth embodiments and of the first to fourth examples for comparison and as known from the corresponding aberration diagrams (FIGS. 8A–8C to 11A–11C and 15A–15C to 18A–18C). In FIG. 20, the value of $\{1/(fl·v)\}+\phi DOE/vDOE$ is taken along the horizontal axis, and the variation (in minutes) of lateral chromatic aberration is taken along the vertical axis.

FIG. 20 shows how the variation of lateral chromatic aberration with the wavelength varies with the value of $\{1/(fl·v)\}+\phi DOE/vDOE$. Specifically, the variation of lateral chromatic aberration with the wavelength is smallest when the value of $\{1/(fl·v)\}+\phi DOE/vDOE$ is close to zero, and, as the latter increases, lateral chromatic aberration resulting from the chromatic aberration occurring on the refractive optical surface increases, and, as the latter decreases, lateral chromatic aberration due to overcorrection of chromatic aberration by the diffractive optical surface increases. Considering that, as noted previously, the variation of lateral chromatic aberration with the wavelength is tolerated within a range of around 10 minutes in an ordinary eyepiece lens, it is advisable, in an eyepiece lens composed of a single lens element, to distribute to a diffractive optical surface a power that brings the value of $\{1/(fl·v)\}+\phi DOE/vDOE$ within a range from −0.0006 to 0.0002 and thus suppresses the variation of lateral chromatic aberration within 10 minutes.

In the first to fourth embodiments, the value of $\{1/(fl·v)\}+\phi DOE/vDOE$ is in the above-noted range from −0.0006 to 0.0002. Moreover, as seen from the aberration diagrams shown in FIGS. 8A–8C to 11A–11C, spherical aberration, astigmatism, and distortion are corrected better in the first to fourth embodiments than in the first to fourth examples for comparison (FIGS. 15A–15C to 18A–18C). This shows that a smaller value of $\{1/(fl·v)\}+\phi DOE/vDOE$ is more effective in correcting spherical aberration, astigmatism, and distortion. If, in addition, the single lens element provided with an aspherical surface satisfies the previously noted condition (1), it is possible to achieve well-balanced correction of chromatic aberration and other types of aberration, that is, spherical aberration, astigmatism, curvature of field, and distortion.

<Embodiments 8 and 9>

Figure 21:
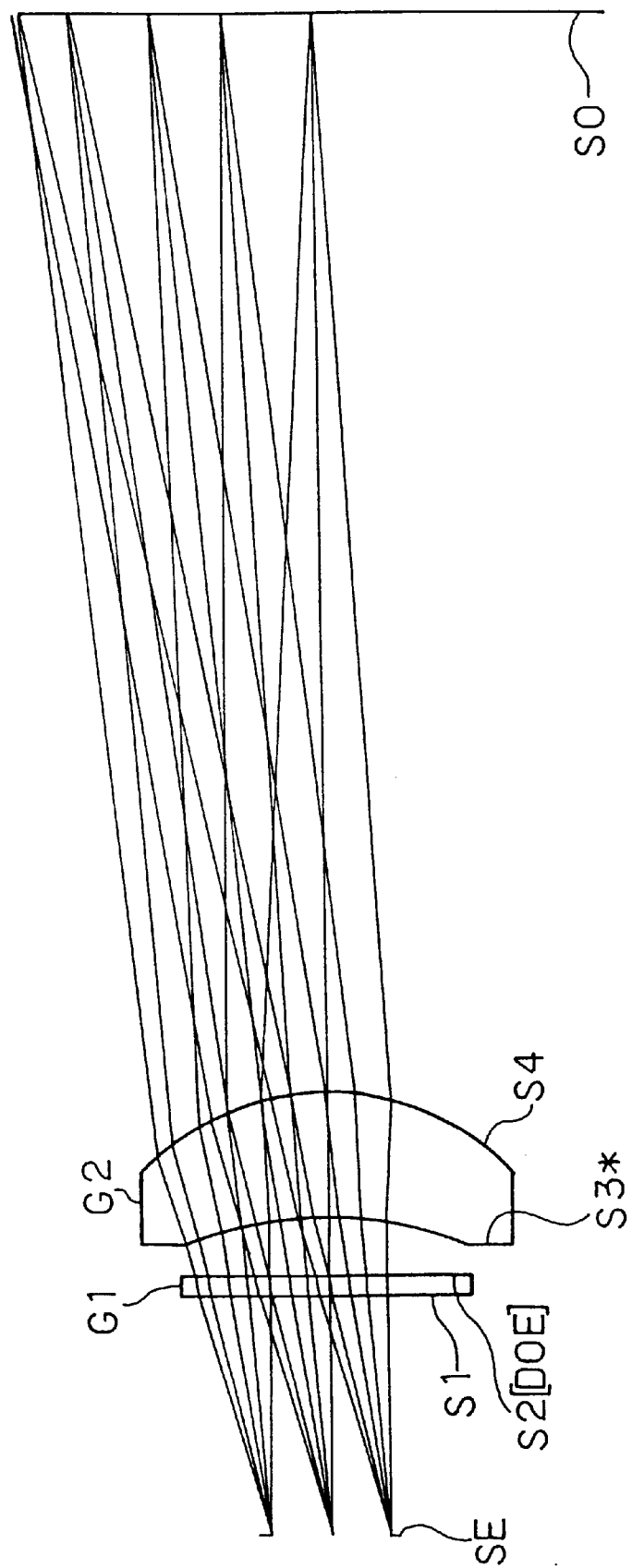
FIG. 21 is a lens arrangement diagram showing the lens arrangement and optical paths of the eyepiece optical system of an eighth embodiment of the invention.
Figure 23:
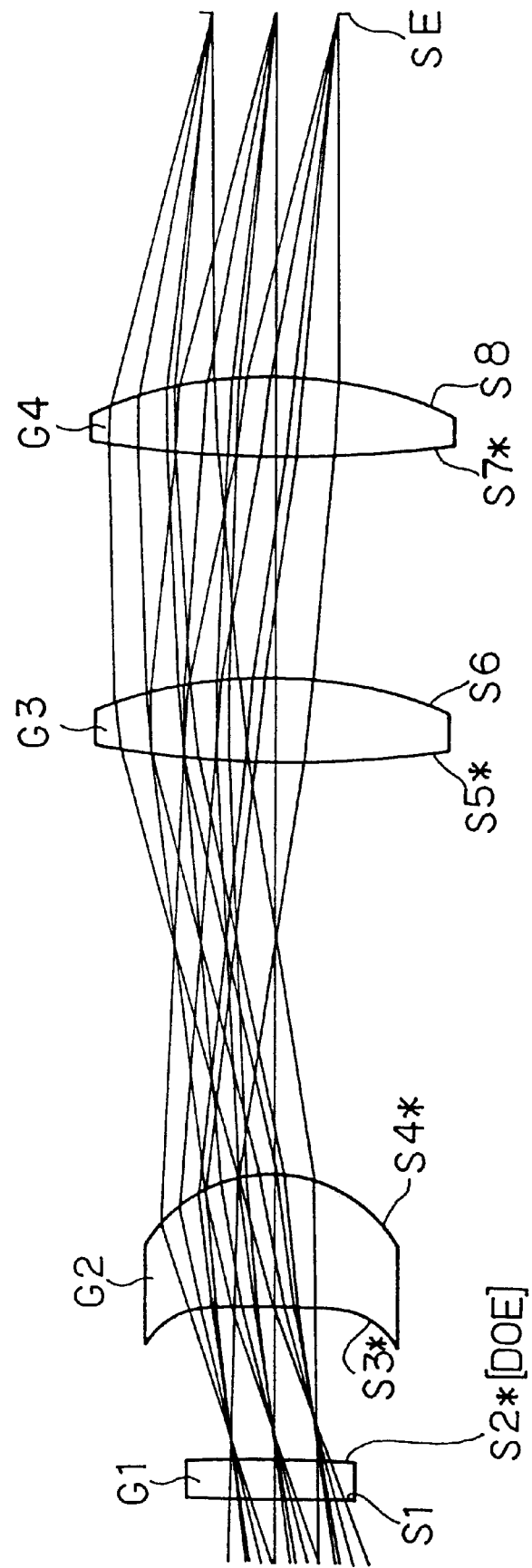
FIG. 23 is a lens arrangement diagram showing the lens arrangement and optical paths of the viewfinder optical system of a ninth embodiment of the invention.

FIG. 21 is a lens arrangement diagram showing the lens arrangement and optical paths of the Kepler-type real-image eyepiece optical system of an eighth embodiment of the invention. FIG. 23 is a lens arrangement diagram showing the lens arrangement and optical paths of the Kepler-type real-image viewfinder optical system of a ninth embodiment of the invention. The construction data of the eighth and ninth embodiments are listed in Tables 8 and 9, together with the values corresponding to conditions (2) and (3) described later in connection with the eighth and ninth embodiments, respectively.

In the construction data of the eighth embodiment, Si (i=0, 1, 2, ...) represents the i-th surface from the pupil SE (i.e. surface S0) side, ri (i=0, 1, 2, ...) represents the radius of curvature of the i-th surface Si from the pupil SE side, di (i=0, 1, 2, ...) represents the i-th axial distance from the pupil SE side. Moreover, Ni (i=1, 2) and vi (i=1, 2) respectively represent the refractive index (Ne) for the e-line and the Abbe number (vd) for the d-line of the i-th lens element Gi from the pupil SE side.

In the construction data of the ninth embodiment, Si (i=0, 1, 2, ...) represents the i-th surface from the object side, ri (i=1, 2, ...) represents the radius of curvature of the i-th surface Si from the object side, di (i=1, 2, ...) represents the i-th axial distance from the object side, and Ni (i=1, 2, ...) and vi (i=1, 2, ...) respectively represent the refractive index (Ne) for the e-line and the Abbe number (vd) for the d-line of the i-th lens element Gi from the pupil SE side.

Moreover, in the construction data, a surface Si marked with an asterisk (*) is an aspherical surface, and its shape is defined by formula (AS) presented previously in connection with the first to seventh embodiments.

Furthermore, in the construction data, a surface Si marked with a symbol [DOE] is a surface where a diffractive optical surface is formed on a refractive optical surface, and the pitch of the diffractive optical surface depends on the phase shape thereof that is defined by formula (DS) presented previously in connection with the first to seventh embodiments.

The eyepiece optical system of the eighth embodiment is constituted of, from the pupil SE side, a first lens element G1 that is formed in the shape of a flat disk, and a second lens element G2 that is a positive meniscus lens element convex toward the object plane SO side. The object plane SO side surface of the first lens element G1 is a diffractive optical surface. The pupil SE side surface of the second lens element G2 is an aspherical surface.

The eyepiece optical system of the eighth embodiment is characterized in that its first lens element G1 is provided with a diffractive optical surface, and in that it satisfies condition (2) below:

$$0.01 < |\phi DOE/\phi e| < 0.16 \quad (2)$$

where
$\phi DOE$ represents the composite power of the refractive optical surfaces and the diffractive optical surface of the first lens element G1 having a diffractive optical surface, and
$\phi e$ represents the composite power of the refractive optical surfaces and the diffractive optical surfaces of the entire eyepiece optical system.

The viewfinder optical system of the ninth embodiment is constituted of, from the object side, a first lens element G1 that is a plano-convex lens element convex to the pupil SE side, a second lens element G2 that is a plano-convex lens element convex to the pupil SE side, a third lens element G3 that is a positive convex lens element, and a fourth lens element G4 that is a positive convex lens element. The pupil SE side surface of the first lens element G1 is a surface where a diffractive optical surface is formed on an aspherical surface. The two surfaces of the second lens element G2 and the object side surfaces of the third and fourth lens elements G3 and G4 are aspherical surfaces. Of these lens elements, the first and second lens elements G1 and G2 constitute an objective optical system, and the third and fourth lens elements G3 and G4 constitute an eyepiece optical system.

The viewfinder optical system of the ninth embodiment is characterized in that the first lens element G1 of its objective optical system is provided with a diffractive optical surface, and in that it satisfies condition (3) below:

$$0.01 < |\phi DOE/\phi o| < 0.16 \quad (3)$$

where $\phi$DOE represents the composite power of the refractive optical surfaces and the diffractive optical surface of the first lens element G1 having a diffractive optical surface, and $\phi$o represents the composite power of the refractive optical surfaces and the diffractive optical surfaces of the entire objective optical system.

Whereas a lens including only refractive optical surfaces typically has an Abbe number in a range from 20 to 80, a diffractive optical surface has an Abbe number of −3.45. Having such a small negative Abbe number, a diffractive optical surface, even if it has only a weak power, serves to correct chromatic aberration occurring on refractive optical surfaces. More specifically, it is possible, in a viewfinder optical system, to correct the chromatic aberration occurring on the refractive optical surfaces by the use of a diffractive optical surface that has a power corresponding to 5 to 10 % of the composite power of the refractive optical surfaces and the diffractive optical surfaces of the entire viewfinder optical system.

As described above, in the eighth embodiment, the first lens element G1 of the eyepiece optical system is provided with a diffractive optical surface, and in the ninth embodiment, the first lens element G1 of the objective optical system is provided with a diffractive optical surface. In either of these embodiments, most of the composite power $\phi$DOE, i.e. the total of the refractive power and the diffractive power, of the first lens element G1 comes from the diffractive power, and is therefore very weak. Specifically, the composite power $\phi$DOE of the first lens element G1 is as weak, in the eighth embodiment, as defined by condition (2), and in the ninth embodiment, as defined by condition (3). That is, in these embodiments, the first lens element G1 has a far weaker power than the corresponding lens in conventional optical systems as described earlier.

When the power $\phi$DOE of the first lens element G1 satisfies $|\phi DOE/\phi e|<0.16$ or $|\phi DOE/\phi o|<0.16$, its sensitivity to fitting errors is lower than those of the other lenses. As a result, fitting of the first lens element G1 requires lower accuracy than the other lenses. Accordingly, even if the first lens element G1 is directly fitted to a member that does not require high fitting accuracy (such as an outer covering member or any other elastic member of a camera), its fitting errors (such as decentering and tilting) do not cause any serious damage (such as a shift of the observable area) to the observed image.

On the other hand, with respect to the power relation between the first lens element G1 and the other lenses, as the power $\phi$DOE of the first lens element G1 is made weaker, the powers of the other lenses need to be made stronger, and this aggravates the shift of the observable area resulting from fitting errors of the other lenses. Accordingly, to achieve proper balance between the sensitivity of the first lens element G1 and of the other lenses to fitting errors, the power $\phi$DOE of the first lens element G1 needs to satisfy $|\phi DOE/\phi e|>0.01$ or $|\phi DOE/\phi o|>0.01$.

For these two reasons, when the power $\phi$DOE of the first lens element G1 satisfies condition (2) or (3), it is possible to obtain desired optical performance. Note that a shift of the observable area, or, more precisely, a lateral shift of the area observable through a viewfinder as caused by decentering of a lens relative to the optical axis of the entire optical system, is often called "a squint" or "strabismus".

As described above, in the eighth and ninth embodiments, it is possible, on the one hand, to correct chromatic aberration by the use of the diffractive optical surface provided on the first lens element G1, and it is possible, on the other hand, to fit the first lens element G1 to a member (such as an outer covering member) that does not require high fitting accuracy without degrading its chromatic aberration correcting ability, as long as condition (2) or (3) is satisfied. For example, if the first lens element G1 is used as a part of the outer covering members of a camera, i.e. as a protection glass for the eyepiece window of the viewfinder, it is possible to reduce the number of parts, and thus the cost, of the camera. In addition, since this can be achieved without degrading the chromatic aberration correcting ability of the diffractive optical surface, it is no longer necessary to use a high-resolution negative lens including only refractive optical surfaces.

When the first lens element G1 of the eyepiece optical system does not satisfy condition (2), or when the first lens element G1 of the objective optical system does not satisfy condition (3), the first lens element G1 requires as high fitting accuracy as the other lenses. As a result, fitting errors of the first lens element G1 cause serious damage (such as aggravation of the shift of the observable area) to the observed image, and thus it is not possible to obtain desired optical performance.

Figure 22:
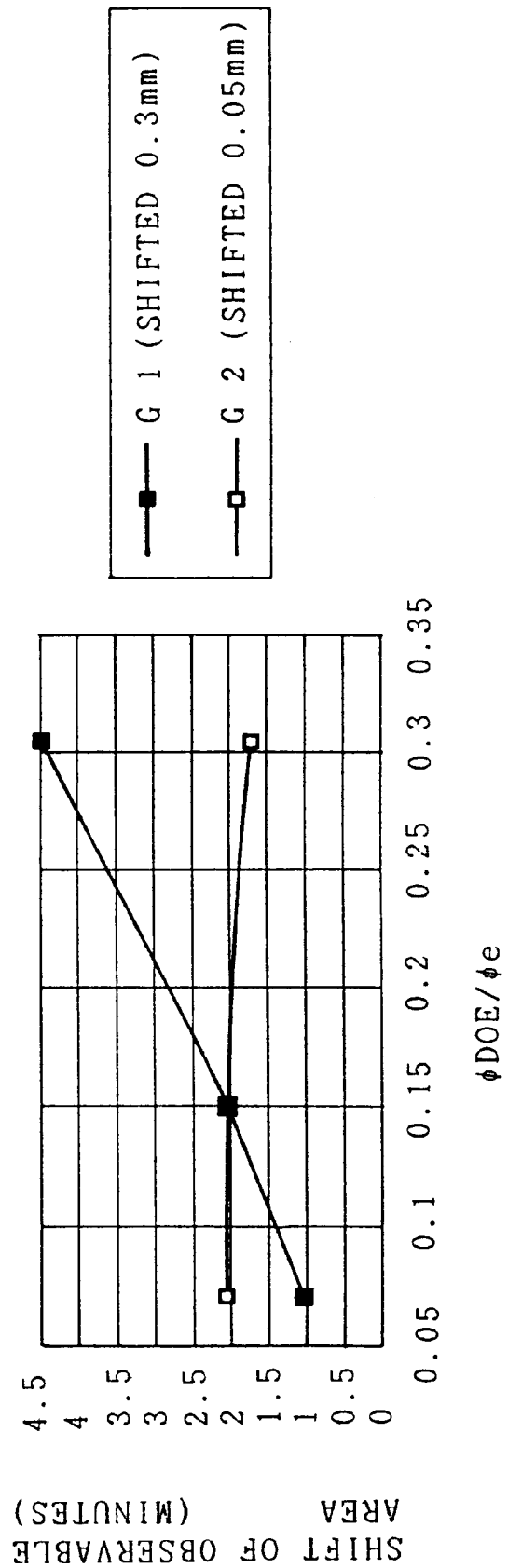
FIG. 22 is a graph showing the relation between the power ratio of the first lens element and the amount of the shift of the observable area caused by a lens shift in the eighth embodiment.
Figure 24:
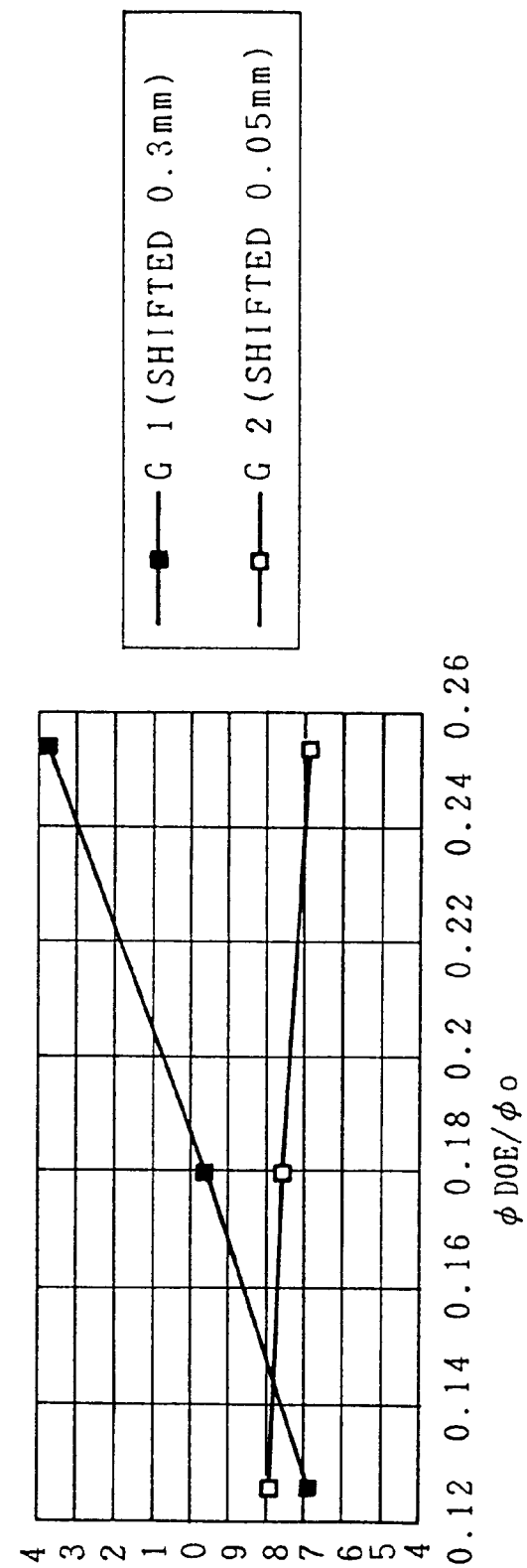
FIG. 24 is a graph showing the relation between the power ratio of the first lens element and the amount of the shift of the observable area caused by a lens shift in the ninth embodiment.
Figure 2:
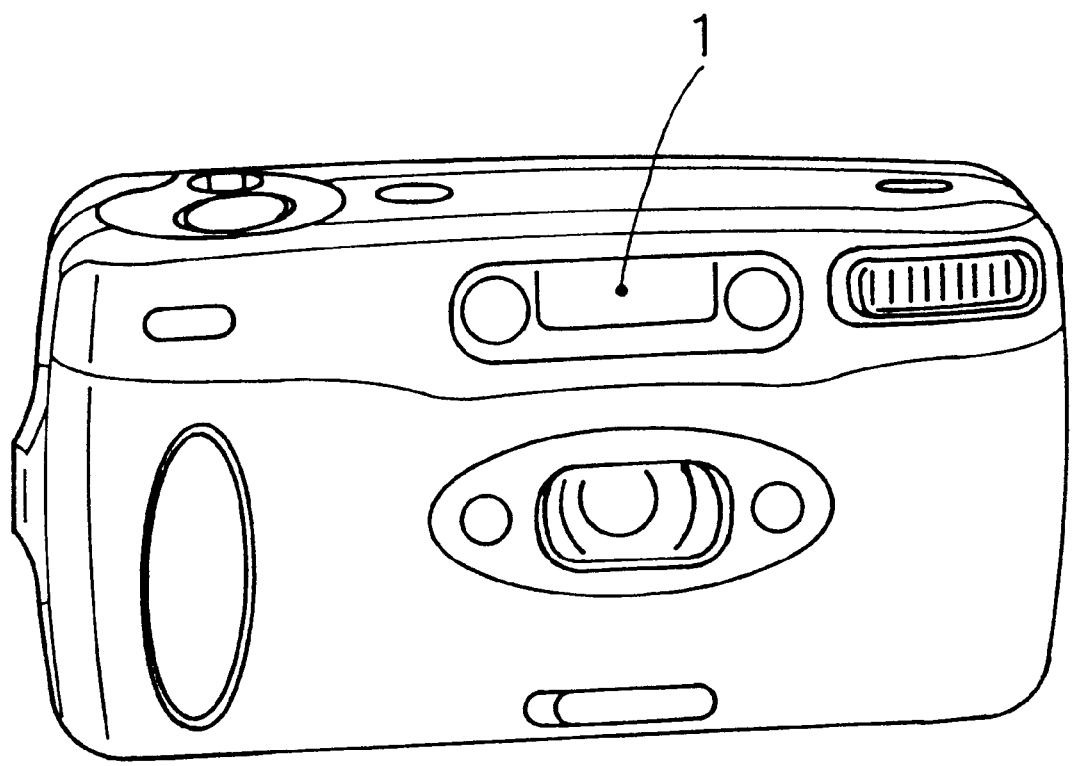

FIGS. 22 and 24 show the results of a simulation conducted to see the effect of varying the power ratio of the first lens element G1 as defined by conditions (2) and (3). More specifically, FIG. 22 is a graph showing the relation between the power ratio ($\phi$DOE/$\phi$e) of the first lens element G1 and the amount of the shift of the observable area caused by a shift (decentering movement in a direction perpendicular to the optical axis) of the first or second lens element G1 or G2 in the eighth embodiment; FIG. 24 is a graph showing the relation between the power ratio ($\phi$DOE/$\phi$o) of the first lens element G1 and the amount of the shift of the observable area caused by a shift (decentering movement in a direction perpendicular to the optical axis) of the first or second lens element G1 or G2 in the ninth embodiment. In FIGS. 22 and 24, the power ratio ($\phi$DOE/$\phi$e in FIG. 22 and $\phi$DOE/$\phi$o in FIG. 24) of the first lens element G1 is taken along the horizontal axis, and the amount (represented as an angle in minutes) of the resulting shift of the observable area is taken along the vertical axis.

In the simulation, the first lens element G1 is shifted by 0.3 mm. This corresponds to the accuracy required in fitting ordinary structural members (such as members for supporting optical members), that is, the accuracy typically required in mechanical assembly. On the other hand, the second lens element G2 is shifted by 0.05 mm. This corresponds to the accuracy required in fitting ordinary optical members, that is, the accuracy typically required in assembly and alignment of optical elements.

As seen from FIGS. 22 and 24, when the power ratio of the first lens element G1 is around 0.15, the shift of the first lens element G1 causes the same amount of shift of the observable area as the shift of the second lens element G2. Specifically, the amount of the shift of the observable area caused by the shift of the first lens element G1 or by the shift of the second lens element G2 is approximately two minutes in the eighth embodiment, and approximately eight minutes in the ninth embodiment.

Accordingly, in the eighth embodiment, provided that fitting errors that cause at most a two-minute shift of the observable area are tolerated, the first lens element G1 can be fitted with as low accuracy as structural members. In the ninth embodiment, provided that fitting errors that cause at most an eight-minute shift of the observable area are tolerated, the first lens element G1 can be fitted with as low accuracy as structural members.

When the lens element having the diffractive optical surface (i.e. the first lens element G1 in the eighth and ninth embodiments) is manufactured by bonding a resin-molded diffractive optical element on a surface of a glass lens element, it is preferable to make as weak as possible the power of the glass lens element itself and the power of the diffractive optical surface itself. This helps reduce the effect on the observed image of misalignment of the diffractive optical element relative to the lens element, and thus allows bonding to be processed with moderate accuracy.

Moreover, when the lens element having the diffractive optical surface (i.e. the first lens element G1 in the eighth and ninth embodiments) is manufactured by plastic molding or injection molding, it is preferable to make as weak as possible the power of the refractive optical surface of the lens element. This helps make the radius of curvature of the refractive optical surface as large as possible, and thus makes it easier for plastic resin, when injected into a mold for forming the refractive optical surface, to be formed accurately into the shape of the diffractive optical grating that is formed on the refractive optical surface. As a result, it is possible to form the diffractive optical surface accurately, and thus to obtain almost as good diffraction efficiency as theoretically possible. This reduces flare in the observed image.

As in the ninth embodiment, it is preferable to provide the diffractive optical surface on a refractive optical surface having an aspherical shape. The power of a diffractive optical surface provides the effect of an aspherical surface, but if the diffractive optical surface is provided on a refractive optical surface (base surface) having a spherical shape, color-by-color difference of spherical aberration and coma aberration occur. By contrast, if the diffractive optical surface is provided on a refractive optical surface having an aspherical shape, it is possible to correct basic spherical aberration by means of the aspherical surface as well as to correct such color-by-color difference of aberration by means of the diffractive optical surface. In addition, it is possible to shape the aspherical surface and the diffractive optical surface at the same time when the diffractive optical surface is formed, for example, by machining. This helps reduce production time and improve machining accuracy.

FIG. 25 shows the appearance of a camera incorporating the viewfinder optical system of the ninth embodiment. In this camera, the first lens element G1 is used as a protection glass for the objective window 1 of the viewfinder. Similarly, when the eyepiece optical system of the eighth embodiment is incorporated in a camera, its first lens element G1 is used as a protection glass for the eyepiece window of the viewfinder. In either case, the use of the first lens element G1 having a diffractive optical surface as a part of the outer covering members of a camera eliminates the need for additional outer covering members such as protection glasses for the eyepiece and objective windows of the viewfinder, and thus reduces the cost of the camera. It should be understood that this applies not only to silver-halide film based cameras but also to, for example, digital cameras.

<Embodiments 10 to 12>

Figure 26:
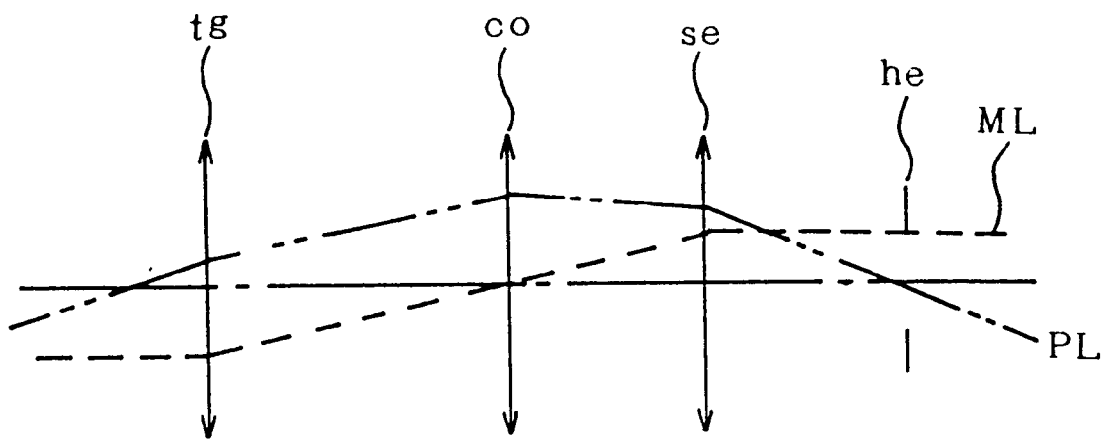
FIG. 26 is a diagram schematically showing the paraxial power arrangement and optical paths of a typical Kepler-type real-image viewfinder optical system.

FIG. 26 shows the paraxial power arrangement and optical paths of a typical Kepler-type real-image viewfinder optical system. Here, the ray passing through the pupil he at its center is the ideal principal ray PL, and the ray passing through the pupil he perpendicularly thereto is the ideal marginal ray ML. In this viewfinder optical system, the image of an object is focused at a position in the vicinity of a condenser lens co by an objective lens tg, and the focused image is then enlarged by an eyepiece lens se and is observed at the position of the pupil he that is placed behind the eyepiece se.

There are two types of chromatic aberration: longitudinal chromatic aberration and lateral chromatic aberration. The degree of the longitudinal chromatic aberration is represented by the longitudinal chromatic aberration coefficient LC defined by formula (A) below, and the degree of the lateral chromatic aberration is represented by the lateral chromatic aberration coefficient TC defined by formula (B) below.

$$LC = \Sigma\{h^2(\phi/\nu)\} \quad (A)$$

$$TC = \Sigma\{h \cdot h'(\phi/\nu)\} \quad (B)$$

where h represents the height at which the ideal marginal ray ML passes through each lens element, h' represents the height at which the ideal principal ray PL passes through each lens element, $\phi$ represents the power of each lens element, and $\nu$ represents the Abbe number of each lens element.

In formula (A), both $h^2$ and $(\phi/\nu)$ are positive (i.e. $h^2 > 0$ and $(\phi\nu/\nu) > 0$). Accordingly, in an optical system that includes only refractive optical surfaces, the chromatic aberration occurring in the objective lens tg and the chromatic aberration occurring in the eyepiece lens se are added together. This means that chromatic aberration cannot be corrected with positive lens elements alone.

In an optical system that includes both refractive optical surfaces and diffractive optical surfaces, the longitudinal chromatic aberration and lateral chromatic aberration occurring on the diffractive optical surfaces of lens elements are added to the respective types of chromatic aberration as expressed by formulae (A) and (B) above. Accordingly, in an optical system that includes both refractive optical surfaces and diffractive optical surfaces, the longitudinal chromatic aberration is represented by the longitudinal chromatic aberration coefficient LC defined by formula (C) below, and the lateral chromatic aberration is represented by the lateral chromatic aberration coefficient TC defined by formula (D) below;

$$LC = \Sigma\{h^2(\phi r/\nu r + \phi k /\nu k)\} \quad (C)$$

$$TC = \Sigma\{h \cdot h'(\phi r/\nu r + \phi k/\nu k)\} \quad (D)$$

where $\phi r$ represents the power of the refractive optical surface of each lens element, $\nu r$ represents the Abbe number of the refractive optical surface of each lens element, $\phi k$ represents the power of the diffractive optical surface of each lens element, and $\nu k$ represents the Abbe number of the diffractive optical surface of each lens element.

The Abbe number $\nu k$ of a diffractive optical surface is defined by formula (E) below.

$$\nu k = \lambda d/(\lambda F - \lambda c) \quad (E)$$

where $\lambda d$ represents the wavelength of the d-line (=588 nm), $\lambda F$ represents the wavelength of the F-line (=486 nm), and $\lambda c$ represents the wavelength of the c-line (=656 nm).

From formula (E), it is understood that a diffractive optical surface has a negative Abbe number as small as vk=−3.45. Since an ordinary lens including only refractive optical surfaces typically has an Abbe number in a range from 20 to 80, it is possible, by combining refractive optical surfaces with diffractive optical surfaces, to cancel the positive term φr/vr with the negative term φk/vk. This means that chromatic aberration that occurs on refractive optical surfaces can be corrected by diffractive optical surfaces.

Figure 27:
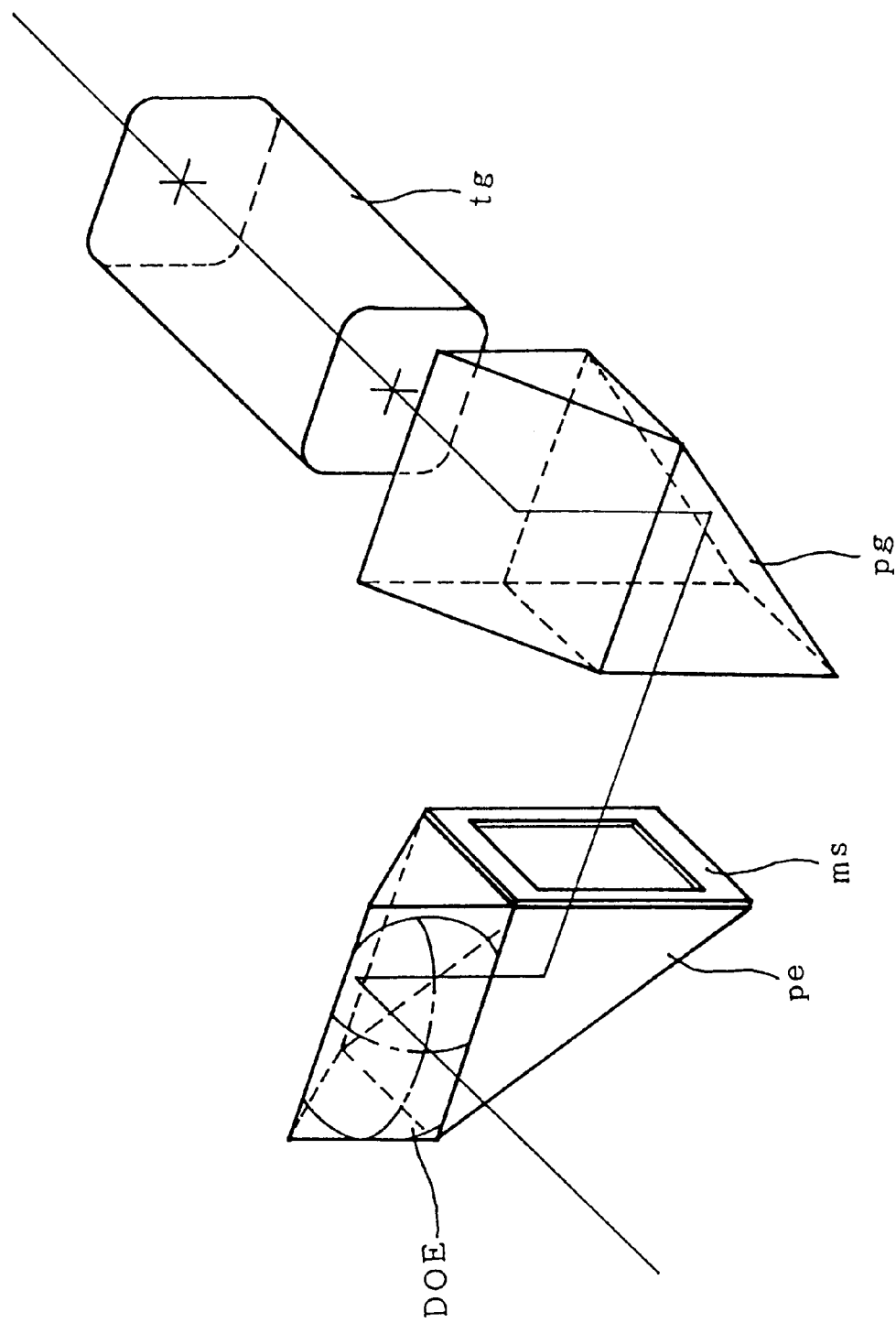
FIG. 27 is a perspective view schematically showing the constitution common to the Kepler-type real-image viewfinder optical systems of tenth and eleventh embodiments of the invention.

FIG. 27 shows the constitution common to the Kepler-type real-image viewfinder optical systems of tenth and eleventh embodiments of the invention. These viewfinder optical systems are each constituted of, from the object side, an objective lens tg, an objective-side inverting prism pg, and an eyepiece-side inverting prism pe. The eyepiece-side inverting prism pe is provided with a field-of-view mask ms at its object side end, and has a diffractive optical surface DOE formed on its pupil side surface. The image of an object is focused at a position in the vicinity of the field-of-view mask ms by the objective lens tg, and, before and after that, the image is inverted vertically and reversed horizontally by the inverting prisms pg and pe. Note that, in regard to the inverting prisms pg and pe, any type of inverting prism that inverts and reverts an image both vertically and horizontally, such as Porro prisms, pentaprisms, Pechan prisms, can be used.

In the viewfinder optical system shown in FIG. 27, the eyepiece lens se in FIG. 26 is constituted only of the inverting prism pe having a diffractive optical surface DOE on its pupil he side surface. A viewfinder optical system whose eyepiece lens se is composed only of an inverting prism pe, that is, a viewfinder optical system that does not include a separate eyepiece lens se can be made compact.

To realize an eyepiece lens se that includes only an inverting prism pe as described above, at least one of the incident (object side) surface or the exiting (pupil he side) surface of the inverting prism pe needs to be formed into a curved surface. Moreover, to secure optical paths for inversion, the inverting prism pe needs to be made of an optical material having a high refractive index. However, providing a curved surface on an inverting prism made of an optical material having a high refractive index causes large chromatic aberration due to dispersion that occurs on that curved surface. In an ordinary viewfinder optical system including only refractive optical surfaces, chromatic aberration is corrected by combining a positive lens having a large Abbe number and a negative lens having a small Abbe number. However, this cannot be done without using additional lenses in, and thus increasing the size of, the viewfinder optical system.

In the tenth and eleventh embodiments, the chromatic aberration occurring on the curved surface of the inverting prism pe is properly corrected by the diffractive optical surface DOE provided on the pupil he side surface of the inverting prism pe. Specifically, as shown in FIG. 27, the exiting (pupil he side) surface of the inverting prism pe is formed into a curved surface that is convex toward the pupil he side, and the diffractive optical surface DOE is provided on that curved surface. Alternatively, it is also possible to form the exiting surface of the inverting prism pe into a flat surface and provide the diffractive optical surface DOE on that flat surface; in that case, the incident (object side) surface of the inverting prism pe is formed into a curved surface that is convex to the object side. In either case, the chromatic aberration occurring on the incident and exiting surfaces of the inverting prism pe is corrected by the diffractive optical surface DOE provided on the exiting surface of the inverting prism pe.

It is preferable to form the pupil he side surface of the inverting prism pe into an aspherical surface and provide the diffractive optical surface DOE on that aspherical surface. If the diffractive optical surface is provided on a refractive optical surface that is a spherical surface, the spherical surface causes spherical aberration and curvature of field. By contrast, if the diffractive optical surface is provided on a refractive optical surface that is an aspherical surface, it is possible to correct chromatic aberration by means of the diffractive optical surface on the one hand, and correct properly various types of aberration, such as spherical aberration and curvature of field, by means of the aspherical surface. In addition, it is possible to shape the aspherical surface and the diffractive optical surface at the same time, thereby reducing production time and improving machining accuracy.

If the entire inverting prism pe is made of plastic resin, the diffractive optical surface DOE can be formed at the same time that the inverting prism pe is formed. In this way, it is possible to realize a viewfinder optical system that can be mass-produced. In addition, since plastic resin is a light optical material, it is possible to realize a lightweight viewfinder optical system.

If the inverting prism pe is composed of a prism portion made of glass and a diffractive optical element portion made of plastic resin and provided on the pupil he side surface of the prism portion, it is possible to realize a viewfinder optical system that provides high performance and stable quality. Specifically, if the prism portion is made of glass, the inverting prism pe can be shaped and produced by grinding just in the same way as an ordinary prism made of glass, and, as a result, it provides highly accurate angles and surfaces for image inversion as well as stable quality that is scarcely affected by temperature variation.

An inverting prism pe composed of a prism portion and a diffractive optical element portion as described above is produced, for example, in the following way. First, the gap between the exiting surface of the prism portion and a mold having the patten of the diffractive optical surface formed in it is filled with light-hardening plastic resin. Then, the plastic resin is hardened by application of light, and thereafter the mold is removed. In this way, through light-hardening of the plastic resin, a diffractive optical element portion is formed on the exiting surface of the prism portion in such a way that the two portions in combination constitute an inverting prism pe. Since the diffractive optical surface DOE is formed as the surface of the diffractive optical element portion made of plastic resin, it can be made into any shape by the use of an appropriately shaped mold.

In the tenth and eleventh embodiments, it is preferable that condition (4) below be satisfied.

$$0.03 < rE \cdot \phi D/(1-N) < 0.1 \qquad (4)$$

where rE represents the radius of curvature of the pupil he side surface of the inverting prism pe, φD represents the power of the diffractive optical surface DOE provided on the pupil he side surface of the inverting prism pe, and N represents the refractive index of the inverting prism pe.

As long as the power of the diffractive optical surface DOE satisfies condition (4), chromatic aberration is corrected properly. If the lower limit of condition (4) is exceeded, chromatic aberration is undercorrected, and, if the upper limit of condition (4) is exceeded, chromatic aberration is overcorrected by the diffractive optical surface DOE.

Next, the Kepler-type real-image viewfinder optical system of a twelfth embodiment will be described. The viewfinder optical system of the twelfth embodiment differs from those of the tenth and eleventh embodiments in that a second diffractive optical surface is provided on the object side end surface (i.e. the incident surface on the object side) of the objective-side inverting prism pg. That is, in the twelfth embodiment, the inverting prism pg having a diffractive optical surface on its object side end surface is included in the objective lens tg, and therefore the diffractive optical surface provided in the inverting prism pg serves as a part of the objective lens tg. The chromatic aberration occurring in the objective lens tg is corrected properly by this diffractive optical surface.

Thus, the viewfinder optical system of the twelfth embodiment is provided with two diffractive optical surfaces, that is, the diffractive optical surface DOE (FIG. 27) provided on the pupil side surface of the inverting prism pe and serving as a part of the eyepiece lens se (FIG. 26), and the diffractive optical surface provided on the object side surface of the inverting prism pg and serving as a part of the objective lens tg (FIG. 26). As a result, in this viewfinder optical system, well-balanced correction of lateral chromatic aberration is achieved at the wide-angle and telephoto ends over the entire system.

The balance of the above-mentioned lateral chromatic aberration correction can be further improved by setting the power of the diffractive optical surface provided in the eyepiece lens se approximately equal to the power of the diffractive optical surface provided in the objective lens tg. This is expressed by Condition (5) below.

$$|\phi D - \phi D'| < 0.001 \quad (5)$$

where $\phi D$ represents the power of the diffractive optical surface provided on the pupil side surface of the inverting prism pe, and $\phi D'$ represents the power of the diffractive optical surface provided on the object side end surface of the inverting prism pg.

Condition (5) defines the relation between the power of the diffractive optical surface provided in the eyepiece lens se and the power of the diffractive optical surface provided in the objective lens tg. If condition (5) is not satisfied, the difference between the powers of the diffractive optical surfaces provided in the eyepiece lens se and in the objective lens tg is too great, with the result that it is not possible to obtain proper balance of the lateral chromatic aberration correction at the wide-angle and telephoto ends.

Figure 28:
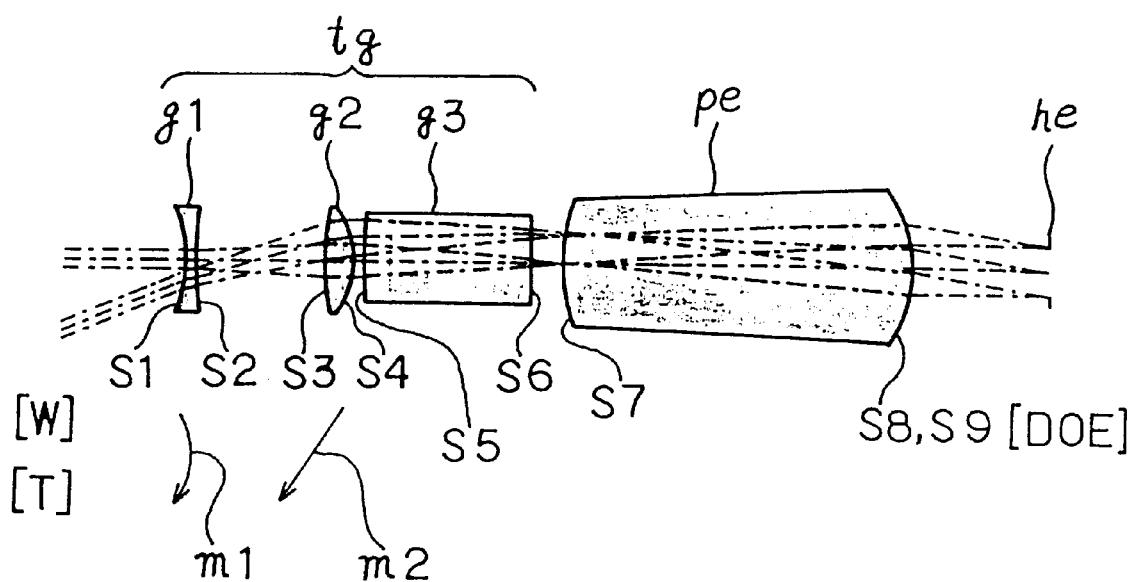
FIG. 28 is a lens arrangement diagram showing the optical arrangement and optical paths of the Kepler-type real-image viewfinder optical systems of the tenth and eleventh embodiments of the invention.
Figure 37:
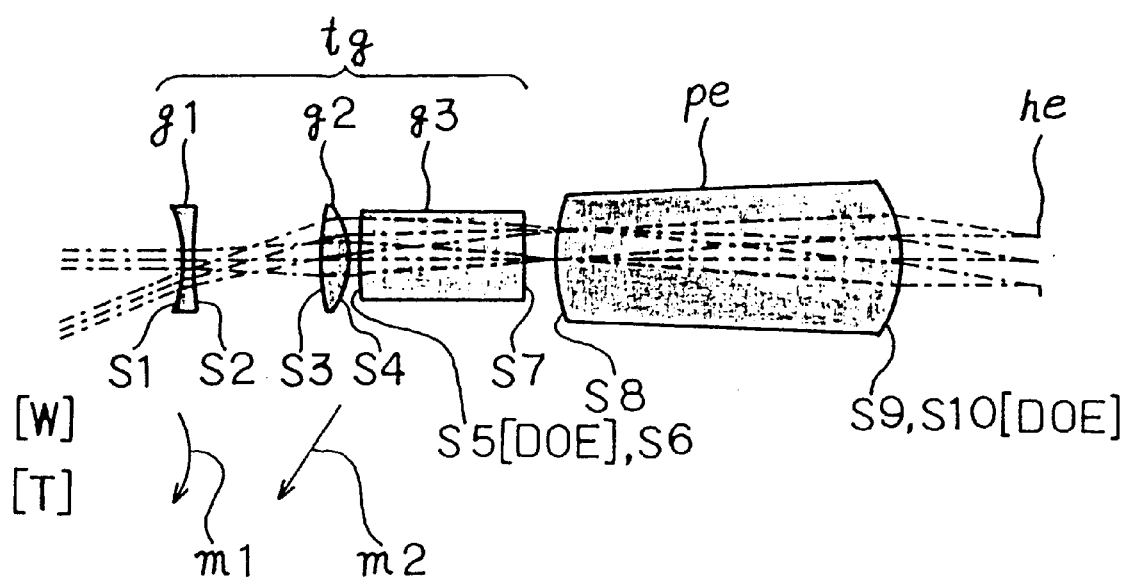
FIG. 37 is a lens arrangement diagram showing the optical arrangement and optical paths of the Kepler-type real-image viewfinder optical system of a twelfth embodiment of the invention.

The viewfinder optical systems of the tenth and eleventh embodiments (FIG. 27) and of the twelfth embodiment will be described in more detail below with reference to their construction data and aberration diagrams. Tables 10 and 11 list the construction data of the tenth and eleventh embodiments, respectively. Tables 12 and 13 list the construction data of fifth and sixth examples for comparison, respectively. These are examples of viewfinder optical systems whose inverting prism pe is not provided with a diffractive optical surface DOE. Table 14 lists the construction data of the twelfth embodiment. FIG. 28 shows the optical arrangement and optical paths of the tenth and eleventh embodiments, in their wide-angle-end state [W]. FIG. 37 shows the optical arrangement and optical paths of the twelfth embodiment, in its wide-angle-end state [W]. In FIGS. 28 and 37, arrows m1 and m2 indicate the movement of the first and second lens units g1 and g2 during zooming from the wide-angle end [W] to the telephoto end [T].

In the construction data of these embodiments and examples for comparison, Si (i=1, 2, . . . ) represents the i-th surface from the object side, ri (i=1, 2, . . . ) represents the radius of curvature of the i-th surface Si from the object side, and di (i=1, 2, . . . ) represents the i-th axial distance from the object side. For an axial distance that varies with zooming (variable distance), two values are listed which are, from the left, the axial distance in the wide-angle-end state [W] and the axial distance in the telephoto-end state [T]. Ni (i=1, 2, . . . ) represents the refractive index (Ne) for the e-line of the i-th optical element from the object side, and vi (i=1, 2, . . . ) represents the Abbe number (vd) for the d-line of the i-th optical element from the object side. The symbol that follows the Abbe number of each optical element is the reference symbol of that optical element.

Also listed in the construction data of each embodiment are the viewfinder magnifications $\beta$ in the wide-angle-end and telephoto-end states [W] and [T], the value of $\{rE \cdot \phi D/(1-N)\}$ corresponding to condition (4) and the value of $\phi D$, and, for the twelfth embodiment, the value of $(|\phi D - \phi D'|)$ corresponding to condition (5) and the value of $\phi D'$.

Moreover, in the construction data, a surface Si marked with a symbol [DOE] is a surface where a diffractive optical surface is formed on a refractive optical surface, and the pitch of the diffractive optical surface depends on the phase shape thereof that is defined by formula (DS) presented previously in connection with the first to seventh embodiments. Furthermore, a surface Si marked with an asterisk (*) is an aspherical surface, and its shape is defined by formula (AS) presented previously in connection with the first to seventh embodiments.

Figure 29A:
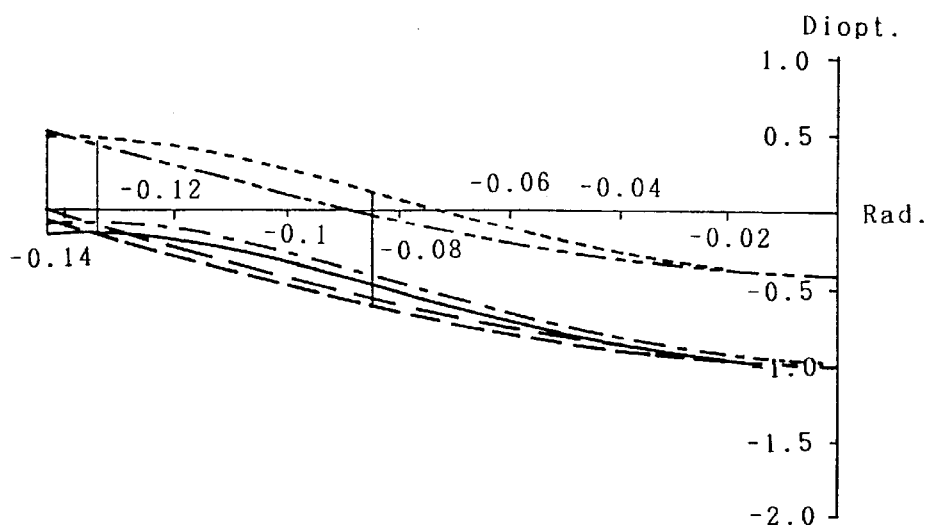
FIGS. 29A to 29C are diagrams showing the aberration observed in the tenth embodiment, at the wide-angle end.
Figure 29B:
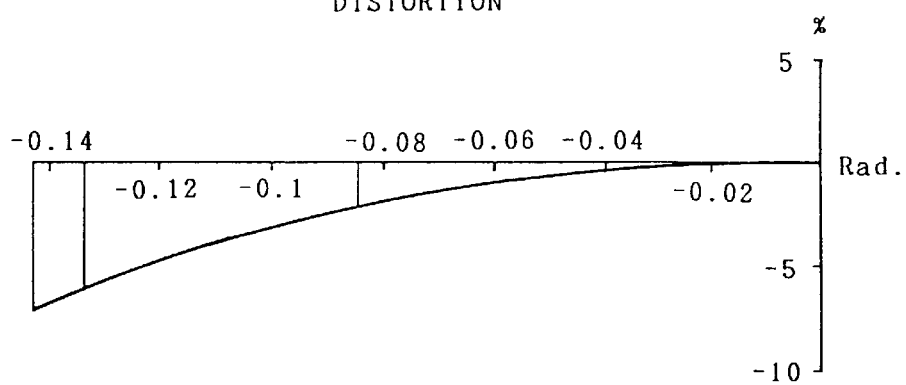
Figure 29C:
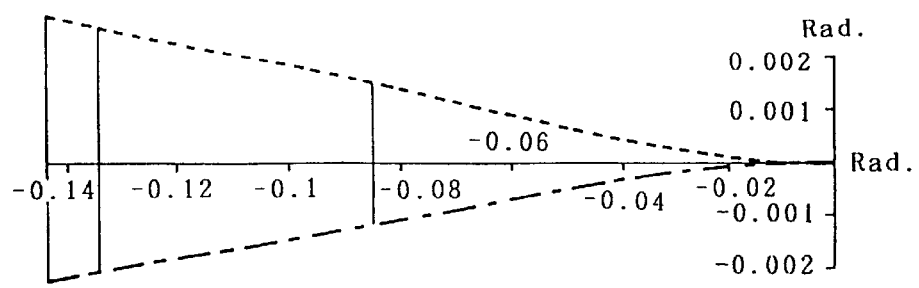
Figure 30A:
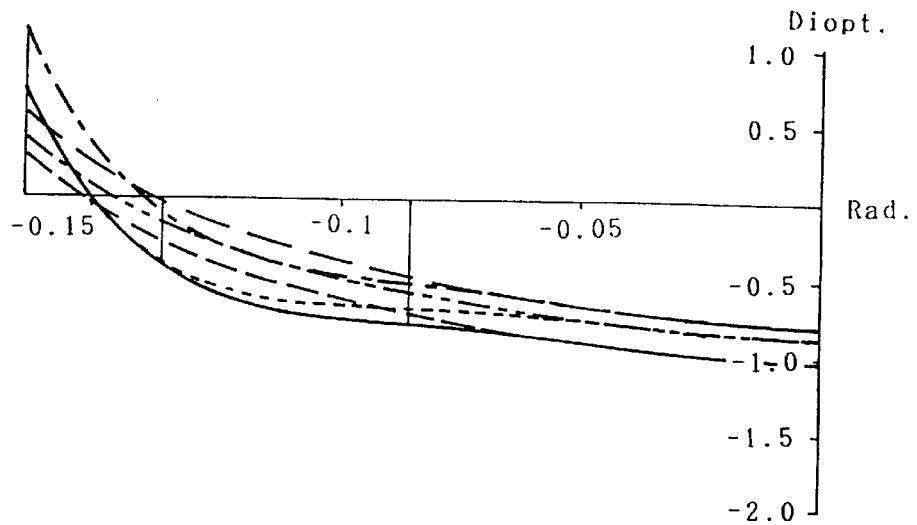
FIGS. 30A to 30C are diagrams showing the aberration observed in the tenth embodiment, at the telephoto end.
Figure 30B:
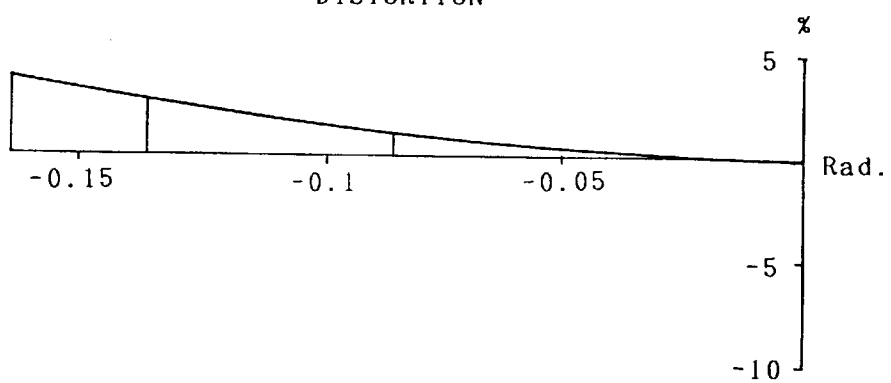
Figure 30C:
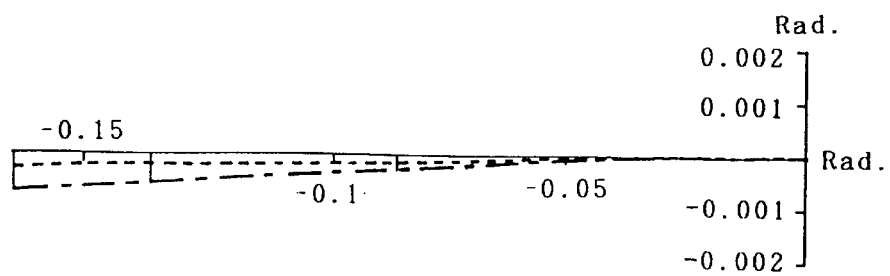
Figure 32:
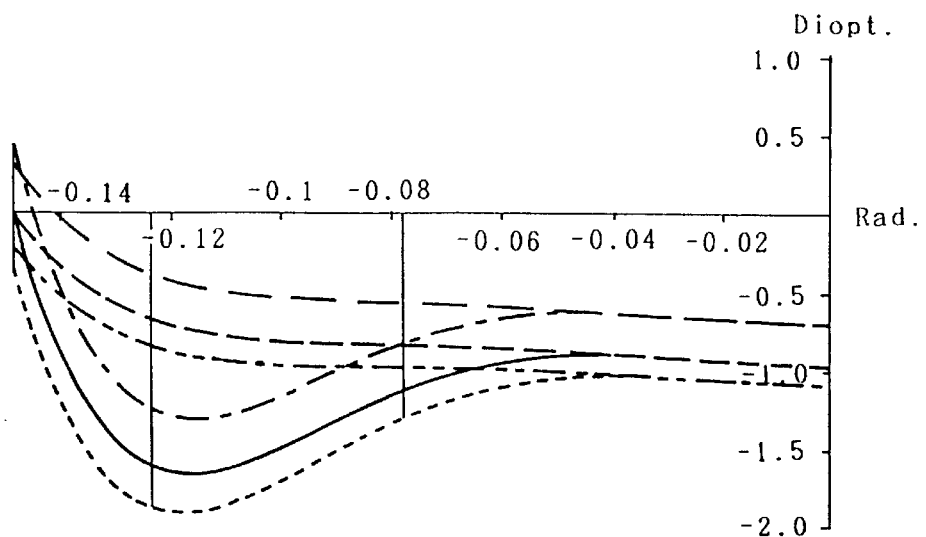
FIGS. 32A to 32C are diagrams showing the aberration observed in the eleventh embodiment, at the telephoto end.
Figure 32:
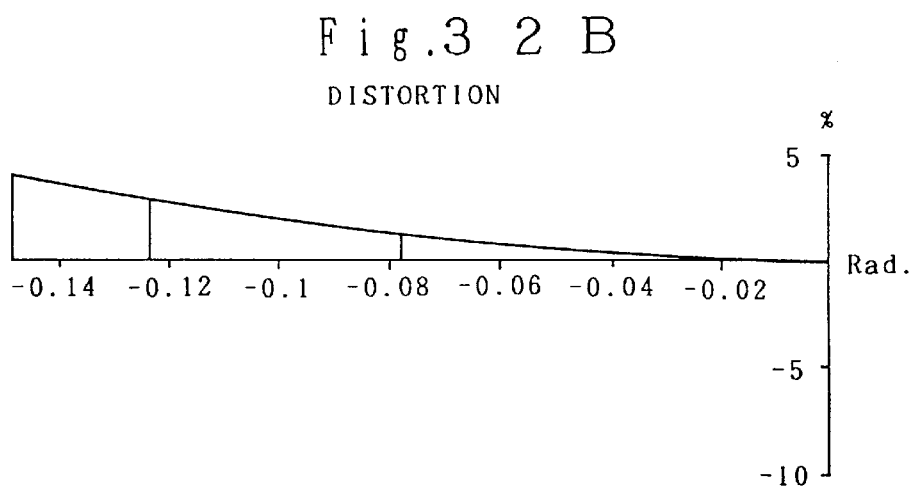
Figure 32:
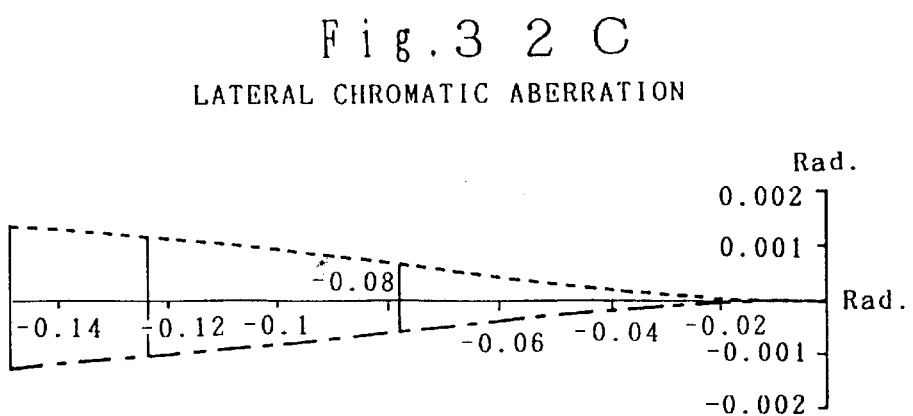
Figure 33:
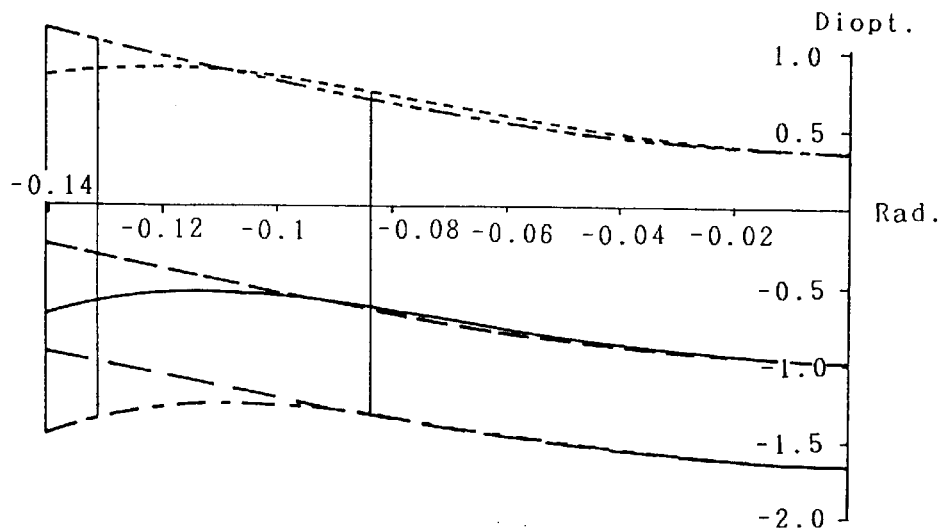
FIGS. 33A to 33C are diagrams showing the aberration observed in a fifth example for comparison, at the wide-angle end.
Figure 33:
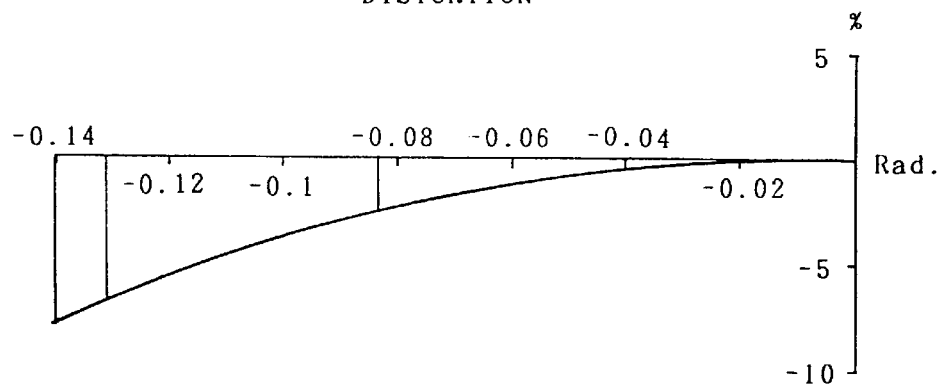
Figure 33:
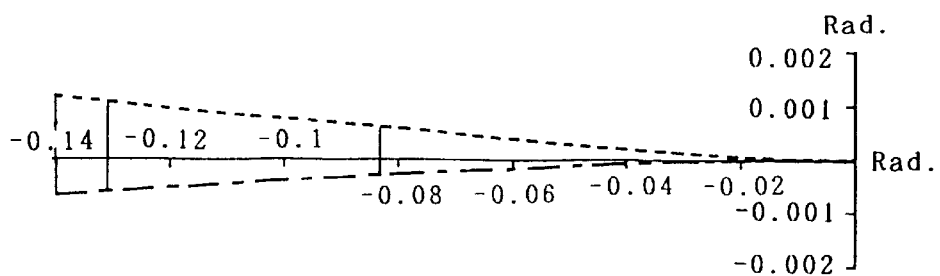
Figure 34A:
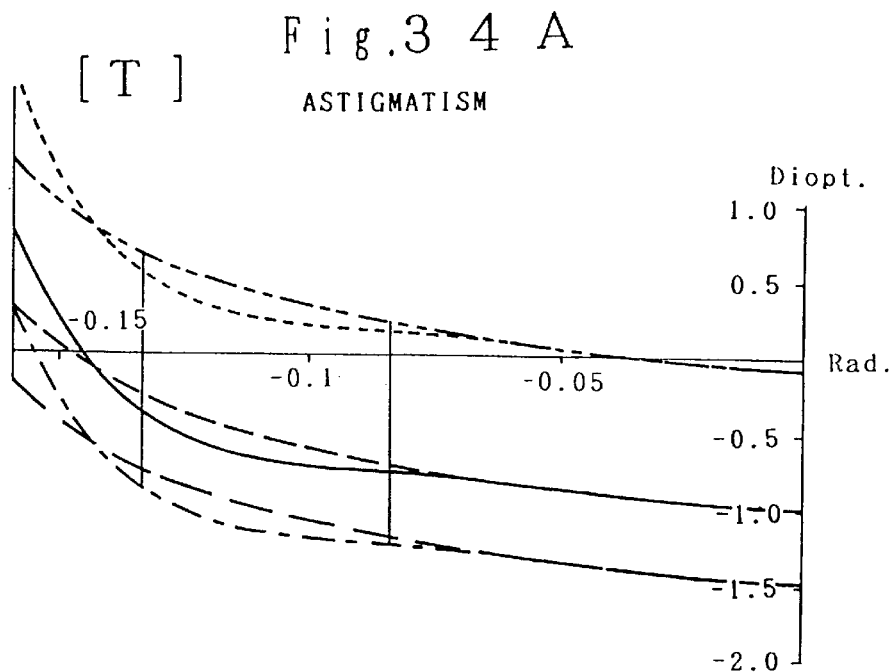
FIGS. 34A to 34C are diagrams showing the aberration observed in the fifth example for comparison, at the telephoto end.
Figure 34B:
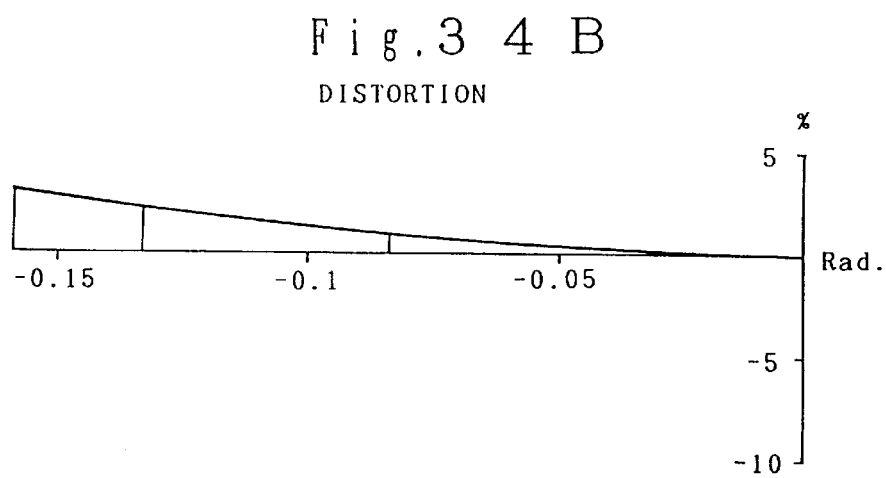
Figure 34C:
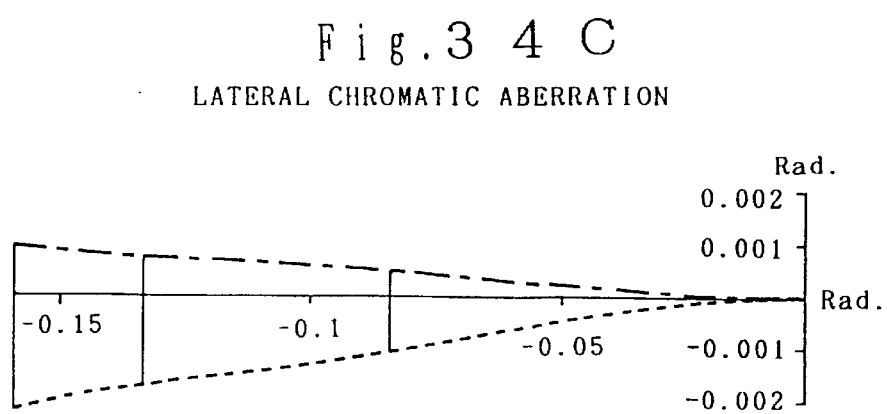
Figure 35A:
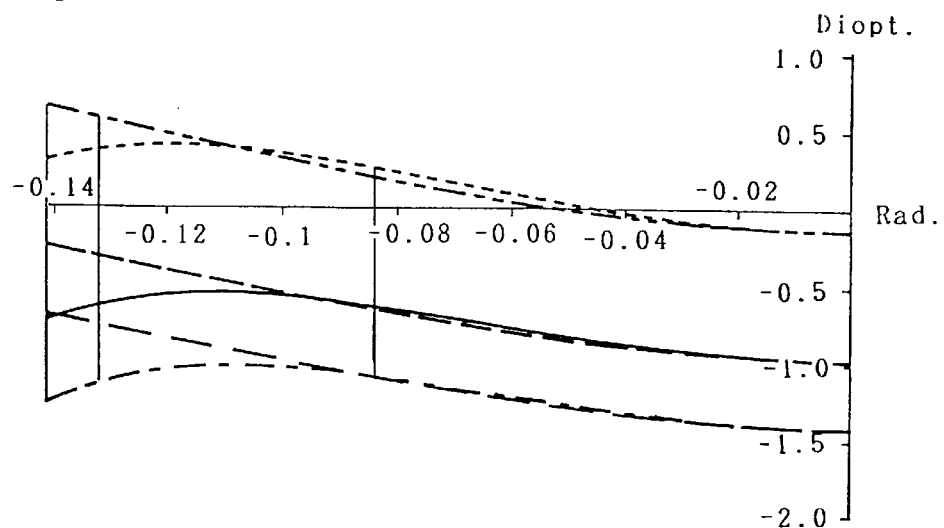
FIGS. 35A to 35C are diagrams showing the aberration observed in a sixth example for comparison, at the wide-angle end.
Figure 35B:
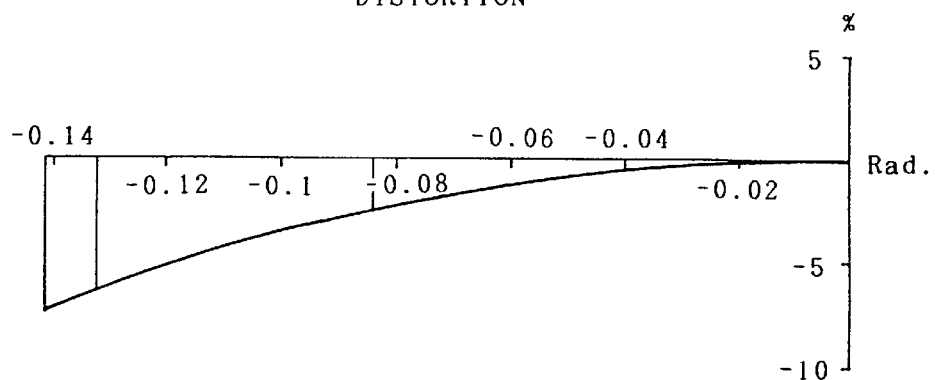
Figure 35C:
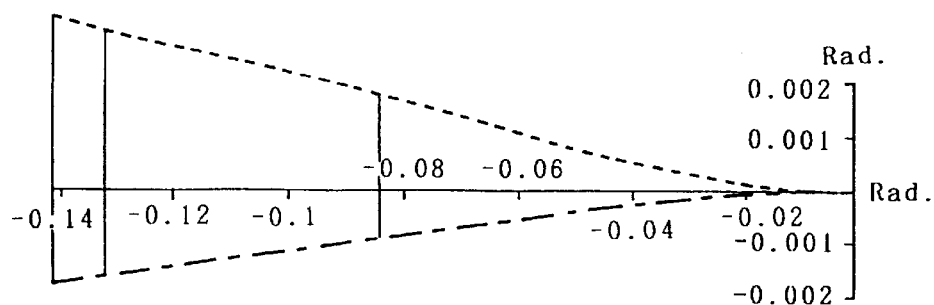
Figure 36A:
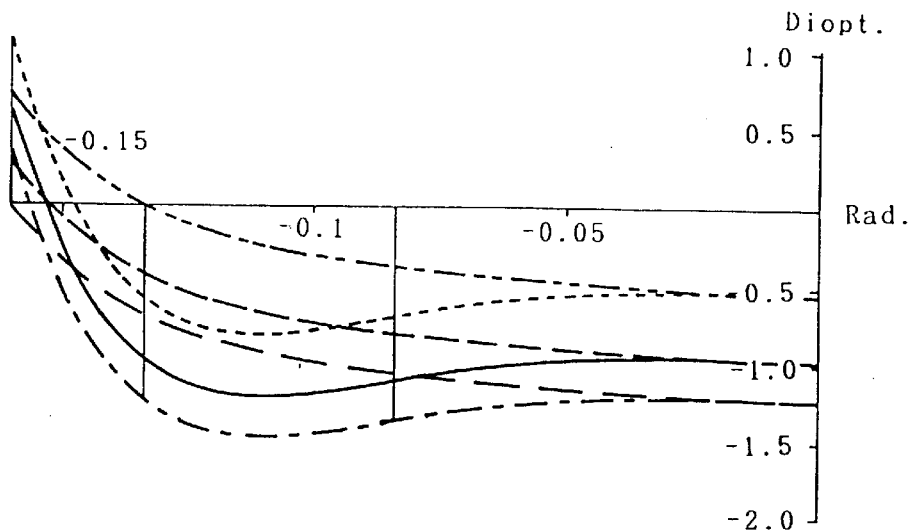
FIGS. 36A to 36C are diagrams showing the aberration observed in the sixth example for comparison, at the telephoto end.
Figure 36B:
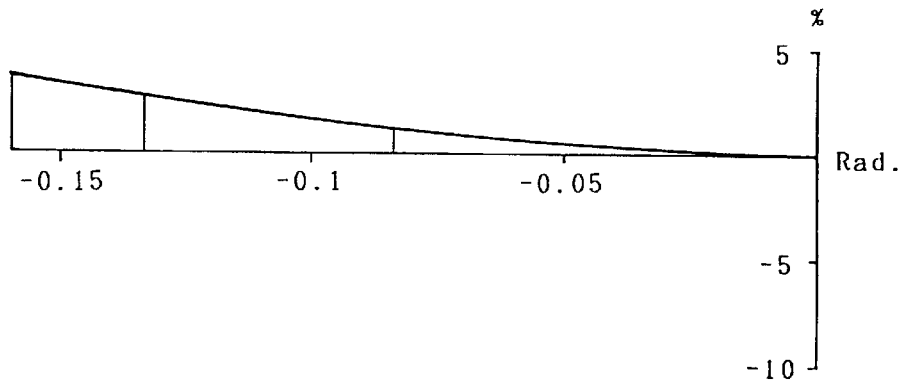
Figure 36C:
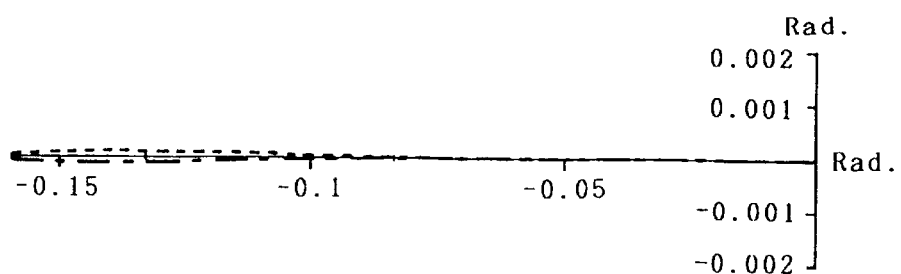
Figure 38A:
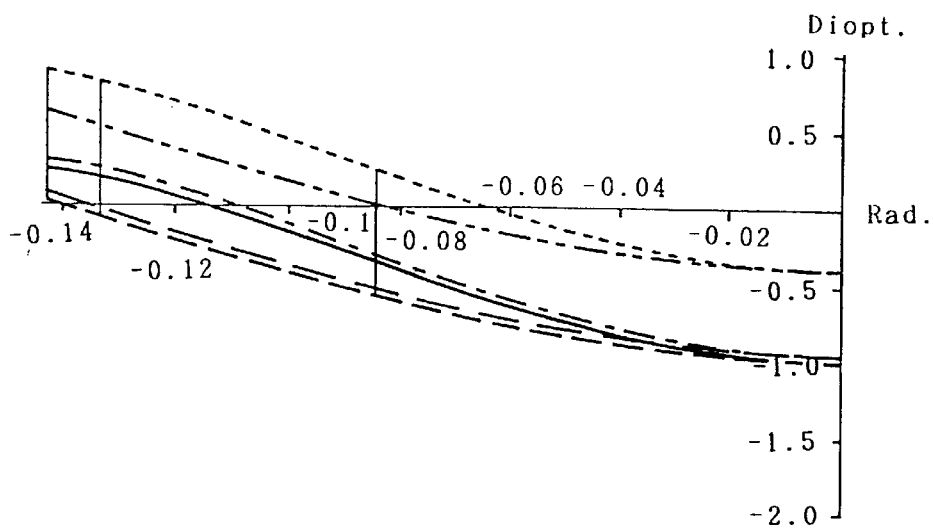
FIGS. 38A to 38C are diagrams showing the aberration observed in the twelfth embodiment, at the wide-angle end.
Figure 38B:
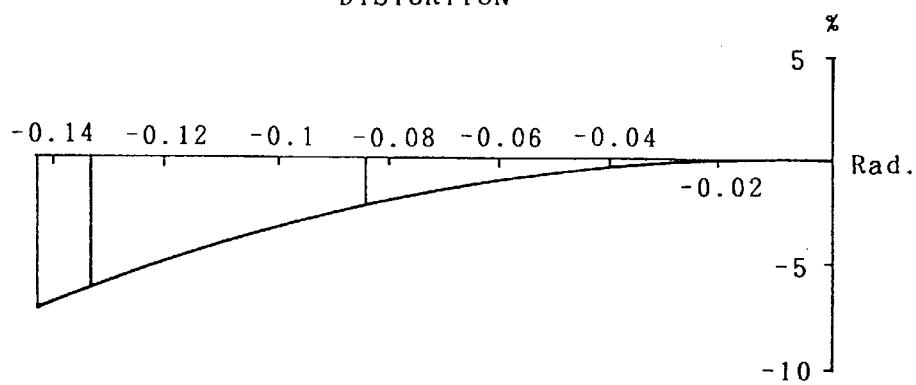
Figure 38C:
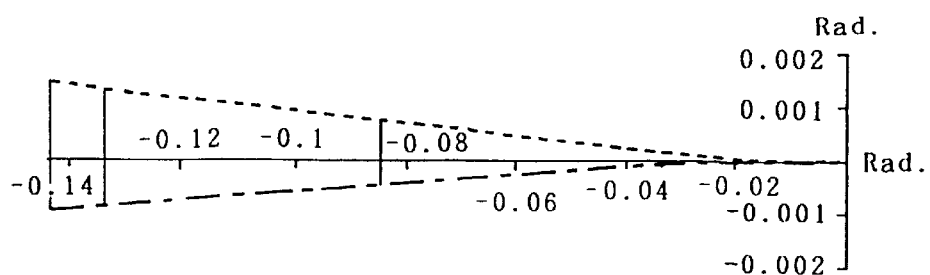
Figure 39A:
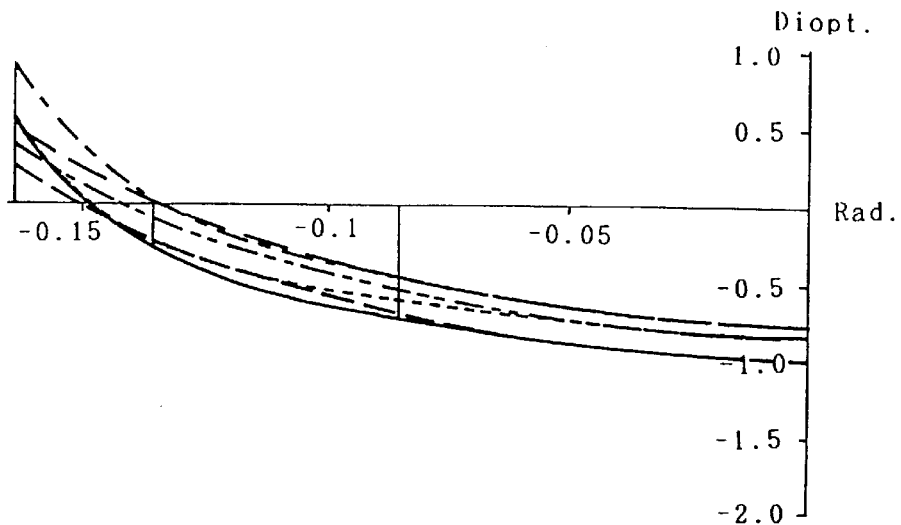
FIGS. 39A to 39C are diagrams showing the aberration observed in the twelfth embodiment, at the telephoto end.
Figure 39B:
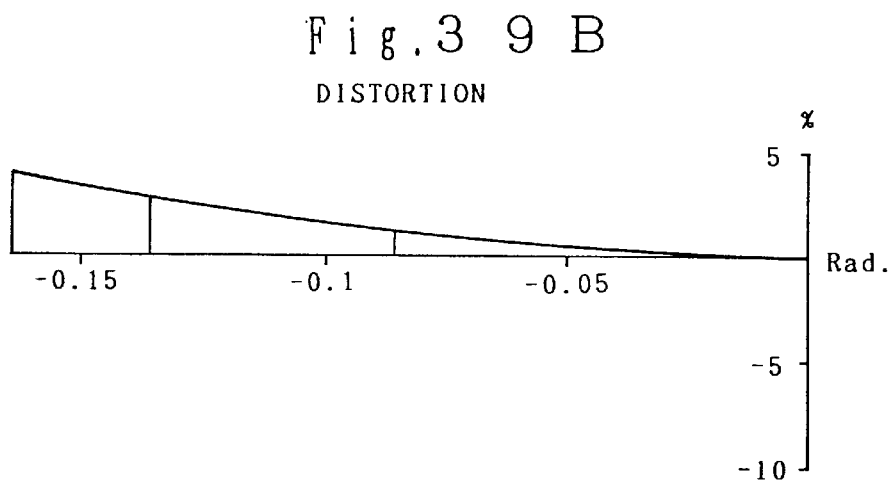
Figure 39C:
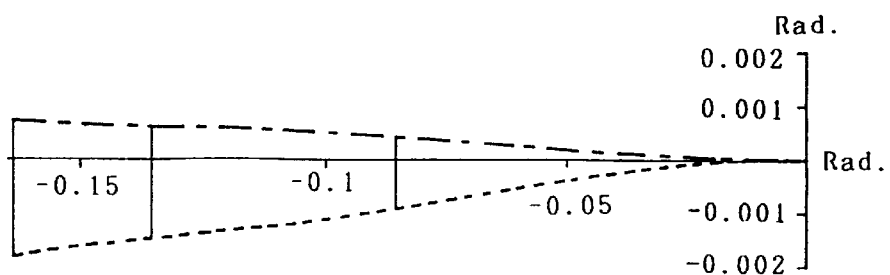

FIGS. 29A to 29C show the aberration observed in the tenth embodiment, at the wide-angle end. FIGS. 30A to 30C show the aberration observed in the tenth embodiment, at the telephoto end. FIGS. 31A to 31C show the aberration observed in the eleventh embodiment, at the wide-angle end. FIGS. 32A to 32C show the aberration observed in the eleventh embodiment, at the telephoto end. FIGS. 33A to 33C show the aberration observed in a fifth example for comparison, at the wide-angle end. FIGS. 34A to 34C show the aberration observed in the fifth example for comparison, at the telephoto end. FIGS. 35A to 35C show the aberration observed in a sixth example for comparison, at the wide-angle end. FIGS. 36A to 36C show the aberration observed in the sixth example for comparison, at the telephoto end. FIGS. 38A to 38C show the aberration observed in the twelfth embodiment, at the wide-angle end. FIGS. 39A to 39C show the aberration observed in the twelfth embodiment, at the telephoto end.

FIGS. 29A, 30A, 31A, 32A, 33A, 34A, 35A, 36A, 38A, and 39A show astigmatism, FIGS. 29B, 30B, 31B, 32B, 33B, 34B, 35B, 36B, 38B, and 39B show distortion, and FIGS. 29C, 30C, 31C, 32C, 33C, 34C, 35C, 36c, 38c, and 39C show lateral chromatic aberration, with all types of aberration calculated on the assumption that the object distance is 3 m. In these aberration diagrams, a solid line indicates tangential aberration for the e-line, a medium-length-dash line indicates sagittal aberration for the e-line, a dash-dot line indicates tangential aberration for the c-line, a long-dash line indicates sagittal aberration for the c-line, a short-dash line indicates tangential aberration for the g-line, and a dash-dot-dot line indicates sagittal aberration for the g-line. In the diagrams showing astigmatism, the dioptric power (in diopters) is taken along the vertical axis. In the diagrams showing distortion, the proportion of distortion (%) is taken along the vertical axis. In the diagrams showing lateral chromatic aberration, the angle (in radians) with respect to the optical axis is taken along the vertical axis. In all of these aberration diagrams, the incident angle (in radians) with respect to the plane of the pupil is taken along the horizontal axis.

As seen from the construction data, the aberration is evaluated according to the Sweatt model. The Sweatt model refers to a method for performing optical calculation on a diffractive optical surface in a simplified way. According to the Sweatt model, a large refractive index is used in relation to the wavelength, and this makes it possible to perform a calculation on a diffractive optical surface in the same way as an ordinary calculation of geometrical optics. Specifically, here, each type of aberration is calculated on the assumption that the refractive index for the e-line is 10001.00000.

As shown in FIGS. 28 and 37, the objective lens tg used in the tenth to twelfth embodiments is composed of a first lens unit g1 having a negative power, a second lens unit g2 having a positive power, and a third lens unit g3 having a positive power. To achieve zooming, the first and second lens units g1 and g2 are moved in the directions indicated by arrows m1 and m2, respectively. The third lens unit g3 is formed as one unit together with the objective-side inverting prism pg (FIG. 27). The condenser lens co (FIG. 26) is formed on the incident surface of the eyepiece-side inverting prism pe as one unit therewith, and the eyepiece lens se (FIG. 26) is formed on the pupil pe side surface of the eyepiece-side inverting prism pe as one unit therewith. The image formed by the objective lens tg is inverted and enlarged by the inverting prisms pg (g3) and pe, and is observed at the position of the pupil he.

In the fifth example for comparison, the inverting prism pe is made of polycarbonate (PC). Polycarbonate has a higher refractive index than polymethyl methacrylate (PMMA), and therefore it is preferably used as a material for a prism to obtain total-reflection surfaces easily. However, since polycarbonate has a small Abbe number, the use of a positive lens made of polycarbonate results in large longitudinal chromatic aberration, as seen from the aberration diagrams (FIGS. 33A–33C and 34A–34C). In the sixth example for comparison, the inverting prism pe is made of polymethyl methacrylate. As seen from the aberration diagrams (FIGS. 35A–35C and 36A–36C), also here, large longitudinal chromatic aberration is observed, though not so large as in the fifth example.

In the tenth embodiment, the inverting prism pe is made of polycarbonate. The pupil he side surface of the inverting prism pe is an aspherical surface, and, on this aspherical surface, the diffractive optical surface DOE is formed. This aspherical surface has increasingly gentle curvature from the center to the periphery, and is used to correct spherical aberration and curvature of field. From the aberration diagrams, it is clear that longitudinal chromatic aberration is smaller in the tenth embodiment (FIGS. 29A–29C and 30A–30C) than in the fifth example for comparison (FIGS. 33A–33C and 34A–34C). In the eleventh embodiment, the inverting prism pe is made of polymethyl methacrylate. From the aberration diagrams, it is clear that longitudinal chromatic aberration is smaller in the eleventh embodiment (FIGS. 31A–31C and 32A–32C) than in the sixth example for comparison (FIGS. 35A–35C and 36A–36C).

TABLE 1

<< Embodiment 1 (Eyepiece Lens) >>

| Radius of Curvature | Axial Distance | Refractive Index | Abbe Number |
|---|---|---|---|
| r0 = ∞ (Object Plane S0) | | | |
| | d0 = 54.600 | | |
| r1*[DOE] = 25.725 | | | |
| | d1 = 5.000 | N1 = 1.49329 | ν1 = 57.82 |
| r2 = 165.029 | | | |
| | d2 = 22.000 | | |
| r3 = ∞ (Pupil SE) | | | |

<Aspherical Coefficient>
r1: $\epsilon = 1.00$, $A4 = -4.09 \times 10^{-6}$
<Phase Function Coefficient of the Difference Optical Surface>
r1: $C1 = -5.47 \times 10^{-4}$
<Value of Condition (1), etc.>
$f1 = 57.2$, $\{1/(f1 \cdot \nu)\} + \phi DOE / \nu DOE = -1.87 \times 10^{-5}$

TABLE 2

<< Embodiment 2 (Eyepiece Lens) >>

| Radius of Curvature | Axial Distance | Refractive Index | Abbe Number |
|---|---|---|---|
| r0 = ∞ (Object Plane S0) | | | |
| | d0 = 25.700 | | |
| r1*[DOE] = 41.535 | | | |
| | d1 = 5.000 | N1 = 1.49329 | ν1 = 57.82 |
| r2 = −22.598 | | | |
| | d2 = 17.000 | | |
| r3 = ∞ (Pupil SE) | | | |

<Aspherical Coefficient>
r1: $\epsilon = 1.00$, $A4 = -2.89 \times 10^{-5}$
<Phase Function Coefficient of the Difference Optical Surface>
r1: $C1 = -1.15 \times 10^{-3}$
<Value of Condition (1), etc.>
$f1 = 28.6$, $\{1/(f1 \cdot \nu)\} + \phi DOE / \nu DOE = -6.26 \times 10^{-5}$

TABLE 3

<< Embodiment 3 (Eyepiece Lens) >>

| Radius of Curvature | Axial Distance | Refractive Index | Abbe Number |
|---|---|---|---|
| r0 = ∞ (Object Plane S0) | | | |
| | d0 = 12.800 | | |
| r1*[DOE] = 11.677 | | | |
| | d1 = 5.000 | N1 = 1.49329 | ν1 = 57.82 |
| r2 = −18.240 | | | |
| | d2 = 15.000 | | |
| r3 = ∞ (Pupil SE) | | | |

<Aspherical Coefficient>
r1: $\epsilon = 1.00$, $A4 = -2.39 \times 10^{-4}$
<Phase Function Coefficient of the Difference Optical Surface>
r1: $C1 = -2.46 \times 10^{-3}$
<Value of Condition (1), etc.>
$f1 = 14.3$, $\{1/(f1 \cdot \nu)\} + \phi DOE / \nu DOE = -2.18 \times 10^{-4}$

TABLE 4

<< Embodiment 4 (Eyepiece Lens) >>

| Radius of Curvature | Axial Distance | Refractive Index | Abbe Number |
|---|---|---|---|
| r0 = ∞ (Object Plane S0) | | | |
| | d0 = 9.000 | | |
| r1*[DOE] = 7.008 | | | |
| | d1 = 5.000 | N1 = 1.49329 | ν1 = 57.82 |
| r2 = −16.720 | | | |
| | d2 = 10.000 | | |
| r3 = ∞ (Pupil SE) | | | |

<Aspherical Coefficient>
r1: ε = 1.00, A4 = −7.35 × $10^{-4}$, A6 = 3.11 × $10^{-6}$, A8 = −2.52 × $10^{-7}$
<Phase Function Coefficient of the Diffractive Optical Surface>
r1: C1 = −3.37 × $10^{-3}$
<Value of Condition (1), etc.>
f1 = 10.1, $\{1/(f1 \cdot \nu)\} + \phi DOE / \nu DOE = -2.46 \times 10^{-4}$

TABLE 5

<< Embodiment 5 (Eyepiece Lens) >>

| Radius of Curvature | Axial Distance | Refractive Index | Abbe Number |
|---|---|---|---|
| r0 = ∞ (Object Plane S0) | | | |
| | d0 = 54.600 | | |
| r1* = 30.415 | | | |
| | d1 = 5.000 | N1 = 1.49329 | ν1 = 57.82 |
| r2[DOE] = ∞ | | | |
| | d2 = 22.000 | | |
| r3 = ∞ (Pupil SE) | | | |

<Aspherical Coefficient>
r1: ε = 1.00, A4 = −3.13 × $10^{-6}$
<Phase Function Coefficient of the Diffractive Optical Surface>
r2: C1 = −5.30 × $10^{-4}$
<Value of Condition (1), etc.>
f1 = 57.2, $\{1/(f1 \cdot \nu)\} + \phi DOE / \nu DOE = -5.63 \times 10^{-6}$

TABLE 6

<< Embodiment 6 (Eyepiece Lens) >>

| Radius of Curvature | Axial Distance | Refractive Index | Abbe Number |
|---|---|---|---|
| r0 = ∞ (Object Plane S0) | | | |
| | d0 = 18.199 | | |
| r1*[DOE] = 23.201 | | | |
| | d1 = 5.000 | N1 = 1.49329 | ν1 = 57.82 |
| r2[DOE] = −18.497 | | | |
| | d2 = 17.000 | | |
| r3 = ∞ (Pupil SE) | | | |

<Aspherical Coefficient>
r1: ε = 1.00, A4 = −6.92 × $10^{-5}$
<Phase Function Coefficient of the Diffractive Optical Surface>
r1: C1 = −5.00 × $10^{-3}$

TABLE 6-continued

<< Embodiment 6 (Eyepiece Lens) >> r2: C1 = 2.87 × $10^{-3}$
<Value of Condition (1), etc.>
f1 = 20.0, $\{1/(f1 \cdot \nu)\} + \phi DOE / \nu DOE = -4.3 \times 10^{-4}$

TABLE 7

<< Embodiment 7 (Eyepiece Lens) >>

| Radius of Curvature | Axial Distance | Refractive Index | Abbe Number |
|---|---|---|---|
| r0 = ∞ (Object Plane S0) | | | |
| | d0 = 18.000 | | |
| r1*[DOE] = 18.419 | | | |
| | d1 = 5.000 | N1 = 1.49329 | ν1 = 57.82 |
| r2[DOE] = −22.112 | | | |
| | d2 = 17.000 | | |
| r3 = ∞ (Pupil SE) | | | |

<Aspherical Coefficient>
r1: ε = 1.00, A4 = −7.83 × $10^{-5}$
<Phase Function Coefficient of the Diffractive Optical Surface>
r1: C1 = −7.95 × $10^{-4}$
r2: C1 = −7.95 × $10^{-4}$
<Value of Condition (1), etc.>
f1 = 20.0, $\{1/(f1 \cdot \nu)\} + \phi DOE / \nu DOE = -5.5 \times 10^{-5}$

TABLE 8

<< Embodiment 8 (Eyepiece Optical System) >>

| Surface | Radius of Curvature | Axial Distance | Refractive Index | Abbe Number |
|---|---|---|---|---|
| {Pupil SE} | | | | |
| S0 | r0 = ∞ | | | |
| | | d0 = 16.250 | | |
| {First Lens Unit G1} | | | | |
| S1 | r1 = ∞ | | | |
| | | d1 = 1.350 | N1 = 1.51680 | ν1 = 64.12 |
| S2[DOE] | r2 = ∞ | | | |
| | | d2 = 4.000 | | |
| {Second Lens Unit G2} | | | | |
| S3* | r3 = −26.76919 | | | |
| | | d3 = 8.300 | N2 = 1.49329 | ν2 = 57.82 |
| S4 | r4 = −17.18162 | | | |
| | | d4 = 73.100 | | |
| {Object Plane S0} | | | | |
| S5 | r5 = ∞ | | | |

<Aspherical Coefficient>
S3: ε = 1.00, A4 = −3.08 × $10^{-5}$
<Phase Function Coefficient of the Difference Optical Surface>
S2: C1 = −4.97 × $10^{-4}$
<Value of Condition (2)>
$|\phi DOE / \phi e| = 0.071$

TABLE 9

<< Embodiment 9 (Objective Optical System + Eyepiece Optical System) >>

| Surface | Radius of Curvature | Axial Distance | Refractive Index | Abbe Number |
|---|---|---|---|---|
| {First Lens Unit G1} | | | | |
| S1 | r1 = ∞ | | | |
| | | d1 = 2.000 | N1 = 1.49329 | ν1 = 57.82 |
| S2*[DOE] | r2 = −114.761 | | | |
| | | d2 = 9.107 | | |
| {Second Lens Unit G2} | | | | |
| S3* | r3 = ∞ | | | |
| | | d3 = 6.000 | N2 = 1.49329 | ν2 = 57.82 |
| S4* | r4 = −6.52226 | | | |
| | | d4 = 19.395 | | |
| {Third Lens Unit G3} | | | | |
| S5* | r5 = 34.89196 | | | |
| | | d5 = 4.250 | N3 = 1.49329 | ν3 = 57.82 |
| S6 | r6 = −21.485 | | | |
| | | d6 = 10.457 | | |
| {Fourth Lens Unit G4} | | | | |
| S7* | r7 = 46.228 | | | |
| | | d7 = 3.800 | N4 = 1.49329 | ν4 = 57.82 |
| S8 | r8 = −21.149 | | | |
| | | d8 = 17.000 | | |
| {Pupil SE} | | | | |
| S9 | r9 = ∞ | | | |

<Aspherical Coefficient>
S2: $\epsilon = 982.57$, $A4 = 1.78 \times 10^{-4}$
S3: $\epsilon = 1.00$, $A4 = 6.95 \times 10^{-4}$, $A6 = -5.88 \times 10^{-5}$
S4: $\epsilon = 0.63631$, $A4 = 9.96 \times 10^{-5}$, $A6 = -4.42 \times 10^{-6}$, $A8 = -2.25 \times 10^{-10}$
S5: $\epsilon = 1.15$, $A4 = -2.50 \times 10^{-5}$, $A6 = -4.52 \times 10^{-7}$, $A8 = 1.00 \times 10^{-9}$
S7: $\epsilon = -1.41 \times 10^2$ $A4 = 6.31 \times 10^{-5}$, $A6 = -4.36 \times 10^{-7}$, $A8 = 2.56 \times 10^{-10}$
<Phase Function Coefficient of the Diffractive Optical Surface>
S2: $C1 = -3.68 \times 10^{-3}$
<Value of Condition (3)>
$|\phi DOE / \phi o| = 0.155$

TABLE 10

<< Embodiment 10 >>
$\beta = 0.38 \sim 0.88$

| Surface | Radius of Curvature | Axial Distance | Refractive Index | Abbe Number | |
|---|---|---|---|---|---|
| S1* | r1 = −19.349 | | | | |
| | | d1 = 1.000 | N1 = 1.58752 | ν1 = 30.36 | . . . g1 |
| S2* | r2 = 18.574 | | | | |
| | | d2 = 12.12~1.55 | | | |
| S3* | r3 = 23.830 | | | | |
| | | d3 = 2.800 | N2 = 1.49329 | ν2 = 57.82 | . . . g2 |
| S4 | r4 = −6.844 | | | | |
| | | d4 = 0.78~9.34 | | | |
| S5 | r5 = 40.000 | | | | |
| | | d5 = 16.000 | N3 = 1.58752 | ν3 = 30.36 | . . . g3 |
| S6 | r6 = ∞ | | | | |
| | | d6 = 3.000 | | | |
| S7 | r7 = 17.489 | | | | |
| | | d7 = 31.920 | N4 = 1.58752 | ν4 = 30.36 | . . . pe |
| S8* | r8 = −12.83432 | | | | |
| | | d8 = 0.000 | N5 = 10001.00000 | ν5 = −3.45 | |
| S9*[DOE] | r9 = −12.8342610 | | | | |

<Aspherical Coefficient>
S1: $\epsilon = 1.00$, $A4 = -6.38 \times 10^{-4}$, $A6 = -2.65 \times 10^{-6}$
S2: $\epsilon = 1.00$, $A4 = -5.76 \times 10^{-4}$, $A6 = 3.66 \times 10^{-6}$
S3: $\epsilon = 1.00$, $A4 = -5.39 \times 10^{-4}$, $A6 = 8.60 \times 10^{-7}$
S8: $\epsilon = 1.00$, $A4 = 2.10 \times 10^{-6}$, $A6 = 3.11 \times 10^{-8}$
S9: $\epsilon = 1.00$, $A4 = 2.10 \times 10^{-6}$, $A6 = 3.11 \times 10^{-8}$
<Value of Condition (4), etc.>
$\phi D = 0.0035$, $rE \cdot \phi D / (1 - N) = 0.076$

TABLE 11

<< Embodiment 11 >>
β = 0.35~0.80

| Surface | Radius of Curvature | Axial Distance | Refractive Index | Abbe Number |
|---|---|---|---|---|
| S1* | r1 = −19.349 | | | |
| | | d1 = 1.000 | N1 = 1.58752 | ν1 = 30.36 . . . g1 |
| S2* | r2 = 18.574 | | | |
| | | d2 = 12.12~1.61 | | |
| S3* | r3 = 20.528 | | | |
| | | d3 = 2.800 | N2 = 1.49329 | ν2 = 57.82 . . . g2 |
| S4 | r4 = −7.14000 | | | |
| | | d4 = 0.78~9.34 | | |
| S5 | r5 = 40.000 | | | |
| | | d5 = 16.000 | N3 = 1.58752 | ν3 = 30.36 . . . g3 |
| S6 | r6 = ∞ | | | |
| | | d6 = 3.000 | | |
| S7 | r7 = 17.489 | | | |
| | | d7 = 33.090 | N4 = 1.49329 | ν4 = 57.82 . . . pe |
| S8* | r8 = −11.77180 | | | |
| | | d8 = 0.000 | N5 = 10001.00000 | ν5 = −3.45 |
| S9*[DOE] | r9 = −11.7717611 | | | |

<Aspherical Coefficient>
S1: $\epsilon = 1.00$, $A4 = -6.73 \times 10^{-4}$, $A6 = -2.50 \times 10^{-6}$
S2: $\epsilon = 1.00$, $A4 = -5.76 \times 10^{-4}$, $A6 = 3.48 \times 10^{-6}$
S3: $\epsilon = 1.00$, $A4 = -5.50 \times 10^{-4}$, $A6 = 1.07 \times 10^{-6}$
S8: $\epsilon = 1.00$, $A4 = 8.32 \times 10^{-6}$, $A6 = -7.92 \times 10^{-8}$
S9: $\epsilon = 1.00$, $A4 = 8.32 \times 10^{-6}$, $A6 = -7.92 \times 10^{-8}$
<Value of Condition (4), etc.>
$\phi D = 0.0026$, $rE \cdot \phi D / (1 - N) = 0.062$

TABLE 12

<< Comparison Example 5 >>
β = 0.38~0.87

| Surface | Radius of Curvature | Axial Distance | Refractive Index | Abbe Number |
|---|---|---|---|---|
| S1* | r1 = −19.349 | | | |
| | | d1 = 1.000 | N1 = 1.58752 | ν1 = 30.36 . . . g1 |
| S2* | r2 = 18.574 | | | |
| | | d2 = 12.12~1.72 | | |
| S3* | r3 = 15.494 | | | |
| | | d3 = 2.800 | N2 = 1.49329 | ν2 = 57.82 . . . g2 |
| S4 | r4 = −7.97000 | | | |
| | | d4 = 0.78~9.34 | | |
| S5 | r5 = 40.000 | | | |
| | | d5 = 16.000 | N3 = 1.58752 | ν3 = 30.36 . . . g3 |
| S6 | r6 = ∞ | | | |
| | | d6 = 3.000 | | |
| S7 | r7 = 17.489 | | | |
| | | d7 = 32.653 | N4 = 1.58752 | ν4 = 30.36 . . . pe |
| S8* | r8 = −12.279 | | | |

<Aspherical Coefficient>
S1: $\epsilon = 1.00$, $A4 = -6.56 \times 10^{-4}$, $A6 = -2.66 \times 10^{-6}$
S2: $\epsilon = 1.00$, $A4 = -5.39 \times 10^{-4}$, $A6 = 3.65 \times 10^{-6}$
S3: $\epsilon = 1.00$, $A4 = -5.21 \times 10^{-4}$, $A6 = 1.04 \times 10^{-6}$
S8: $\epsilon = 1.00$, $A4 = 1.94 \times 10^{-5}$, $A6 = 3.52 \times 10^{-7}$

TABLE 13

<< Comparison Example 6 >>
β = 0.38~0.87

| Surface | Radius of Curvature | Axial Distance | Refractive Index | Abbe Number |
|---|---|---|---|---|
| S1* | r1 = −19.349 | | | |
| | | d1 = 1.000 | N1 = 1.58752 | ν1 = 30.36 . . . g1 |
| S2* | r2 = 18.574 | | | |
| | | d2 = 12.12~1.72 | | |
| S3* | r3 = 15.494 | | | |
| | | d3 = 2.800 | N2 = 1.49329 | ν2 = 57.82 . . . g2 |
| S4 | r4 = −7.97000 | | | |
| | | d4 = 0.78~9.34 | | |
| S5 | r5 = 40.000 | | | |
| | | d5 = 16.000 | N3 = 1.58752 | ν3 = 30.36 . . . g3 |
| S6 | r6 = ∞ | | | |
| | | d6 = 3.000 | | |
| S7 | r7 = 17.489 | | | |
| | | d7 = 30.712 | N4 = 1.49329 | ν4 = 57.82 . . . pe |
| S8* | r8 = −10.309 | | | |

<Aspherical Coefficient>
S1: ε = 1.00, A4 = −6.56 × $10^{-4}$, A6 = −2.66 × $10^{-6}$
S2: ε = 1.00, A4 = −5.39 × $10^{-4}$, A6 = 3.65 × $10^{-6}$
S3: ε = 1.00, A4 = −5.21 × $10^{-4}$, A6 = 1.04 × $10^{-6}$
S8: ε = 1.00, A4 = 6.46 × $10^{-5}$, A6 = 3.78 × $10^{-7}$

TABLE 14

<< Embodiment 12 >>
β = 0.38 ~0.88

| Surface | Radius of Curvature | Axial Distance | Refractive Index | Abbe Number |
|---|---|---|---|---|
| S1* | r1 = −19.349 | | | |
| | | d1 = 1.000 | N1 = 1.58752 | ν1 = 30.36 . . . g1 |
| S2* | r2 = 18.574 | | | |
| | | d2 = 12.12~1.55 | | |
| S3* | r3 = 23.052 | | | |
| | | d3 = 2.800 | N2 = 1.49329 | ν2 = 57.82 . . . g2 |
| S4 | r4 = −6.587 | | | |
| | | d4 = 0.78~9.34 | | |
| S5[DOE] | r5 = 47.435630 | | | |
| | | d5 = 0.000 | N3 = 10001.00000 | ν3 = −3.45 |
| S6 | r6 = 47.436108 | | | |
| | | d6 = 16.000 | N4 = 1.58752 | ν4 = 30.36 . . . g3 |
| S7 | r7 = ∞ | | | |
| | | d7 = 3.000 | | |
| S8 | r8 = 17.489 | | | |
| | | d8 = 31.920 | N5 = 1.58752 | ν5 = 30.36 . . . pe |
| S9* | r9 = −12.549004 | | | |
| | | d9 = 0.000 | N6 = 10001.00000 | ν6 = −3.45 |
| S10*[DOE] | r10 = −12.548972 | | | |

<Aspherical Coefficient>
S1: ε = 1.00, A4 = −6.31 × $10^{-4}$, A6 = −2.65 × $10^{-6}$
S2: ε = 1.00, A4 = −5.76 × $10^{-4}$, A6 = 3.64 × $10^{-6}$
S3: ε = 1.00, A4 = −5.24 × $10^{-4}$, A6 = 8.96 × $10^{-7}$
S9: ε = 1.00, A4 = 6.48 × $10^{-6}$, A6 = 1.22 × $10^{-8}$
S10: ε = 1.00, A4 = 6.48 × $10^{-6}$, A6 = 1.22 × $10^{-8}$
<Values of Conditions (4) and (5), etc.>
φD = 0.0025, φD' = 0.0023
rE · φD / (1 − N) = 0.053, |φD − φD'| = 0.0002

What is claimed is:

1. An eyepiece lens consisting of a single lens element having a positive optical power, said single lens element having a refractive power of an aspherical surface and having a diffractive power, wherein the following condition is fulfilled:

$$-0.0006 < \{1/(fl \cdot \nu)\} \phi DOE / \nu DOE < 0.0002$$

where fl represents a focal length resulting from both refractive effect and diffractive effect of the eyepiece lens, ν represents an Abbe number of the eyepiece lens, φDOE represents a power resulting from the diffractive effect of the eyepiece lens, and νDOE represents an Abbe-number-equivalent value resulting from the diffractive effect of the eyepiece lens.

2. An eyepiece lens as claimed in claim 1, wherein one surface of the eyepiece lens has both a refractive power of an aspherical surface and a diffractive power.

3. An eyepiece lens as claimed in claim 1, wherein the eyepiece lens is formed in a biconvex shape.

4. An eyepiece lens as claimed in claim 1, wherein the eyepiece lens is formed in a plano-convex shape.

5. An eyepiece lens as claimed in claim 4, wherein a flat surface of the eyepiece lens has a diffractive power.

6. An eyepiece lens consisting of a single lens element having a positive optical power, said single lens element having a refractive power of an aspherical surface and having a diffractive power, wherein the following condition is fulfilled:

$$-0.0006 < \{1/(fl \cdot \nu)\} + \phi DOE/\nu DOE < 0.0002$$

where fl represents a focal length resulting from both refractive effect and diffractive effect of the eyepiece lens, ν represents an Abbe number of the eyepiece lens, φDOE represents a power resulting from the diffractive effect of the eyepiece lens, and νDOE represents an Abbe-number-equivalent value resulting from the diffractive effect of the eyepiece lens;

wherein the eyepiece lens is formed in a meniscus shape.

7. An eyepiece lens consisting of a single lens element having a positive optical power, said single lens element having a refractive power of an aspherical surface and having a diffractive power, wherein the following condition is fulfilled:

$$-0.0006 < \{1/(fl \cdot \nu)\} + \phi DOE/\nu DOE < 0.0002$$

where fl represents a focal length resulting from both refractive effect and diffractive effect of the eyepiece lens, ν represents an Abbe number of the eyepiece lens, φDOE represents a power resulting from the diffractive effect of the eyepiece lens, and νDOE represents an Abbe-number-equivalent value resulting from the diffractive effect of the eyepiece lens;

wherein two surfaces of the eyepiece lens each have a diffractive power.

8. An eyepiece lens as claimed in claim 7, wherein the two surfaces have diffractive powers of opposite signs.

9. An eyepiece lens as claimed in claim 7, wherein the two surfaces have diffractive powers of a same sign.

10. An eyepiece lens consisting of a single lens element having a positive optical power, said single lens element having a refractive power of an aspherical surface and having a diffractive power;

wherein chromatic aberration resulting from the refractive power of an aspherical surface is substantially canceled by chromatic aberration resulting from the diffractive power; and wherein the following condition is fulfilled:

$$-0.0006 < \{1/(fl \cdot \nu)\} + \phi DOE/\nu DOE < 0.0002$$

where fl represents a focal length resulting from both refractive effect and diffractive effect of the eyepiece lens, ν represents an Abbe number of the eyepiece lens, φDOE represents a power resulting from the diffractive effect of the eyepiece lens, and νDOE represents an Abbe-number-equivalent value resulting from the diffractive effect of the eyepiece lens.

11. A real-type viewfinder optical system comprising:

an eyepiece lens system; and an objective lens system;

wherein one of said eyepiece lens system and said objective lens system includes a lens element which has a surface having a diffractive power, wherein the following condition is fulfilled:

$$0.01 < |\phi DOE/\phi e| < 0.16$$

where

φDOE represents a composite power of the surface having a refractive power and a surface having a diffractive power within the lens element, and φe represents a composite power of surfaces having refractive powers and surfaces having diffractive powers within said one of said eyepiece lens system and said objective lens system having said lens element therein.

12. A real-type viewfinder optical system as claimed in claim 11, wherein said objective lens system includes said lens element which has a surface having a diffractive power and wherein the lens element which has a surface having a diffractive power within the lens element constitutes part of an outer covering of an optical apparatus.

13. A real-type viewfinder optical system as claimed in claim 11, wherein said eyepiece lens system has said lens element which has a surface having a diffractive power.

14. A real-type viewfinder optical system as claimed in claim 11, wherein said objective lens system has said lens element which has a surface having a diffractive power.

15. A real-type viewfinder optical system comprising an eyepiece lens system having a lens element which has a surface having a diffractive power, wherein the following condition is fulfilled:

$$0.01 < |\phi DOE/\phi e| < 0.16$$

where

φDOE represents a composite power of the surface having a refractive power and a surface having a diffractive power within the lens element, and φe represents a composite power of surfaces having refractive powers and surfaces having diffractive powers within the entire eyepiece lens system;

wherein the surface having a diffractive power within the lens element constitutes part of an outer covering of an optical apparatus.

16. A real-type viewfinder optical system comprising:

an objective lens;

an objective-side inverting prism; and an eyepiece-side inverting prism;

wherein:

said eyepiece-side inverting prism has a diffractive optical surface formed on a pupil side surface, said pupil side surface of said eyepiece-side inverting prism has a curved surface, and wherein the following condition is fulfilled:

$$0.03 < rE \cdot \phi D/(1-N) < 0.1$$

where
- rE represents the radius of curvature of the pupil side surface of the inverting prism,
- φD represents the power of the diffractive optical surface DOE provided on the pupil side surface of the inverting prism, and
- N represents the refractive index of the inverting prism.

17. A real-type viewfinder optical system in accordance with claim 16, wherein said curved surface is an aspheric surface.

18. A real-type viewfinder optical system in accordance with claim 16, wherein said objective-side inverting prism has a diffractive optical surface formed on an object side surface.

* * * * *